INVENTORS
RICHARD K. BOYD,
MILTON A. CLEMENT,
JAMES D. CONFELD and
THOMAS E. ELLIS
by

ATTORNEY

Fig. 3 REMOTE PLAYBACK CIRCUIT-122

Fig. 4 REMOTE PLAYBACK CIRCUIT-122

LOCAL PLAYBACK CIRCUIT-128

Oct. 29, 1963

R. K. BOYD ETAL

DATA HANDLING SYSTEM 3,109,068

Filed Jan. 25, 1960

15 Sheets-Sheet 6

LOCAL PLAYBACK CIRCUIT-128

Oct. 29, 1963 R. K. BOYD ETAL 3,109,068

DATA HANDLING SYSTEM

Filed Jan. 25, 1960 15 Sheets-Sheet 8

LOCAL PLAYBACK CIRCUIT-128

LOCAL PLAYBACK CIRCUIT-128

Oct. 29, 1963 R. K. BOYD ETAL 3,109,068

DATA HANDLING SYSTEM

Filed Jan. 25, 1960 15 Sheets-Sheet 10

LOCAL PLAYBACK CIRCUIT-128

Oct. 29, 1963 R. K. BOYD ETAL 3,109,068

DATA HANDLING SYSTEM

Filed Jan. 25, 1960 15 Sheets-Sheet 11

Fig. 11 LOCAL PLAYBACK CIRCUIT-128

Fig. 12 LOCAL PLAYBACK CIRCUIT-128

Fig-13 LOCAL PLAYBACK CIRCUIT-128

Oct. 29, 1963 R. K. BOYD ETAL 3,109,068

DATA HANDLING SYSTEM

Filed Jan. 25, 1960 15 Sheets-Sheet 14

Fig. 14 LOCAL PLAYBACK CIRCUIT-128

United States Patent Office 3,109,068
Patented Oct. 29, 1963

3,109,068
DATA HANDLING SYSTEM

Richard K. Boyd, Wheat Ridge, Colo., and Milton A. Clement, James D. Confeld, and Thomas E. Ellis, Rochester, N.Y., assignors to General Dynamics Corporation, Rochester, N.Y., a corporation of Delaware Filed Jan. 25, 1960, Ser. No. 4,302
13 Claims. (Cl. 179—8)

This invention relates to a data handling system and, more particularly, to a communication system in which data stored in a plurality of different locations is selectively transmitted to a central receiving location.

The cost of toll ticketing equipment for automatically collecting and recording data pertaining to telephone calls can be rather high compared to the economic advantages obtained by its use if the volume of traffic handled in a given exchange or system is not large enough. The economic feasibility of this equipment is greatly enhanced if the translating, computing and recording facilities of the system can be used in common by a plurality of small toll data collecting offices that often are geographically remote from each other. In Morris et al. Patent No. 2,877,311, there is shown and described an automatic toll ticketing system in which a central toll ticketing or accounting office is used to provide permanent records of toll data derived both locally and from a plurality of geographically remote offices. However, this system is not completely satisfactory in some applications in which it is necessary to obtain greater flexibility in the selection and control over the remote data collecting and storing offices.

Accordingly, one object of this invention is to provide a new and improved data handling system.

Another object is to provide an automatic toll ticketing system including new and improved means for transmitting toll call data from a plurality of remote data storing offices to a central data recording office.

Another object is to provide a communication system including new and improved means for selectively connecting a central station to a plurality of called stations for communication.

A further object is to provide a communication system in which different communication paths over a common signaling channel are selectively established under the control of synchronously operable switching means in called and calling stations.

Another object is to provide a communication system including means controllable from a central station for placing selected ones of a plurality of remote stations in an operative or inoperative state.

A further object is to provide a communication system including means for determining the number of stations requiring a data playback operation and for then playing back the data from the stations in a selected order.

Another object is to provide a communication system including new and improved means for automatically seizing a called station having a filled data storing means.

Another object is to provide a communication system including means for automatically making a plurality of attempts to complete a proper seizure of a selected called station.

Figure 1:
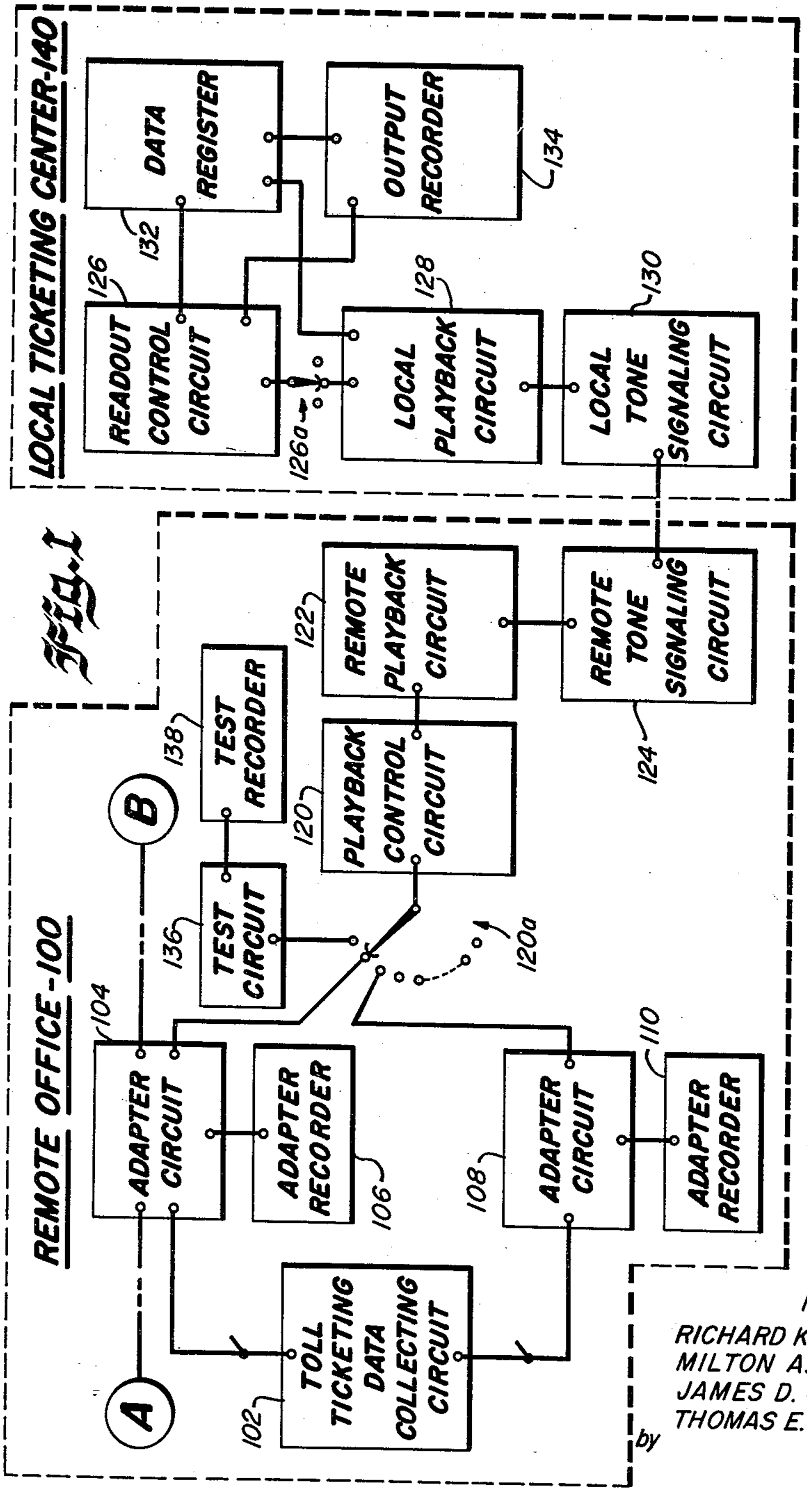
Figure 16:
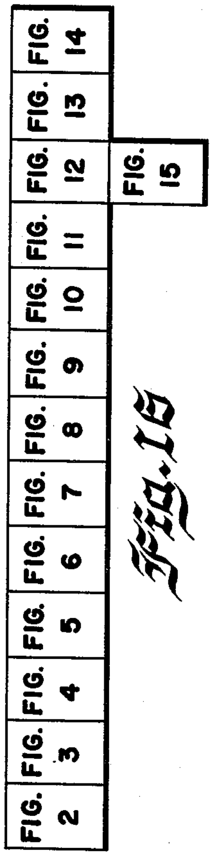
Figure 2:
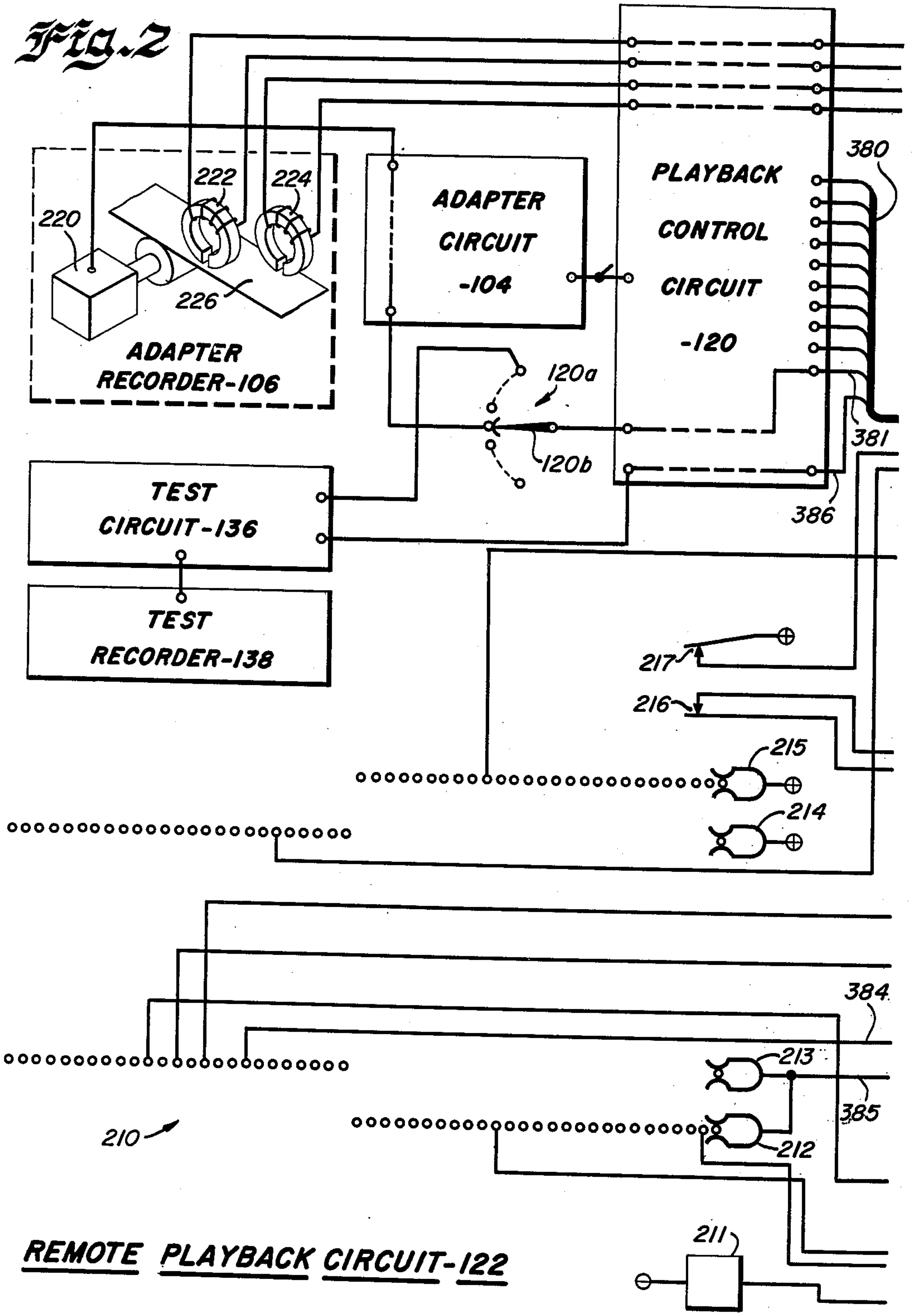
Figure 3:
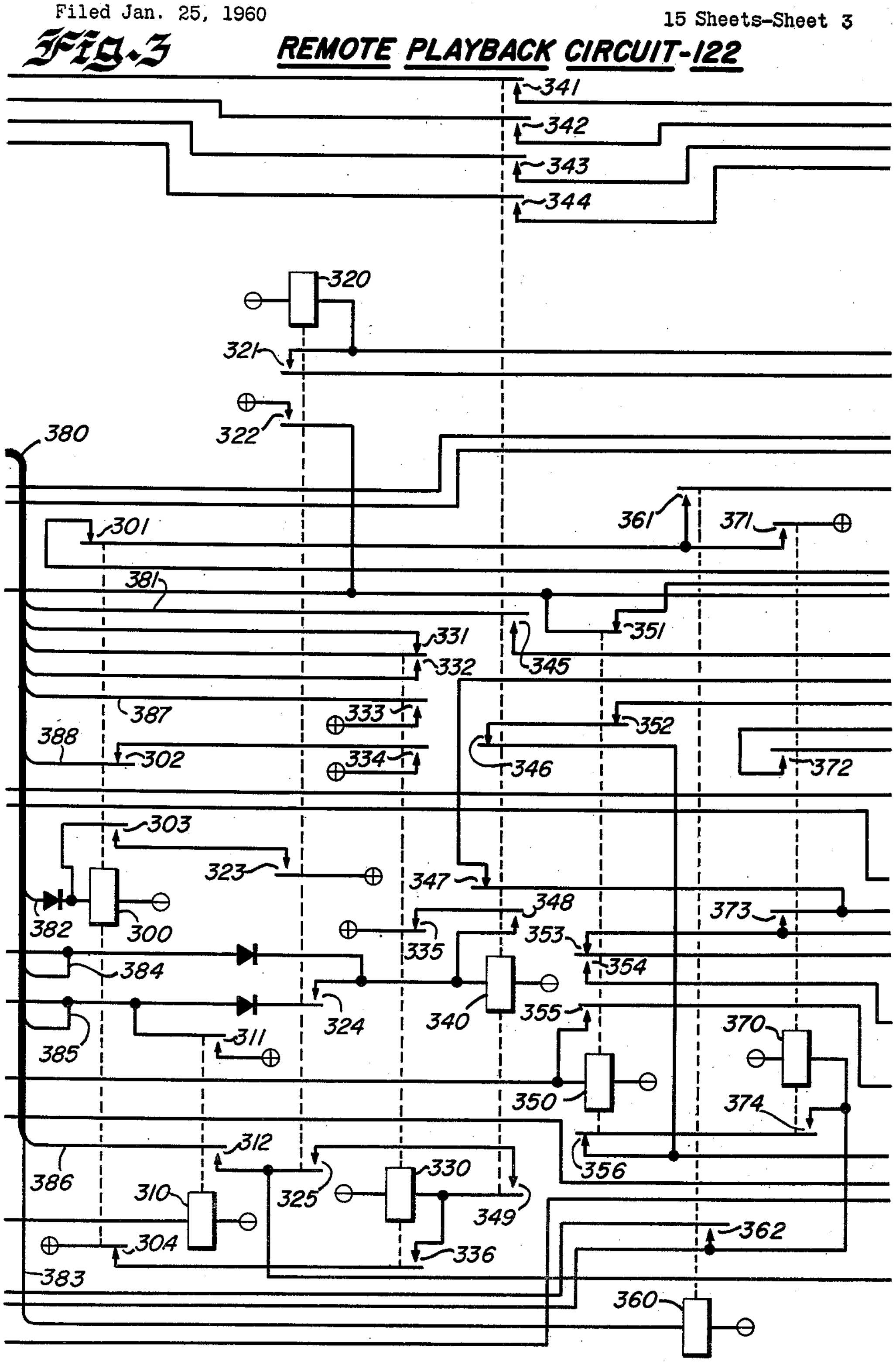
Figure 4:
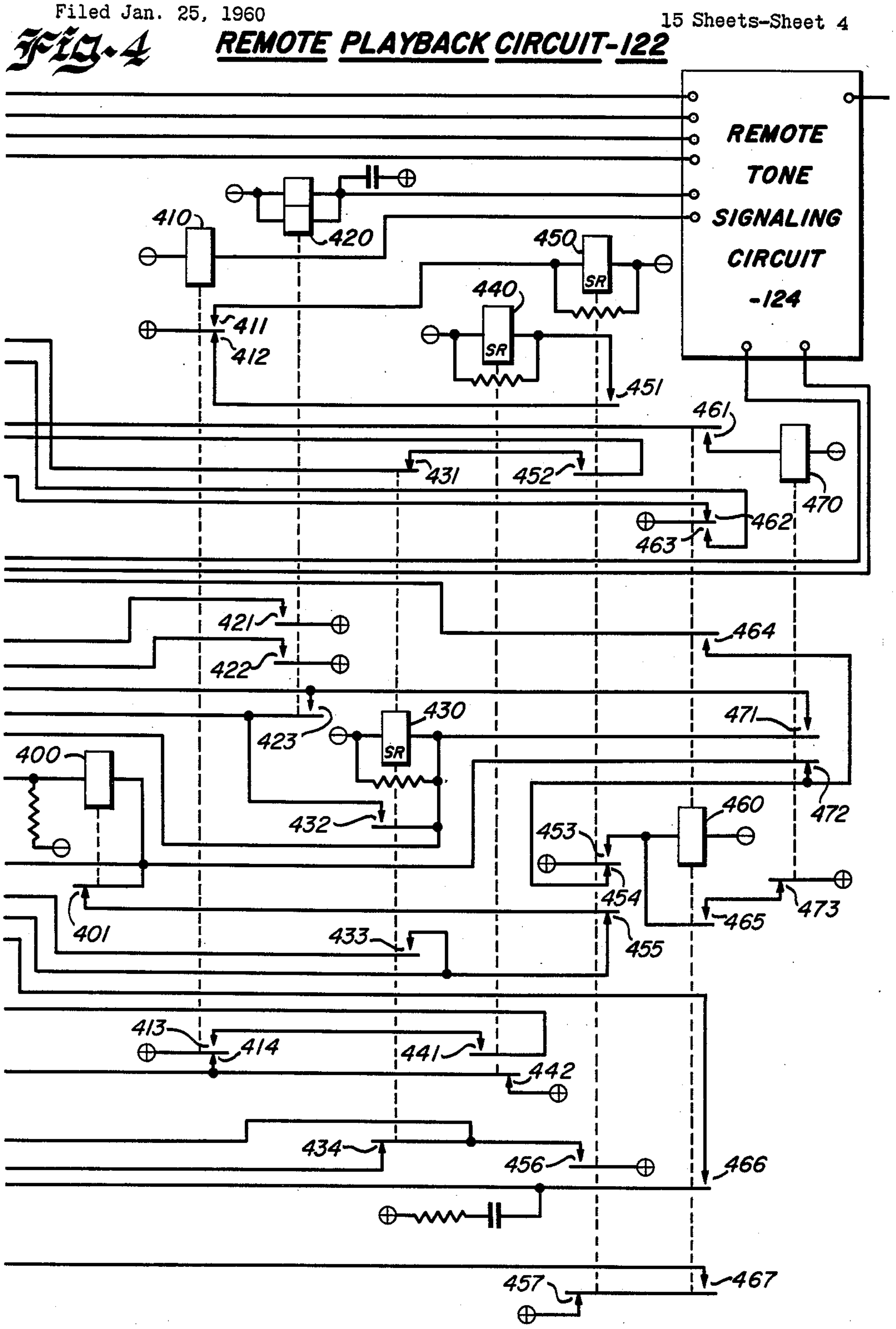
Figure 5:
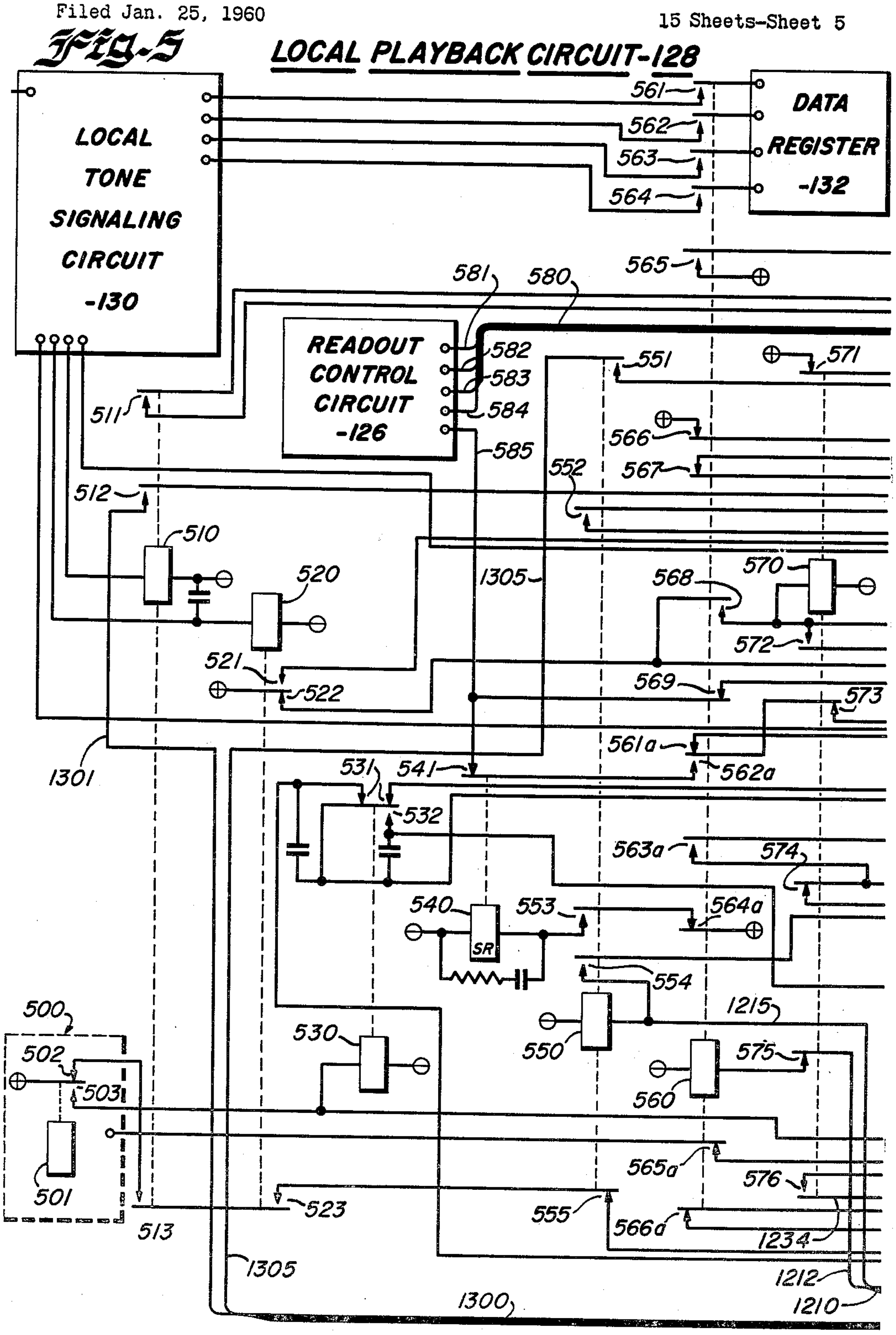
Figure 6:
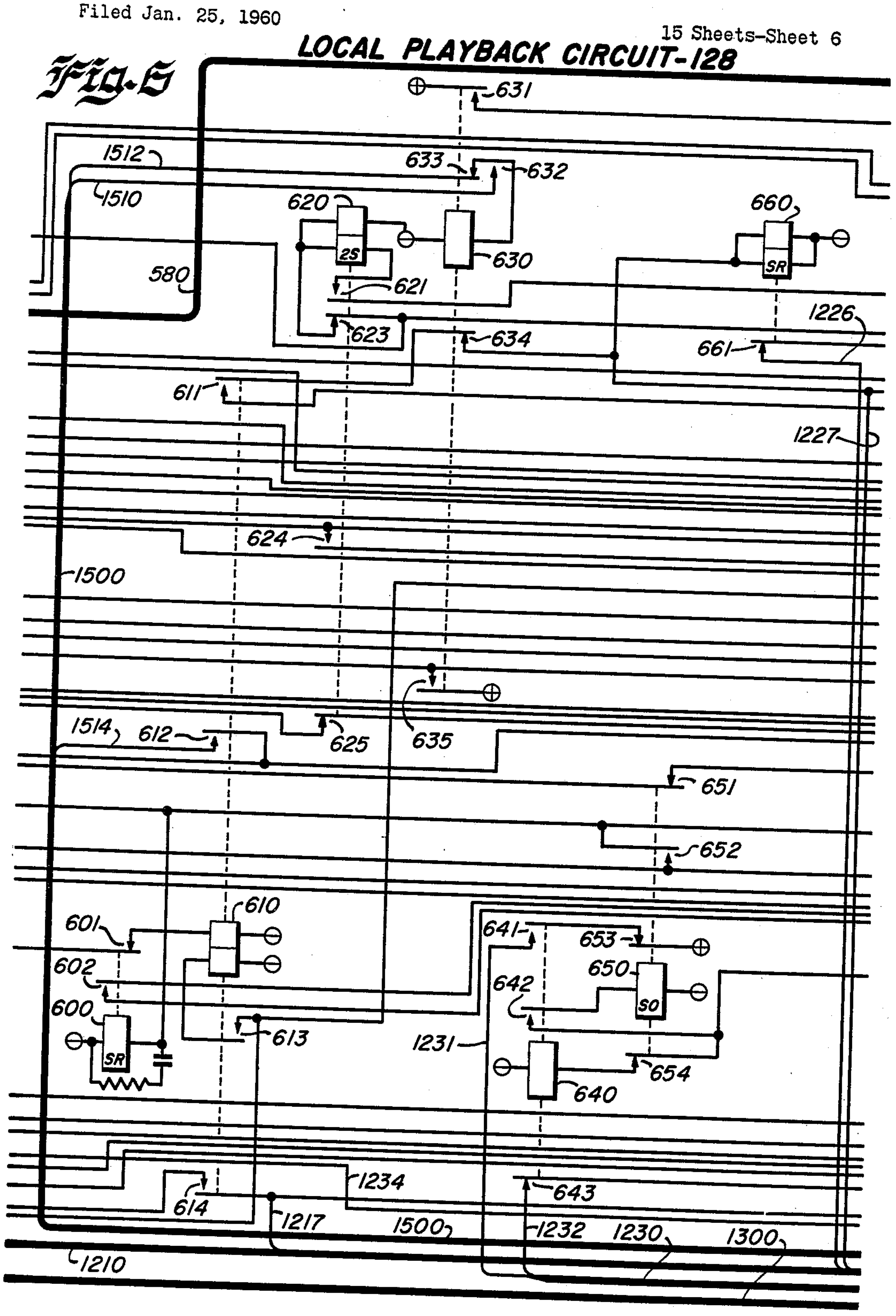
Figure 7:
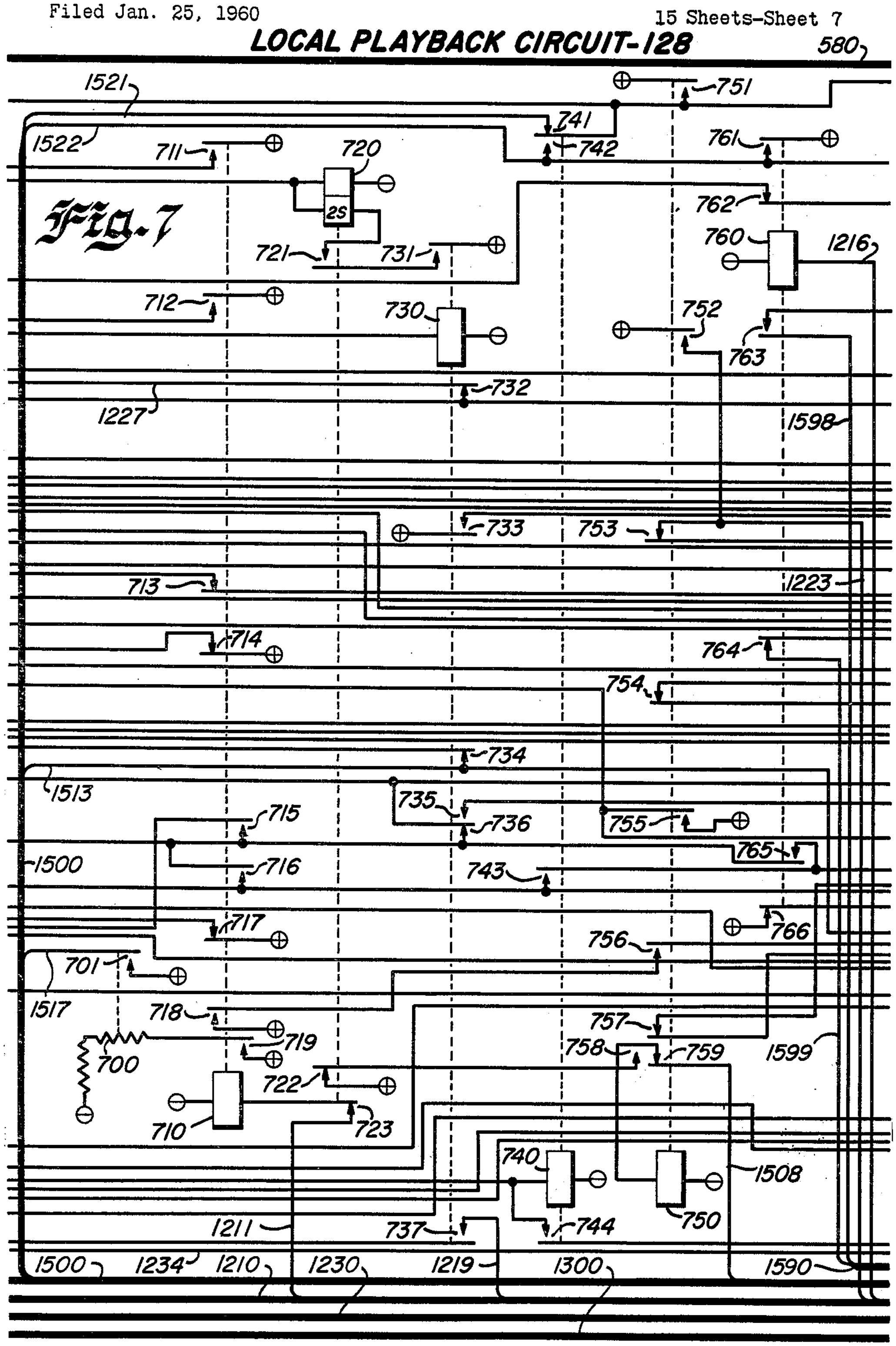
Figure 8:
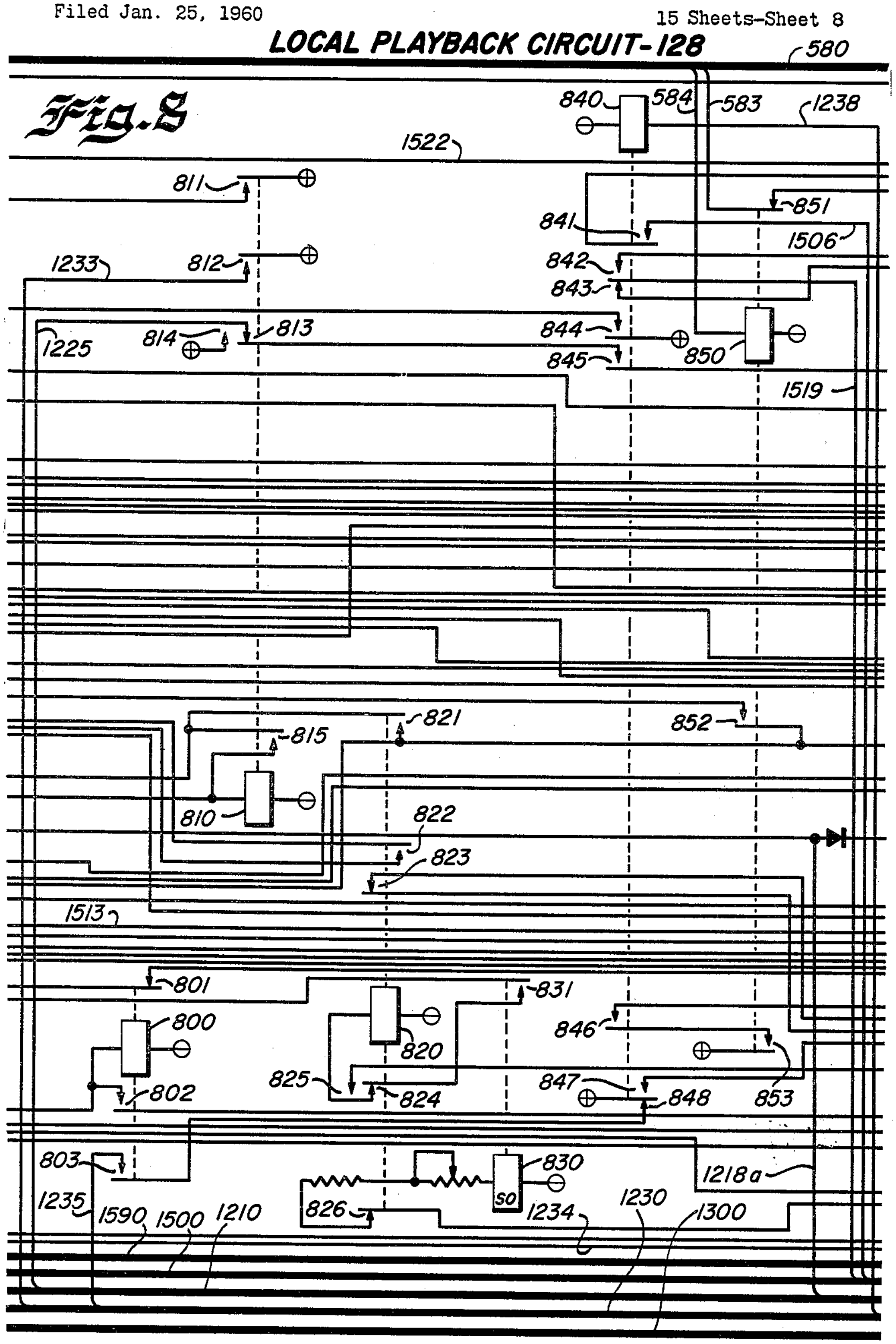
Figure 9:
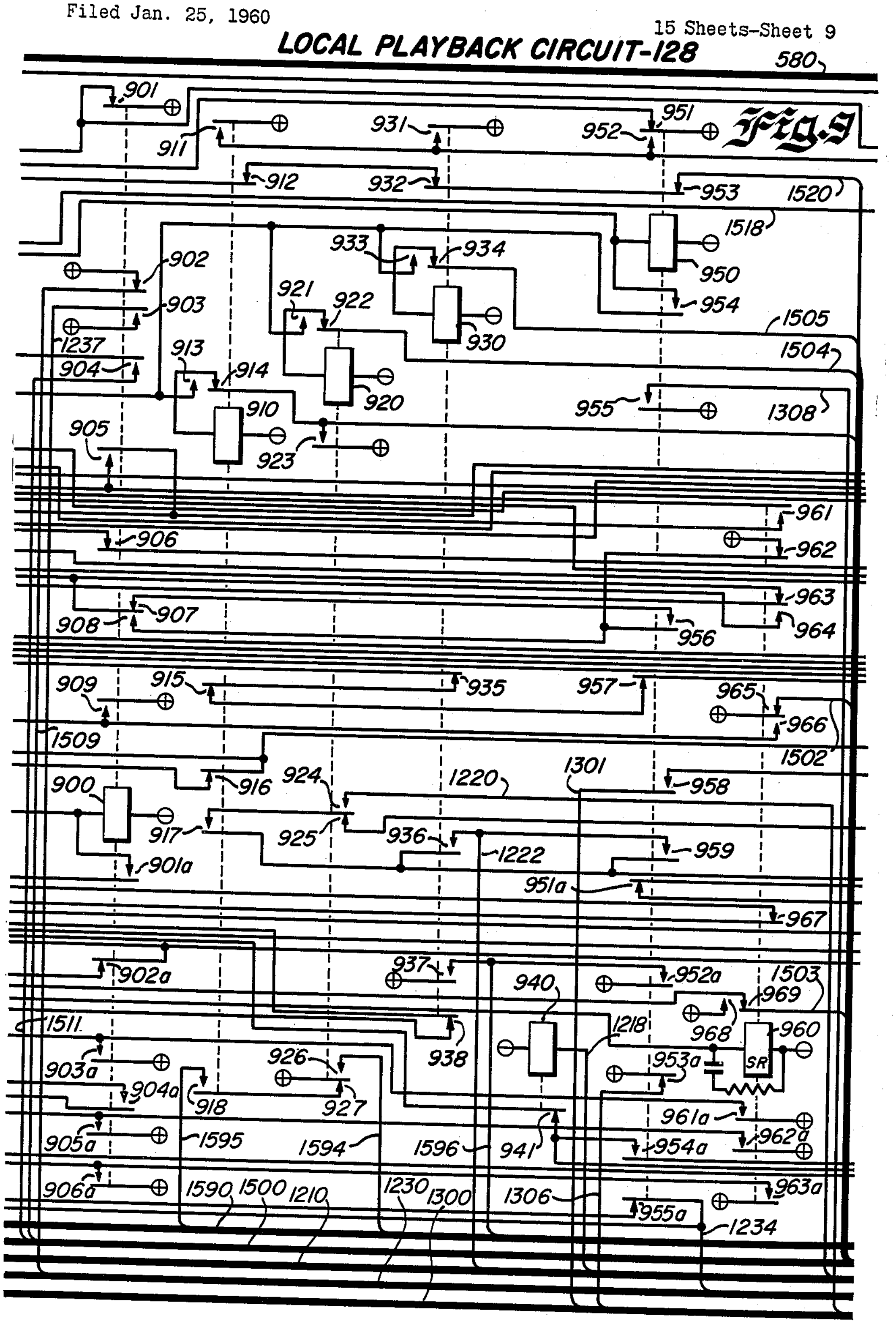
Figure 10:
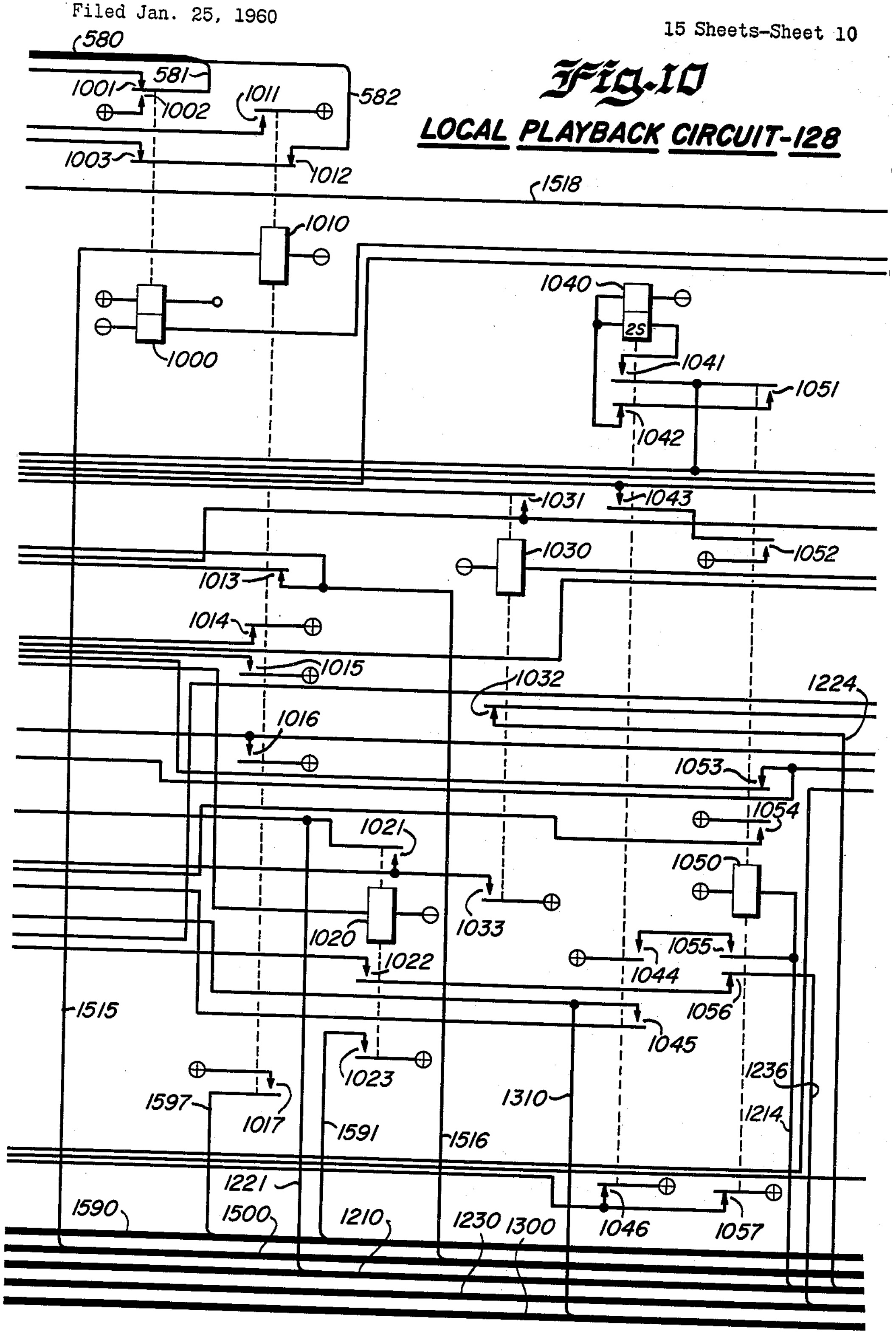
Figure 11:
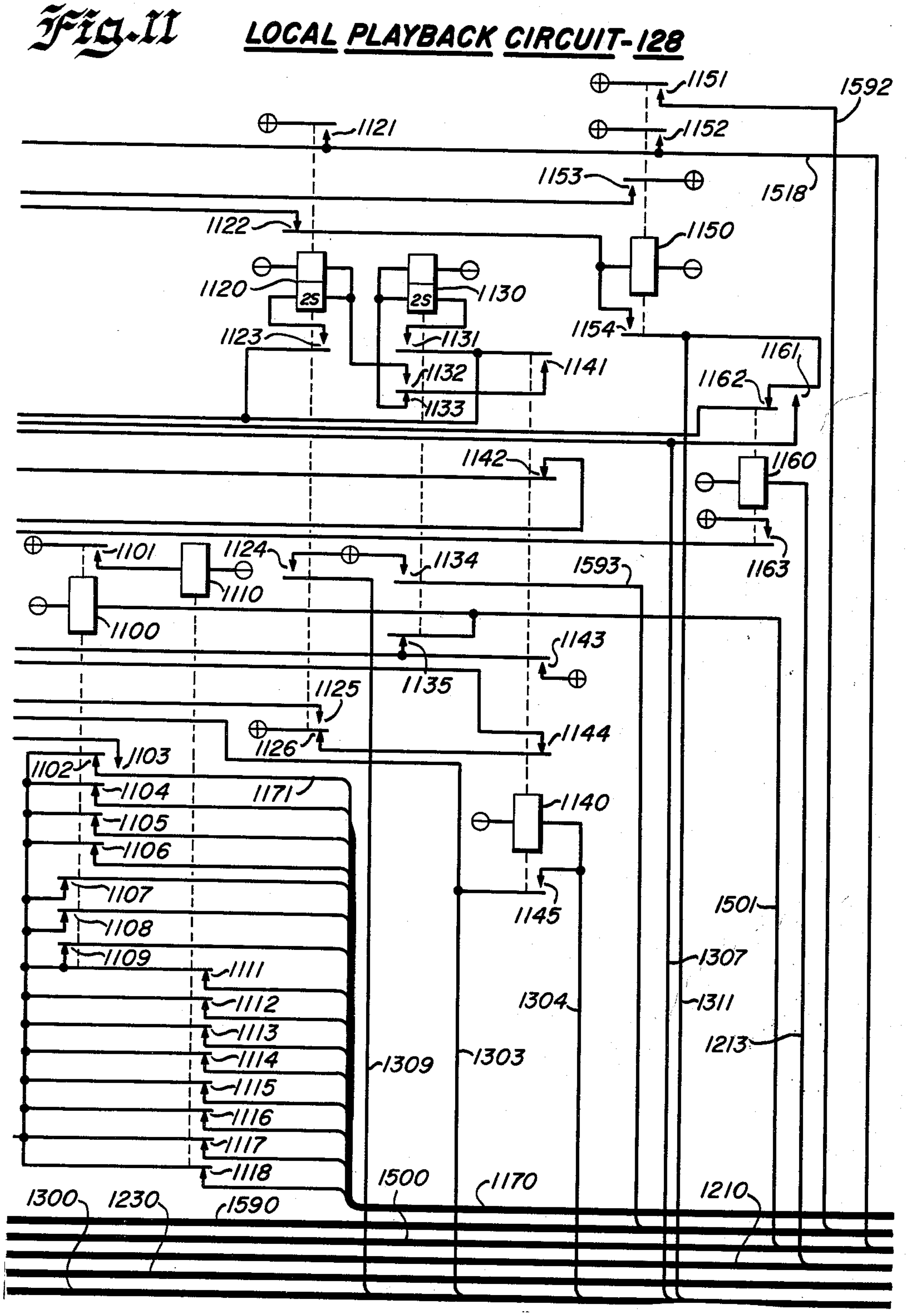
Figure 12:
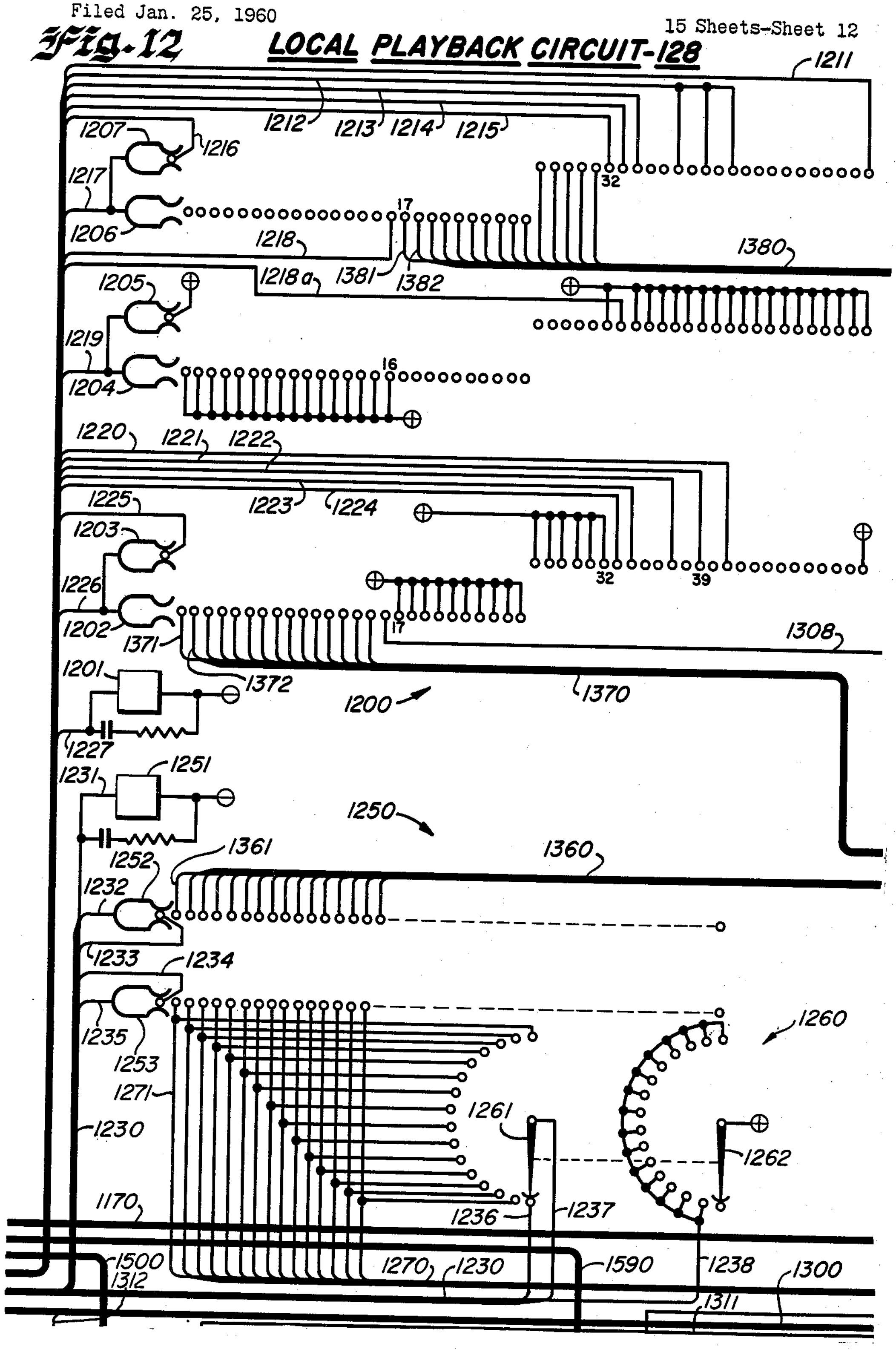
Figure 13:
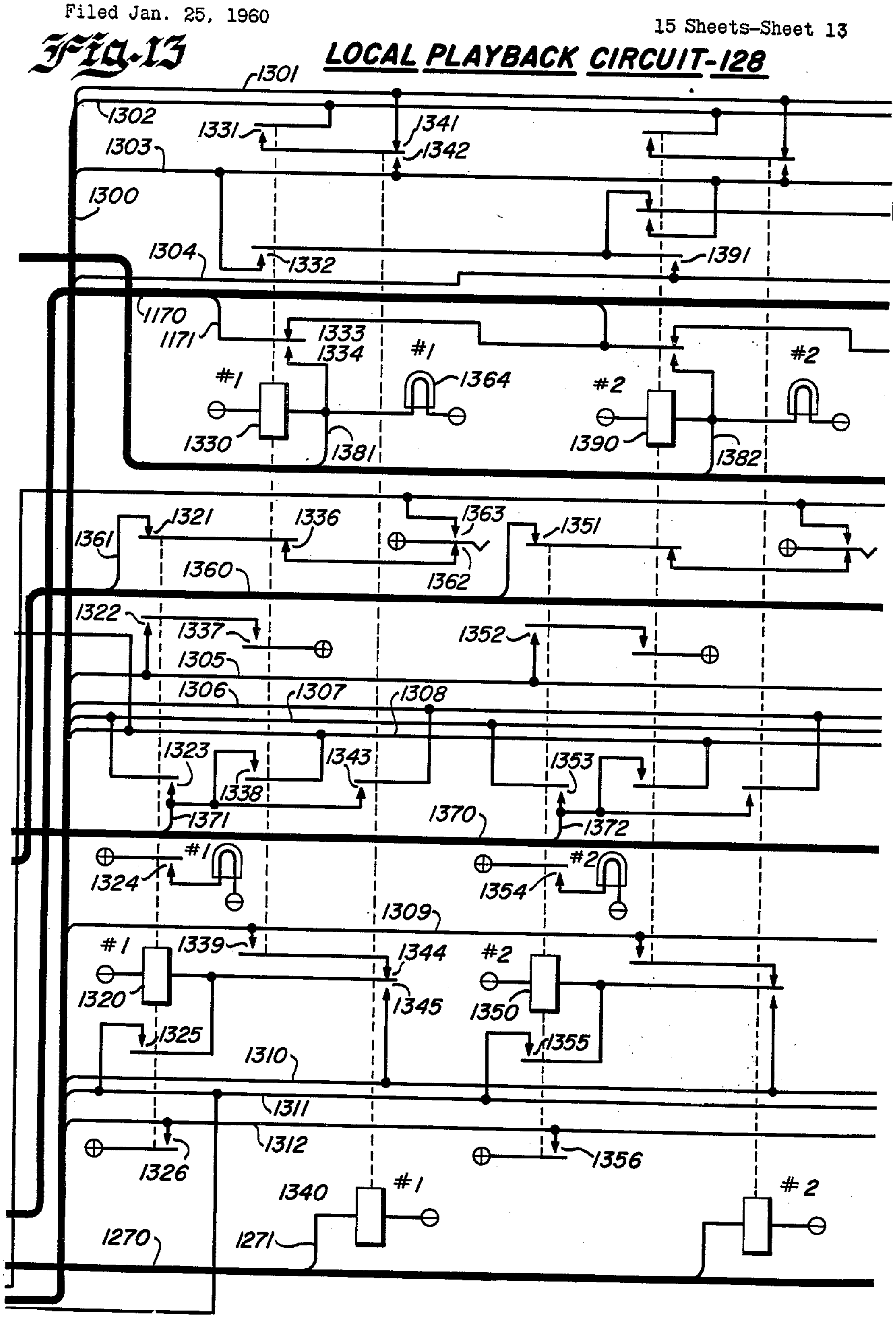
Figure 14:
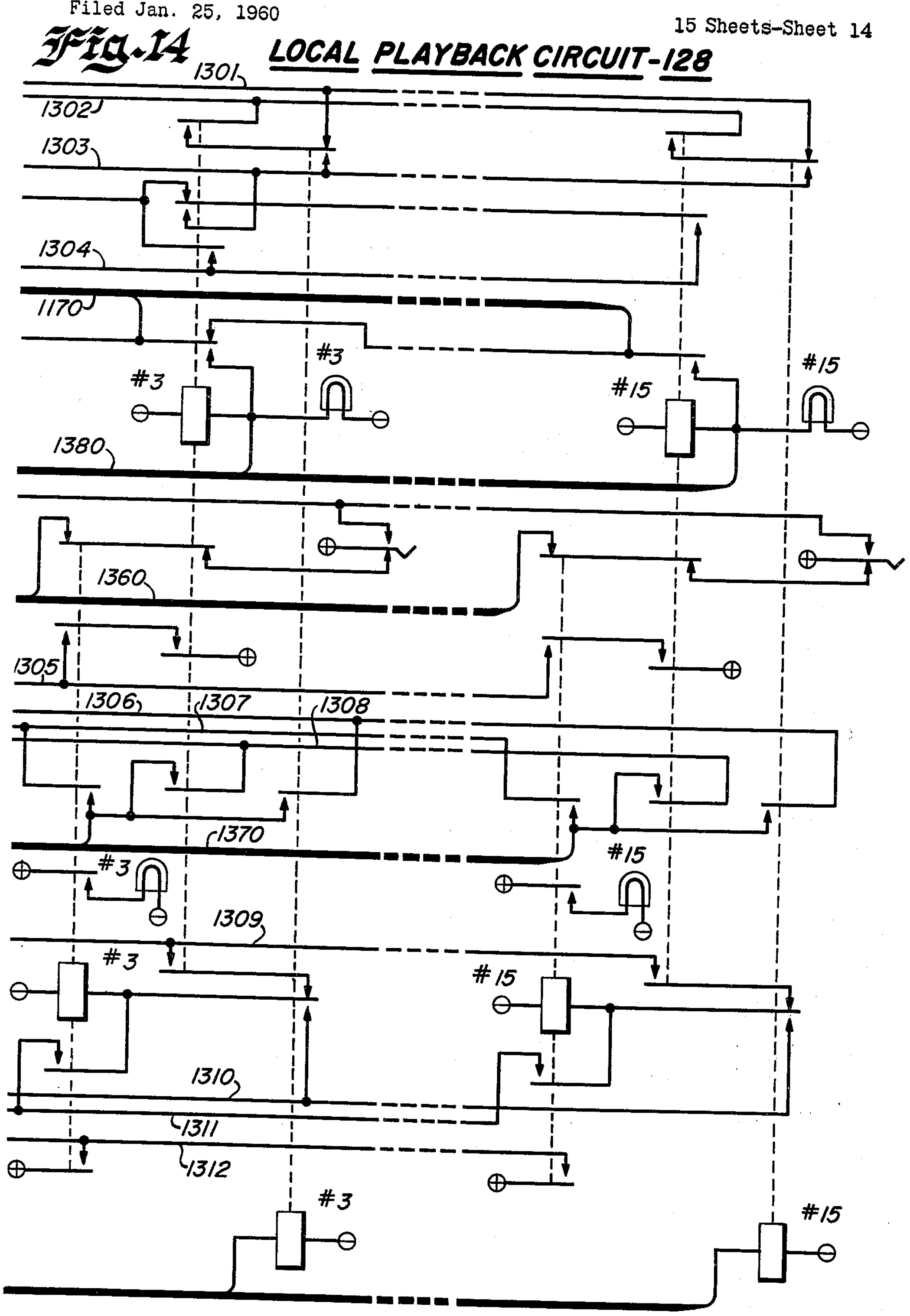
Figure 15:
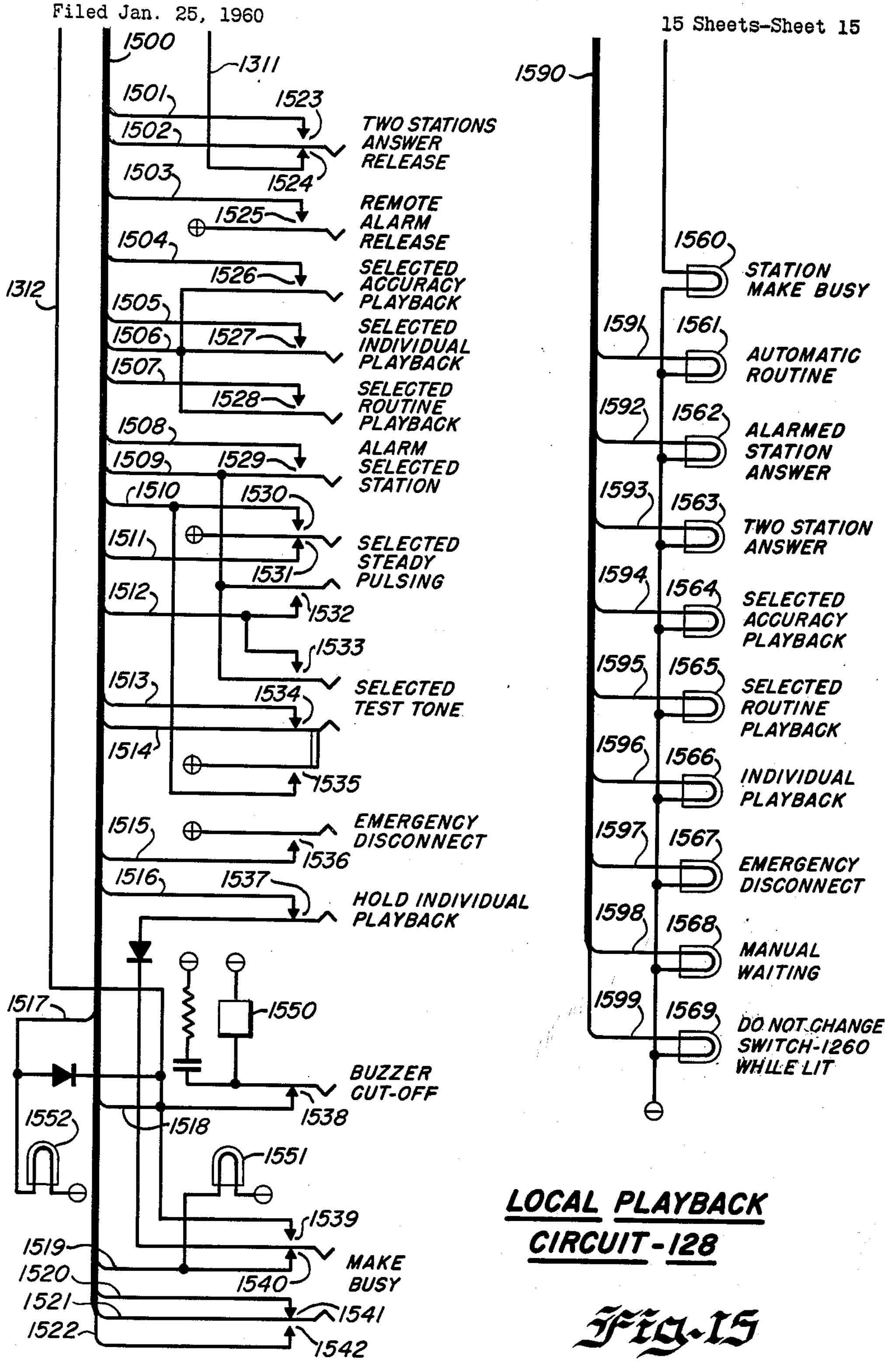

Many other objects and advantages of the present invention will become apparent from considering the following detailed description in conjunction with the drawings in which:

FIG. 1 is a block diagram of an automatic toll ticketing system embodying the present invention;

FIGS. 2–4 form a circuit diagram of a remote playback circuit included in the toll ticketing system;

FIGS. 5–15 form a circuit diagram of a local playback circuit included in the toll ticketing system; and FIG. 16 is a block diagram indicating the manner in which FIGS. 2–15 are positioned adjacent each other to form a circuit diagram of a toll ticketing system embodying the present invention.

GENERAL DESCRIPTION

Referring now more specifically to FIG. 1 of the drawings, therein is shown an automatic toll ticketing system which embodies the present invention and which includes a single local ticketing center 140 and a plurality of remote offices 100 in which items of information pertaining to toll calls are automatically collected and stored. In normal operation, the toll data collected in the plurality of remote offices, such as the office 100, is transmitted to the local ticketing center 140 at selected times of the day to provide permanent records that are used in billing subscribers. However, the system also includes means by which any selected one of the remote offices can be seized by the local ticketing center 140 for a playback operation at any desired time. The system also includes additional means by which the depletion of the storage capacity of one of the storing means in the remote office 100 automatically places the local ticketing center 140 in operation so that the data stored in the filled storage means can be immediately transmitted to the local ticketing center 140 to provide permanent records.

Each of the remote offices, such as the office 100, includes a plurality of adapter circuits 104 and 108 which form parts of switch trains for extending communication paths between calling and called subscribers such as a pair of substations "A" and "B." In order to provide means for storing data pertaining to billable calls, each of the adapter circuits is provided with an individual adapter recorder, such as a pair of adapter recorders 106 and 110. During the extension of a toll call, a toll ticketing data collecting circuit 102 is placed in operation by the seized one of the adapter circuits 104 and 108 to automatically collect and store items of information pertaining to the call in the related one of the adapter recorders 106 and 110. These recorders preferably are of the type shown in Gleason Patent No. 2,867,435 and comprise an endless loop of magnetic tape on one channel of which digital data is recorded in the form of groups of mark pulses by a mark transducing head and on a second channel of which space or control pulses are recorded by a space transducing head. The toll ticketing data collecting circuit 102 and the adapter circuits 104 and 108 preferably comprise circuits of the type disclosed in the above identified Morris et al. patent.

In order to provide means for testing the transmission facilities between the remote office 100 and the local ticketing center 140 and means for also checking the operability of many of the control and storage circuits, each of the remote offices, such as the office 100, can include a test recorder 138 in which are stored known items of information comprising a plurality of test calls. The test recorder 138 is connected to a test circuit 136 which simulates all of the playback functions of the adapter circuits 104 and 108 so as to render the test recorder 138 capable of reproducing and transmitting the known items of information stored thereon. Since the test recorder 138 does not include erasing means, the test call data remains permanently stored on the magnetic tape therein. The test recorder 138 and the test circuit 136 can be of the type shown and described in a copending application of Milton A. Clement et al., Serial No. 846,490, filed October 14, 1959.

To provide means for removing the information from the adapter recorders 106 and 110, each of the remote offices, which can be considered as comprising called stations, includes a playback control circuit 120 of the type described in detail in the above identified Morris et al. patent. The playback control circuit 120 is placed in operation under the control of the local ticketing center 140 and a remote playback circuit 122 in the remote office 100 to seize the test recorder 138 and the plurality of adapter recorders 106 and 108 in sequence in accordance with the step-by-step movement of a switching means 120*a*. The transmission of data reproduced from the adapter recorders 106 and 110 and the test recorder 138 and of control or supervisory signals between the local ticketing center 140 and the plurality of called stations, such as the one provided by the remote office 100, is accomplished over a single communication link or channel by the use of carrier signaling. Thus, each of the remote offices 100 includes a remote tone signaling circuit 124 that includes a plurality of modulators and demodulators controlled by or for controlling the remote playback circuit 122. The modulators and demodulators in the remote tone signaling circuit 124 can be of any of the types well known in the art and can comprise a modulator or demodulator for each of the control or intelligence signals or can be operated on a frequency shift basis so that a smaller number of modulator and demodulator circuits are required. In general, the signaling between the remote offices and the local ticketing center 140 is performed by the use of audible frequency tones so as to permit the use of existing telephone communication facilities. However, it is obvious that this signaling can also utilize frequencies higher than the audible frequency range.

The local ticketing center 140 includes a data register 132 for receiving and storing items of information derived from the plurality of called stations or remote offices and preferably includes data storing, computing and translating components of the type disclosed in the above identified Morris et al. patent. The output of the data register 132 is connected to an output recorder 134 which provides permanent records. The local ticketing center 140 also includes a readout control circuit 126 of the type described in detail in the above identified Morris et al. patent which controls the transfer of data between the local ticketing center 140 and the plurality of called stations provided by the remote offices. The readout control circuit 126 includes a switching means 126*a* that is operated to select toll ticketing data storing means located in the local ticketing center 140 and also a local playback circuit 128 that operates in conjunction with a local tone signaling circuit 130 to establish communication paths between the local ticketing center 140 and each of the called stations formed by the plurality of remote offices, such as the office 100. The local tone signaling circuit 130 includes modulating and demodulating components that are paired with the corresponding demodulating and modulating components in the remote tone signaling circuits 124 in the plurality of called stations or remote offices.

When a routine playback operation is performed, the local ticketing center 140 seizes each of the called stations or remote offices in sequence so that the data stored in the adapter recorders therein is transferred in sequence to the data register 132 in the output recorder 134 in the local ticketing center 140. This operation is initiated by clock controlled means at a predetermined time of day. When the readout control circuit 126 is placed in operation and the switching means 126*a* is advanced to a setting corresponding to the local playback circuit 128, this circuit is seized and initiates a calling cycle in which each of the called stations is selected in sequence and rendered effective to transmit data to the data register 132. Assuming that the system or network includes fifteen called stations or remote offices that are accessible to the local playback circuit 128, an automatic station selecting means is first advanced to a setting representing called station "1" which is assumed to be provided by the remote office 100. The local playback circuit 128 controls the local tone signaling circuit 130 so that a clutch control signal is transmitted to all of the called stations to cause their seizure. When all of the called stations are seized, the local playback circuit 128 advances a local pulsing control switch to transmit a number of clutch mark pulses representing the individial designation of the first station to be seized followed by a delay. The receipt of these clutch mark pulses in all of the called stations is effective to advance a pulsing control switch in each of the called stations to a particular setting. When these switching means advance to settings corresponding to the one station that is being called by the local ticketing center 140, the delay causes only the selected called station to return a signal to the local ticketing center 140 to advise this center that the correct station has been seized.

The local playback circuit 128 then advances the local and remote switching means to a second setting in which the selected called station returns a signal indicating that the proper station has answered. The local playback circuit 128 then advances the local pulsing control switch and the pulsing control switch in the selected station to one of a plurality of settings designating the type of operation that is to be performed. If a routine playback operation is to be performed, the switching means in the remote playback circuit 122 in the selected called station is advanced to the routine playback setting so that the playback control circuit 120 advances the switching means 120*a* to first seize the test circuit 136. This causes the test call information to be transmitted over the link including the tone signaling circuits 124 and 130. If the test call information is satisfactorily received by circuits in the readout control circuit 126 and the data register 132 that are of the type shown in the above identified Clement et al. application, the playback control circuit 120 operates to advance the switching means 120*a* to a setting in which the first idle adapter circuit, such as the circuit 104 is seized. At this time, the information stored in the adapter recorder 106 is transmitted over the signaling link to the data register 132 and the output recorder 134 in the local ticketing center 140.

Following the completion of the playback of the information in the adapter recorder 106, the switching means 120*a* is operated by the playback control circuit 120 to seize all other idle adapter circuits in the remote office 100. At the completion of this playback operation, the playback control circuit 120, and the remote playback circuit 122 are released and the local playback circuit 128 then seizes the next called station. At the completion of the playback of all of the information from all of the called stations to which the local playback circuit 128 has access, the circuit 128 is restored to a normal condition and the switching means 126*a* is advanced to interconnect the readout control circuit 126, the data register 132 and the output recorder 134 to the next source of information to be recorded. Following the completion of the recording of all of the stored information, the local ticketing center 140 is restored to a normal condition.

If, during the performance of a routine playback operation, more than one called station answers during the cycle of operation in which a selected one of the stations is being called, the local playback circuit 128 will not advance the pulsing control switches of both of the answering stations to the routine playback setting inasmuch as this would result in the concurrent transmission of information from two called offices and the consequent loss of all of this information. Accordingly, when the local playback circuit 128 receives answering signals from two or more called stations during a single cycle of the routine playback operation, the local playback circuit 128 causes the restoration of the remote playback circuits 122 in all of the called stations to a normal condition and then initiates a second cycle of operation of the pulsing control switches in the called station and the local playback circuit 128. If only the proper called office answers at this time, the routine playback operation proceeds in a normal manner. However, in the event that two or more called stations again answer during this second cycle, the called stations are all released and the pulsing control switches in the called stations and the local ticketing center 140 are restored to their normal condition. The pulsing control switches in the called station and the local playback circuit 128 are stopped in this normal setting, and an alarm indication is provided to test personnel to determine the cause of the improper operation.

Further, if no called station or a single called station that has not been selected answers during a routine playback operation, the pulsing control switches in the remote stations and the local ticketing center 140 are advanced to their normal position to terminate the cycle in which the improper response was received, and a second attempt is made to select only the proper called office. If the called office again fails to answer or if a called station other than the one selected again answers, the selected station is placed in an alarm condition. The local playback circuit 128 then restores the other called stations to their normal conditions and seizes the next called station to be played back during the routine playback operation.

When an individual or emergency playback operation becomes necessary because one or more of the adapter recorders 106 and 110 in one or more of the called stations formed by the remote offices becomes filled with items of information, the adapter circuits 104 and 108 associated with the filled recorder supples a signal to the related playback control circuit 120. This signal causes the related remote playback circuit 122 to be placed in a condition requesting an individual playback opeartion. Thus, if more than one called station has a filled adapter recorder, two or more of the remote playback circuits 122 are placed in a condition requesting an individual playback operation.

When this operating condition is established, the remote tone signaling circuits 124 connected to the operated remote playback circuits 122 transmit a mark control signal over the signaling link to the local tone signaling circuit 130. In response to the receipt of this signal, the local playback circuit 128 is controlled by the signaling circuit 130 to forward an individual playback request signal to the readout control circuit 126. This places the equipment in the local ticketing center 140 in operation so that the data register 132 and the output recorder 134 are conditioned for operation, and the readout control circuit 126 operates the switching means 126*a* to seize the local playback circuit 128. When the local ticketing center 140 has been prepared for operation, the local playback circuit 128 seizes all of the called stations and initiates movement of the pulsing control switches in the remote offices and the local ticketing center.

If only one of the called stations, such as the one provided by the remote office 100, requires an individual playback operation, only this single station answers so that the pulsing control switch in only the single office requesting the individual playback moves in synchronism with the pulsing control switch in the local playback circuit 128 to a setting representing an individual playback operation. When the pulsing control switch in the remote playback circuit 122 is advanced to the individual playback setting, the playback control circuit 120 is controlled to advance its switching means 128 to seize only the adapter circuit 104 or 108 connected to the filled adapter recorder 106 or 110. The items of information stored in the filled recorder are then played back from the called station over the transmission link to the local ticketing center 140. At the completion of the playback of the information from the filled recorder, the playback control circuit 120 is restored to its normal condition without seizing other adapter recorders except others in the seized office that are also in a filled condition at this time. When the playback control circuit 120 is restored to its normal condition, the remote playback circuit 122 is restored to its normal condition, the plurality of called offices are released, and the local ticketing center 140 is restored to its normal condition.

Alternatively, if more than one called station is requesting an individual playback operation, the pulsing control switches in the remote playback circuits 122 in the called stations and in the local playback circuit 128 are advanced through a complete cycle of operation during which the fact that more than one called station is requesting an individual playback operation is noted and the identities of these stations are stored in the local playback circuit 128. At the completion of the first cycle of operation, the local playback circuit clears the registration of the designations or identities of all of the called stations requiring individual playback other than the lowest numbered one of these stations. The local playback circuit 128 then initiates a second cycle of operation during which only the lowest numbered called station is operated to a setting corresponding to an individual playback operation and thus, the filled adapter recorders in only the lowest numbered called station are played back. Following the completion of this playback operation, all of the remote offices are released and the readout control circuit 126 is actuated to advance the switching means 126*a* to seize the next circuit to which it has access, thus releasing the local playback circuit 128 to its normal condition. When the switching means 126*a* returns to its normal condition, the persistence of the request for an individual playback operation as indicated by the continuing transmission of a mark control signal from one of the called stations actuates the readout control circuit 126 to again seize the local playback circuit 128. At this time, the local playback circuit again causes the seizure of the lowest numbered called station requiring an individual playback operation following which the switching means 126*a* is again advanced to release the local playback circuit 128 and to attempt to seize other playback circuits that may require individual playback operation. This operation continues until such time as all of the requests for an individual playback operation have been satisfied. At this time, the system is restored to a normal condition.

If, during an individual playback operation, the called station requesting the individual playback operation does not answer, the pulsing control switches in the called stations and the local center are restored to their normal conditions and a second attempt is made to seize the called station requesting the individual playback operation. If the station requesting the individual playback fails to answer during the second cycle, the called station requesting the individual playback is placed in an alarm condition. The pulsing control switches in the local ticketing center and the other called stations are then returned to a predetermined position.

The above operation takes place only when a single called station is requesting an individual playback operation and fails to answer. If, however, a plurality of stations are requesting an individual playback operation and a particular one of the plurality fails to answer, the local ticketing center 140 satisfies the individual playback requests in sequence beginning with the lowest numbered answering called station in the manner described above and makes a plurality of attempts to seize the station that fails to answer only after the requests for individual playback from the stations that can answer have been satisfied.

The local ticketing center 140 also includes circuits in the local playback circuit 128 for manually controlling a number of operations in the called stations. These circuits include means for manually selecting any desired station and for causing a playback of information therefrom. In addition, in the event that it becomes necessary to place a called station in an alarm condition in which it can not be seized during either a remote or an individual playback operation, the local playback circuit includes means for selecting the desired one of the called stations and for then advancing the pulsing control switch in the selected called station to an alarm setting. In this position, the called station is effectively disabled and can not transmit requests to or receive commands from the local ticketing center 140 until this called station has been released from the alarm condition. Thus, the local ticketing center 140 also includes means for transmitting signals over the signaling link for restoring all alarmed stations to their normal condition. The local ticketing center 140 includes various manually controlled circuits for marking called stations as busy and for transmitting tones and pulses over the common signaling link to selected ones of the called stations for test purposes.

REMOTE PLAYBACK CIRCUIT 122

A remote playback circuit similar to the circuit 122 (FIGS. 2–4) is provided in each of the called stations or remote offices, such as the office 100. The circuit 122 is seized by the local playback circuit 128 and cooperates with the connected playback control circuit 120 to connect the adapter recorders to which the switching means 120*a* of the playback control circuit 120 has access to the data register 132 and the output recorder 134 in the local toll ticketing center 140. In addition, the remote playback circuit 122 includes circuitry for placing the local ticketing center 140 in operation to seize a filled adapter recorder, such as the recorder 106, on an emergency or individual playback basis and includes further control circuits for establishing varying busy and control conditions. In general, the remote playback circuit 122 is controlled from the local playback circuit 128 by the use of a stepping switch 210 that is operated in synchronism with a corresponding switch in the local playback circuit 128. In the representative circuit operations set forth below, the called station provided by the remote office 100 is assumed to be identified as called station "1."

*Operation of the Remote Playback Circuit 122 When This Circuit is Called During a Routine Playback Operation*

When a routine playback operation is performed, all of the idle adapter recorders in the remote office 100 are seized in sequence by the playback control circuit 120 under the control of the remote playback circuit 122 so that all of the toll ticketing information stored in the remote office 100 is transmitted over the signaling link to the data register 132 and the output recorder 134 in the local toll ticketing center 140. A routine playback operation is initiated by the transmission of a clutch control signal from the local tone signaling circuit 130 to the remote tone signaling circuit 124 under the control of the local playback circuit 128. When the clutch control signal is received, ground is applied to the operating winding of a relay 410 which operates to close the plurality of contacts 411 and 413 and to open a plurality of contacts 412 and 414. The closure of the contacts 411 completes an obvious operating circuit for a relay 450 which operates to close a plurality of contacts 451, 452, 453, and 456 and to open a plurality of contacts 454, 455 and 457. The closure of the contacts 453 completes an obvious operating circuit for a relay 460 which operates to close a plurality of contacts 461, 463 and 464–467 and to open a pair of contacts 462. The closure of the contacts 465 completes a holding circuit for the relay 460 extending to ground at a pair of closed contacts 473. The closure of the contacts 461 forwards ground from a pair of normally closed contacts 217 to operate a relay 470.

In operating, the relay 470 closes a pair of contacts 471 and opens a pair of contacts 472 and the contacts 473. The opening of the contacts 473 interrupts the holding circuit for the relay 460. The closure of the contacts 471 forwards ground from the closed contacts 456 through a plurality of normally closed contacts 346 and 352 to operate a slow-to-release relay 430. In operating, the relay 430 opens a plurality of contacts 431 and 434 and closes a plurality of contacts 432 and 433.

The local playback circuit 128 next initiates movement of the pulsing control switch in the circuit 128 and applies a series of clutch mark signals to the local tone signaling circuit 130 which are transmitted over the signaling link to all of the called stations or remote offices. When the first of this series of signals is received by the remote tone signaling circuit 124, ground is forwarded to the winding of a relay 420 to operate this relay so that a plurality of contacts 421–423 are closed. The closure of the contacts 423 completes a holding circuit for the relay 430 which shunts the closed contacts 471 and which extends through the closed contacts 432. The closure of the contacts 422 forwards ground through a pair of closed contacts 347, the closed contacts 433, a pair of normally closed contacts 353, and the closed contacts 466 to an operating winding 211 of the stepping switch 210. When the first clutch mark pulse is terminated, the relay 420 releases so that the motor magnet 211 is released to advance four wipers 212–215 a single step to the first stepping position. In moving from its "home" position, the switch 210 opens a pair of off-normal contacts 217 so that the above described operating circuit for the relay 470 is opened. When this relay releases, the closure of the contacts 473 completes the above described holding circuit for the relay 460, and the opening of the contacts 471 interrupts the operating circuit for the slow-to-release relay 430.

Assuming that the first position of the switch 210 is assigned to represent the remote office 100 or the called station "1," the wiper 212 is connected to the winding of a relay 370. The stepping switch in the local playback circuit 128 has also been advanced to its first position which also represents called station "1." The local playback circuit 128 includes control circuits that are effective when the pulsing control switch in the circuit 128 has been advanced to a setting representing the desired called station, such as the called station "1," to delay the next transmission of a clutch mark pulse for a period longer than the slow-to-release interval of the relay 430. Thus, the relay 420 remains released for a period of time greater than the slow-to-release interval of the relay 430. Since the prior release of the relay 470 opens the contacts 471, the relay 430 is released at the end of its slow-to-release interval to restore its contacts to their normal positions. The closure of the contacts 434 forwards ground from the closed contacts 456 to the wiper 212. This ground is further forwarded to operate the relay 370 to provide an indication that the station called by the local playback circuit 128 is the called station "1" formed by the remote playback circuit 122 in the remote office 100.

When the relay 370 operates, a plurality of contacts 371–374 are closed. The closure of the contacts 374 completes a holding circuit for the relay 370 shunted around the contacts 434 and the wiper 212. The closure of the contacts 371 forwards ground through a pair of normally closed contacts 301 to the mark control terminal of the remote tone signaling circuit 124. In response to the receipt of this ground signal, the tone signaling circuit 124 transmits a mark control signal over the signaling link to the local tone signaling circuit 130 to indicate that the remote playback circuit 122 or the called station "1" has been seized. In response to the receipt of this signal, the local playback circuit 128 resumes the transmission of clutch mark signals to the remote tone signaling circuits 124 in all of the called stations. When the relay 420 operates in response to the receipt of the first of these additional pulses, the ground provided at the closed contacts 456 is forwarded through a plurality of closed contacts 346, 352, 423 and 372 to again operate the relay 430. The closure of the contacts 422 forwards ground through the closed contacts 347, 373, 353 and 466 to again energize the motor magnet 211. Since these two paths include the closed contacts 372 and 373 on the relay 370 and since the relays corresponding to the relay 370 in all of the other remote offices are not operated, only the called station "1" now follows the clutch mark pulses.

When the end of the clutch mark pulse releases the relay 420, the relay 430 remains operated because of its slow-to-release characteristic, and the motor magnet 211 is released to advance the wipers 212–215 to their second stepping position. Since the number of called stations accessible to the local playback circuit 128 is assumed to be fifteen, the remote tone signaling circuit 124 now receives thirteen additional ground pulses to advance the pulsing control switch 210 to its fifteenth position. During these additional steps of movement, the relays in the other called stations corresponding to the relay 370 can not be operated because the pulsing control switches in these called stations are not advanced and because the delay interval is not provided in any of these other stepping positions. However, when these other called stations are to be seized, the circuit 128 advances the pulsing control switches to the desired station selecting setting and then provides the necessary delay.

The local playback circuit 128 next transmits the pulse for advancing the stepping switch 210 to its sixteenth stepping position and then initiates movement of the switch 210 over the seventeenth to thirty-second positions in which a test is made to determine whether or not the selected called station in which the relay 370 has been operated is able to answer. Assuming that the seventeenth stepping position has been assigned to the called station "1" in the remote playback circuit 122, the operation of the stepping switch 210 to its seventeenth position moves the grounded wiper 215 into engagement with the seventeenth contact in the bank associated therewith so that ground is forwarded through a pair of normally closed contacts 351 to the space control terminal of the remote tone signaling circuit 124. This causes the circuit 124 to transmit a space control tone over the signaling link to the local tone signaling circuit 130. The receipt of the space control signal with the pulsing control switch in the playback circuit 128 in its seventeenth stepping position indicates that called station "1" has answered. When the next clutch mark signal is received by the remote tone signaling circuit 124, the relay 420 is again operated and released to advance the stepping switch 210 to its next position.

This operation continues until such time as the stepping switch has been advanced to the thirty-second stepping position in synchronism with the like movement of the pulsing control switch in the local playback circuit 128. At this time, the local playback circuit 128 delays the next transmission of a clutch mark pulse so that the relay 420 remains released for a delay period greater than the slow-to-release period of the relay 430. Thus, this relay releases to restore its contacts to their normal position. In doing so, the relay 430 closes a pair of contacts 431 so that ground is forwarded from the wiper 214 over the thirty-second contact and the closed contacts 452 and 431 to operate a relay 320. In operating, the relay 320 closes a plurality of contacts 321–325. The closure of the contacts 321 completes a holding circuit for the relay 320 extending to ground at the closed contacts 463. The closure of the contacts 322 again grounds the space control terminal of the remote tone signaling circuit 124 so that the space control tone is returned to the local tone signaling circuit 130.

In response to the receipt of the space control tone, the local playback circuit 128 returns clutch mark signals over the link to the remote tone signaling circuit 124 after the local playback circuit 128 has determined that all of the necessary conditions for initiating data transmission from the selected station have been satisfied. The clutch mark signals returned to the remote tone signaling circuit 124 control the operation of the relay 420 so that the stepping switch 210 is now advanced to its thirty-ninth stepping position. When the switch 210 and the pulsing control switch in the local playback circuit 128 have reached their thirty-ninth stepping position, the transmission of the next clutch mark pulse is again delayed so that the relay 420 remains released for a longer period of time than the slow-to-release interval of the relay 430 so that this relay again releases. In releasing, the relay 430 closes the contacts 434 to forward ground from the closed contacts 456 to the wiper 213 of the stepping switch 210. This ground is further forwarded over the thirty-ninth contact and through a blocking diode and the closed contacts 324 to operate a playback relay 340. This ground is also forwarded over a conductor 385 and a cable 380 to the playback control circuit 120 to advise this circuit that it is to be seized.

In operating, the playback relay 340 closes a plurality of contacts 341–345, 348 and 349 and opens the contacts 346 and 347. The closure of the contacts 348 completes a holding circuit for the relay 340 extending to ground at a pair of closed contacts 335. The opening of the contacts 347 interrupts the above described operating circuit for the motor magnet 211 so that the stepping switch 210 can not be operated at this time. The opening of the contacts 346 prevents reoperation of the relay 430. The closure of the contacts 341–344 connects a pair of modulators in the remote tone signaling circuit 124 to the output of the playback control circuit 120 so as to condition the remote tone signaling circuit 124 for transmitting mark and space pulse information derived from the magnetic tapes in the adapter recorders, such as recorder 106, to the data register 132 and the output recorder 134 in the local ticketing center 140. The closure of the contacts 345 connects a clutch conductor 381 which extends over a cable 380 to the playback control circuit 120 to the open contacts 421 controlled by the relay 420.

When the readout control circuit 126, the data register 132 and the output recorder 134 in the local ticketing center 140 have been conditioned for operation, a steady or continuous clutch mark signal is returned to the remote tone signaling circuit 124 from the local tone signaling circuit 130 so that the relay 420 is again operated. When the contacts 421 are closed, ground is forwarded over the closed contacts 345 and the conductor 381 to the playback control circuit 120. This places the playback control circuit 120 in operation so that the switching means **120*a* associated therewith connects the playback control circuit 120 to the test circuit 136 and the test recorder 138. The test circuit 136 is of the type disclosed in the above identified and copending application of Milton A. Clement et al. As disclosed therein, the test circuit 136 includes circuitry simulating all of the playback functions of one of the adapter circuits, such as the adapter circuit 104. In response to seizure, the test circuit 136 places the test recorder 138 in operation so that mark and space pulse information representing known items of information is forwarded through the closed contacts 341–344 to the remote tone signaling circuit 124. This information is relayed over the transmission link to the local tone signaling circuit 130 and is applied to the data register 132. When each group of known items representing the data for one test call has been received, the circuit 126 terminates the transmission of the clutch mark signal so that the relay 420 releases to remove ground from the conductor 381. This momentarily arrests movement of the tape in the recorder 138** to stop data transmission until the preceding data has been processed.

If the test call information is satisfactorily received in the local ticketing center 140, the clutch mark signal is reapplied to again cause the operation of the relay 420. The operation of this relay closes the contacts 421 to again forward ground over the conductor 381 to the playback control circuit 120. This ground reinitiates operation of the test recorder 138 to transmit items of information pertaining to succeeding test calls over the link to the local ticketing center 140. When all of the test call information has been received and successfully processed, the test circuit 136 cooperates with the playback control circuit 120 to advance the switching means 120*a* to seize the first idle adapter circuit.

Assuming that the adapter circuit 104 is the first idle adapter circuit encountered by the switching means 120*a*, this circuit and the adapter recorder 106 are seized by the playback control circuit 120, and the ground signal provided on the conductor 381 is forwarded over a wiper 120*b* through the adapter circuit 104 to a drive means 220 in the adapter recorder 106. This renders the drive means effective so that a loop of magnetic tape 226 in the adapter recorder 106 is moved relative to a pair of mark and space transducing heads 222 and 224. This causes the reproduction of the stored mark and space pulse information which is transmitted through the closed contacts 341–344 to the remote tone signaling circuit 124. The modulators in the signaling circuit 124 respond to the received mark and space pulse information to transmit corresponding information over the transmitting link to the local tone signaling circuit 130. This received information is stored in the data register 132 and controls the production of permanent records by the output recorder 134. When all of the information stored in the adapter recorder 106 has been transmitted, the switching means 120*a* is operated by the playback control circuit 120 to release the adapter circuit 104 and to seize the next idle adapter circuit. This operation continues until such time as all of the information stored in all of the idle adapter recorders to which the switching 120*a* has access has been played back to the local ticketing center 140.

When all of the necessary information has been transmitted, the playback control circuit 120 applies ground to a conductor 382 to operate a release relay 300. In operating, the relay 300 opens the contacts 301 and a plurality of other contacts 302 and 304 and closes a pair of contacts 303. The closure of the contacts 303 completes a holding circuit for the relay 300 extending to ground at the closed contacts 323. The opening of the contacts 301 removes ground from the mark control terminal of the remote tone signaling circuit 124 so that the continuous mark signal is no longer transmitted over the link to the local tone signaling circuit 130. The termination of the transmission of the mark signal operates the local playback circuit 128 so that the pulsing control switch in the local playback circuit 128 is advanced toward its normal position. During this homing of the pulsing control switch in the local playback control circuit 128, the transmission of the clutch control and clutch mark signals by the local tone signaling circuit 130 is terminated so that the relays 410 and 420 are released. When the relay 420 releases to open the contacts 421, ground is removed from the clutch conductor 381. The release of the relay 410 interrupts the operating circuit for the relay 450 and completes an operating circuit for a relay 440. The operation of the relay 440 serves no useful function at this time.

When the relay 450 releases to close the contacts 457 ground is forwarded through the closed contacts 467, 325, and 349 to operate a relay 330. In operating, the relay 330 closes a plurality of contacts 332, 333, 334 and 336 and opens a pair of contacts 331 and the contacts 335. The opening of the contacts 335 interrupts the holding circuit for the relay 340 so that this relay releases. In releasing, the relay 340 disconnects the mark and space pulse transmission paths from the input of the remote tone signaling circuit 124, opens another point in the path to the clutch conductor 381, and interrupts the above described operating circuit for the relay 330 so that this relay releases.

In releasing, the relay 450 also opens the contacts 456 to interrupt the holding circuit for the relay 370 so that this relay releases. Further, the release of the relay 450 closes the contacts 454 and 455 to complete an energizing circuit for the motor magnet 211. This circuit extends from ground through the closed contacts 454, 472, 401, 455, 353 and 466. In operating, the motor magnet 211 opens a pair of interrupter springs 216 to move a ground shunt from a relay 400 so that this relay operates to open the contacts 401.

When the contacts 401 are opened, the above described energizing circuit for the motor magnet 211 is interrupted so that this magnet releases to advance the wipers 212–215 a single step and to close the contacts 216. When the contacts 216 are closed, the ground shunt is again applied around the winding of the relay 400 so that this relay releases to close the contacts 401. When the contacts 401 are closed, the motor magnet 211 is again energized to open the interrupter contacts 216. The opening of these contacts again operates the relay 400 so that the contacts 401 are opened to release the motor magnet 211. In this manner, the pulsing control switch 210 is advanced step-by-step until the switch is advanced to its normal or "home" position. At this time, the off-normal contacts 217 are closed to again operate the relay 470.

When the relay 470 operates, the opening of the contacts 472 interrupts the above described path for operating the relay 400 and the motor magnet 211. The opening of the contacts 473 interrupts the holding circuit for the relay 460 so that this relay releases. When the relay 460 releases, the opening of the contacts 464 removes the last source of ground from the space control terminal of the remote tone signaling circuit so that a space control signal is no longer transmitted over the link to the local tone signaling circuit 130. The termination of the transmission of the space control signal advises the local playback circuit 128 that the pulsing control switch in the previously seized called station has been restored to normal. The opening of the contacts 463 removes holding ground from the relay 320 so that this relay releases. The opening of the contacts 461 interrupts the operating circuit for the relay 470 so that this relay releases. When the relay 320 is released, the opening of the contacts 323 interrupts the holding circuit for the release relay 300 so that this relay releases. The remote playback circuit 122 has now been restored to a normal condition.

*Operation of the Remote Playback Circuit 122 When a Different Station Is Called by the Local Playback Circuit 128*

When the local playback circuit is calling a station other than the called station "1" provided by the remote playback circuit 122 during a routine playback operation, the circuit 122 is seized in the manner described above by the operation of the relays 410 and 450 and the relays controlled thereby. When clutch mark signals are supplied to the remote tone signaling circuit 124, the relay 420 is operated and released to advance the switch 210 to a position corresponding to the station that is being called. At this time, the delay is provided which permits the release of the relay 430. However, since the wiper 212 is now in a position engaging a contact that is not connected to the relay 370, the relay 370 is not operated, and subsequent operation and release of the relay 420 is not effective to advance the stepping switch 210. Thus, only the pulsing control switch in the seized called station returns a seizure signal, is advanced to return an answer signal, and is again advanced to a position in which the routine playback operation takes place.

At the conclusion of the routine playback operation, the local playback circuit 128 again removes the clutch control signal so that the relay 410 is released. When this relay is released, the operating circuit of the relay 450 is interrupted. When the relay 450 releases at the end of its slow-to-release interval, the closure of the contacts 454 and 455 again completes the above described operating circuit for the motor magnet 211 so that this relay operates to again open the interrupter contacts 216. When the contacts 216 are opened, the relay 400 is again operated to open the contacts 401. This releases the motor magnet 211 so that the stepping switch 210 is advanced a single step. The motor magnet 211 and the relay 400 operate in the manner described above to return the switch 210 to its normal "home" position.

When its "home" position is reached, the off-normal contacts 217 are again closed to cause the operation of the relay 470. When this relay operates, the opening of the contacts 472 again interrupts the operating circuit for the motor magnet 211 and the relay 400, and the opening of the contacts 473 again interrupts the holding circuit for the relay 460. When the relay 460 is released, the opening of the contacts 461 releases the relay 470, and the remote playback circuit 122 has now been restored to its normal condition. Incident to the restoration of the remote playback circuit 122 to its normal condition, ground is again removed from the space control terminal of the remote tone signaling circuit 124 so that this signal is no longer received from the local tone signaling circuit 130. When all of the called stations have been restored to their normal conditions, the local playback circuit 128 is enabled to again cause the seizure of all of the called stations in the event that additional called stations still remain to be played back during a routine playback operation. The reseizure of the remote playback circuit 122 takes place in the manner described above.

*Operation of the Remote Plyaback Circuit 122 During an Individual Playback Operation*

When one or more adapter recorders in one or more of the called stations in the remote offices become filled with items of information, it is desirable to immediately cause the seizure of these filled recorders by the local ticketing center 140 so that the information in these adapters is played back to permit the connected adapter circuit to be restored to service. Thus, during this emergency or individual playback operation, only those called stations have filled recorders and only the filled recorders in a seized station are played back. However, this individual playback operation is not permitted to interrupt a routine playback operation.

When one of the adapter recorders, such as the recorder 106, becomes filled with items of information, the corresponding adapter circuit 104 forwards a signal to the related playback control circuit 120 so that this circuit is operated to apply ground to an emergency start conductor 383 that extends to the winding of a relay 360. The relay 360 operates to close a plurality of contacts 361 and 362. The closure of the contacts 362 connects the contact in the sixteenth position of the wiper 212 to the winding of the relay 370. The closure of the contacts 361 forwards ground from the closed contacts 462 through the closed contacts 301 to the mark control terminal of the remote tone signaling circuit 124. This operates the circuit 124 to transmit a mark control tone over the transmission link to the local tone signaling circuit 130. The receipt of this signal by the local playback circuit 128 prepares the readout control circuit 126 and the local playback circuit 128 for an individual playback operation.

Incident to this conditioning operation, the local tone signaling circuit 130 supplies a seizure or clutch control signal to all of the called stations so that the relay 410 in the remote playback circuit 122 and the corresponding relays in the other called stations are operated. The operation of the relay 410 performs the same functions described above during a routine playback operation. In addition, the operation of the relay 460 opens the contacts 462 to remove the individual playback request provided by the transmitted mark control signal. The local playback circuit 118 now causes the transmission of sixteen clutch mark pulses without a delay period separating any of these pulses inasmuch as this is not a routine playback operation and no particular one of the called stations is to be seized during the first fifteen steps of operation. When the stepping switch 210 in following the series of sixteen clutch mark pulses advances to its sixteenth position, the local playback circuit 128 produces a delay preceding the seventeenth clutch mark pulse which permits the relays 420 and 430 to release. When the relay 430 releases, the closure of the contacts 434 forwards ground through the wiper 212, the sixteenth contact in the related contact bank, and the closed contacts 362 to operate the relay 370. Thus, the relay 370 and the corresponding relays in all of the called stations requiring an individual playback operation are operated. However, in the remaining called stations, the relays corresponding to the relay 370 are not operated and the pulsing control switches in these stations are not advanced beyond the sixteenth position at this time.

The operation of the relay 370 performs the same functions described above so that the following sixteen clutch mark pulses transmitted by the local playback circuit 128 advance the stepping switch 210 and the similar switches in all of the called stations needing an individual playback to their thirty-second stepping positions. During this movement from the seventeenth to thirty-second position, the grounding of the space control terminal of the remote tone signaling circuit 124 in the seventeenth stepping position causes the transmission of the space control tone to the local tone signaling circuit 130 to advise the local playback circuit 128 that the remote playback circuit 122 or the called station "1" is one of those requiring an individual playback operation. Similarly, a burst of space control tone is returned to the local playback circuit 128 in those other positions of the pulsing control switches individually corresponding to the other called stations requiring an individual playback operation.

If more than one of the called stations answers during the movement of the pulsing control switches in the local playback circuit 128 and the called stations from the seventeenth to the thirty-first positions, more than one station answer relay is operated in the local playback circuit 128. If more than one station answer relay is operated, the pulsing control switch in the circuit 128 is returned to its normal "home" position and the transmission of the clutch control signal to all of the remote called offices is terminated so that all of the pulsing control switches in the called stations are restored to their normal "home" positions. This causes the restoration of the called stations to a normal condition except that the operated relays 360 remain operated to supply the individual playback demand when the contacts 462 are closed.

When the pulsing control switch in the local playback circuit 128 reaches its "home" position, all but the lowest numbered station answer relay is released so as to mark only the lowest numbered called station for an individual playback operation during the next cycle of operation of the pulsing control switch in the local playback control 128. The local playback circuit 128 then initiates pulsing so that the pulsing control switches in the circuit 128 and the called stations are advanced step-by-step. When the pulsing control switch in the local playback control circuit 128 reaches the position marked by the single operated station answer relay representing the lowest numbered one of the called stations requiring an individual playback, a delay period before the transmission of the next clutch mark pulse is provided. This permits the relays 430 in all of the called stations to release. When the relay 430 in the remote playback circuit 122, which is the lowest numbered of the called stations, releases, the closure of the contacts 434 again grounds the wiper 212 so that the relay 370 is reoperated. The operation of the relay 370 performs the same functions described above including the preparation of the pulsing path for the motor magnet 211. In all of the other called stations, the relays 370 are not operated inasmuch as the pulsing control switches in these stations are not in positions in which the wipers 212 are connected to the relays 370. Thus, when the clutch mark signals are again transmitted by the local playback control 128, only the stepping switch 210 is advanced, and the remainder of the pulsing control switches in the other called station remain in a position representing the called station "1." As the switch 210 passes the seventeenth position, a space control answer signal is returned to the circuit 128 in the manner described above.

When the stepping switch 210 in called station "1" reaches its thirty-second position, the local playback control circuit 128, which is also in its thirty-second position, provides a delay so that the relay 320 is operated over the above described circuit. The operation of the relay 320 performs the functions described above.

After the delay interval, the local playback control circuit 128 advances its pulsing control switch and transmits clutch mark pulses so that the switch 210 is advanced to its thirty-seventh position in which a delay interval is provided. In the thirty-seventh position, ground is forwarded over the wiper 213 to the winding of the playback relay 340 so that this relay operates to perform the functions described above. The ground forwarded to the winding of the relay 340 is also returned over a conductor 384 to the playback control circuit 120 to advise the playback control circuit 120 that the remote playback circuit 122 is ready to initiate the requested individual or emergency playback operation. The relay 360 is also released by the circuit 120.

This operation is performed in the same manner as the routine playback operation except the switching means 120a is operated by the playback control circuit 120 to seize only those adapter circuits having filled adapter recorders. When the playback operation is completed, the playback control circuit 120 again grounds the conductor 382 so that the release relay 300 is operated. The operation of the release relay restores the remote playback circuit 122 to its normal condition in the manner described above during which the stepping switch 210 is advanced from its thirty-seven position to its normal "home" position. During this resetting operation, ground is removed from the mark control terminal of the remote tone signaling circuit 124 so that the pulsing control switch in the local playback control circuit 128 is advanced toward its "home" position. When this switch reaches its next to the last position, the clutch control signal is removed by the local tone signaling circuit 130 so that all of the remote playback circuits in all of the called stations return the pulsing control switches therein to their normal positions. In all of the stations except the called station "1" represented by the remote playback circuit 122, the pulsing control switches similar to the switch 210 are advanced to their "home" position from a setting corresponding to that of the called station that was previously played back. In the illustrative example set forth above, the remote playback circuit 122 in called station "1" was played back. Thus, the pulsing control switches similar to the switch 210 are advanced from their first stepping position to their "home" position.

When all of the called stations have been returned to normal, the pulsing control switch in the local playback circuit 128 is advanced to its "home" position and the readout control circuit 126 is operated to advance its switching means 126a to seize the next circuit to which it has access. Following the completion of the playback of all of the other circuits that may require an emergency or individual playback, such as local playback control circuits in the ticketing center 140, the readout control circuit 126 returns the switching means 126a to its "home" position. Since more than one of the called offices has placed a request for an individual playback operation, the readout control circuit now operates the switching means 126a to again seize the local playback circuit 128. The local playback circuit 128 now proceeds to seize the remaining single or next lowest numbered called station requiring an individual playback. This operation in which only a single called station is individually played back continues until such time as all requests for individual playback operation are satisfied. At this time, the readout control circuit 126 and the local playback circuit 128 are restored to a normal condition.

*Operation of the Remote Playback Circuit 122 to Select the Test Recorder 138 for a Playback Operation*

In order to test the operativeness of the remote playback circuit 122, the remote tone signaling circuit 124, the local tone signaling circuit 130, the readout equipment in the local ticketing center, and the transmission link between the remote office 100 and the local ticketing center 140, it is desirable to provide means by which test personnel can cause the transmission of only the test data stored in the test recorder 138 over the link to the data register 132 and the output recorder 134 in the local ticketing center 140. To initiate this operation, the test personnel manually selects a particular called station, such as the called station "1," and then initiates an operation in which only the test recorder 138 is seized. When the local playback circuit 128 is placed in operation in this manner, all of the called stations are seized in the manner described above, and the local playback circuit 128 provides a delay in the advance of the pulsing control switches in a position corresponding to the desired called station.

If the called station "1" is selected, a delay is provided when the switch 210 in its first stepping position so that the relay 370 is operated to perform the functions described above. The operation of the relay 370 returns the mark control tone to the local tone signaling circuit 130 and the local playback circuit 128 to advise these circuits that the selected called station has been seized. The release of the relay 430 in the other called stations prevents the pulsing control switches in these other stations from following additional clutch mark signals. Thus, when the local playback circuit 128 again transmits signals, only the switch 210 and the pulsing control switch in the local playback circuit 128 are advanced to the seventeenth position. In this position, another delay is provided so that a burst of space control tone is returned to the local playback circuit 128 to advise this circuit that the seized station has answered. After this delay interval, the switch 210 and the pulsing control switch in the local playback circuit 128 are advanced to the thirty-second position in which another delay interval is provided. This delay interval causes the operation of the relay 320 in the manner described above.

At the end of the delay period causing the operation of the relay 320, clutch mark signaling is initiated so that the local center pulsing control switch and the stepping switch 210 are advanced to their forty-first positions. At this time, another delay period is provided so that when the relay 430 releases to close the contacts 434, the ground provided on the wiper 213 is forwarded to the operating winding of a relay 310 to operate this relay. The operation of the relay 310 closes a plurality of contacts 311 and 312. The closure of the contacts 311 again applies ground to the conductor 385 so that the playback control circuit 120 is conditioned to perform a routine playback operation in which the switching means 120a is operated to a setting in which the test circuit 136, which occupies the first position on the switching means 120a, is seized. The closure of the contacts 311 also forwards ground through the closed contacts 324 so that the playback relay 340 is operated to perform the functions described above.

When the local playback circuit 128 has been conditioned to receive the test call information, a steady clutch mark signal is returned to operate the relay 420 so that the contacts 421 are closed to forward ground through the closed contacts 345 to the clutch conductor 381. This conductor extends to the playback control circuit 120 and places this circuit in operation so that the switching means 120*a* advances to its first position in which the test circuit 136 is seized. The test circuit 136 now initiates the transmission of the test call data comprising known items of information over the remote tone signaling circuit 124, the signal transmission link, and the local tone signaling circuit 130 to the data register 132 and the output recorder 134. The readout control circuit 126 operates to determine the accuracy of the transmission of this information in the manner described in detail in the above identified Clement et al. application.

Upon completion of the transmission of all of the test call information from the test recorder 138, the test circuit 136 forwards ground through the playback control circuit 120 to a conductor 386. This ground is returned through the closed contacts 312, 325 and 349 to operate the relay 330. When the relay 330 operates at this time, the opening of the contacts 335 interrupts the holding circuit for the playback relay 340, but this relay remains operated inasmuch as the switch 210 remains in the forty-first position to maintain the contacts 311 in a closed condition. Thus, the initial operating circuit for the relay 340 remains completed. Further, when the relay 330 operates, the closure of the contacts 333 grounds a conductor 387. The grounding of the conductor 387 at this time advises the playback control circuit 120 that the switching means 120*a* is to be immediately returned to its normal "home" position without seizing any of the adapter circuits. Thus, only the test information stored in the recorder 138 is transmitted to the local ticketing center 140 at this time.

As the playback control circuit 120 returns the switching means 120*a* to its normal position, ground is removed from the conductor 386 and ground is again applied to the conductor 382 so that the release relay 300 is operated. The operation of the relay 300 performs the same functions described above with certain exceptions. The opening of the contacts 304 and the removal of ground from the conductor 386 release the relay 330. The release of the relay 330 removes ground from the homing conductor 387. The remote playback circuit 122 now restores to its normal condition in the manner described above at the conclusion of the routine playback operation with certain exceptions. When the relay 450 releases, the opening of the contacts 456 release the relay 310 rather than the relay 340. Further, the reoperation of the relay 330 during the restoration of the remote playback circuit 122 to its normal condition opens the contacts 335 to interrupt the holding circuit for the playback relay 340. Inasmuch as the relay 310 is now released, the opening of the contacts 335 releases the relay 340.

*Manually Placing the Remote Playback Circuit 122 in An Alarm Condition From the Local Playback Circuit 128*

Under certain conditions, it is desirable to place a selected one of the remote playback circuits or called stations in an alarm condition under the control of the local playback circuit 128 in the local ticketing center 140. When this is to be done, the test personnel manually selects a particular one of the called stations, such as the called station "1." The local playback circuit 128 is placed in operation so that all of the called stations are seized by the transmission of the clutch control signal, and clutch mark signals are then transmitted with a delay in the position corresponding to the called station. If the remote playback circuit 122 is to be alarmed, a delay is provided following the transmission of the first and seventeenth clutch mark pulses. Thus, all of the other called stations remain in their first stepping position while the switch 210 is advanced to its thirty-second position, the relay 370 being operated in the first position in the manner described above. During the movement of the switch 210 to its seventeenth position, a burst of space control signal is returned to again signify that the remote playback circuit 122 or called station "1" has answered.

When the stepping switch 210 and the pulsing control switch in the local playback circuit 128 advance to their thirty-second positions, a delay is again provided so that the relay 320 is operated. At the end of this delay period, the pulsing control switch in the local playback circuit 128 and the switch 210 are advanced to the thirty-fourth position and another delay period is provided. When the relay 430 is released by this delay period, ground is forwarded over the wiper 213 to the winding of a relay 350 so that this relay operates to open the contacts 351, 352, 353 and 356 and to close a plurality of contacts 354 and 355.

The closure of the contacts 355 completes a holding circuit for the relay 350 extending to ground at a pair of closed contacts 442. The opening of the contacts 356 interrupts the holding circuit for the relay 370 so that this relay releases to restore its contacts to their normal positions. This removes the mark control signal from the circuit 124. The opening of the contacts 351 removes ground from the space control terminal of the remote tone signaling circuit 124 so that space control signals can no longer be transmitted to the local ticketing center 140 from this station.

When the pulsing control switch in the local playback circuit 128 is advanced to its thirty-fourth stepping position, the alarm relay representing the remote playback circuit 122 is operated, and this pulsing control switch is then advanced to its "home" position. Incident to these operations, the transmission of the clutch control signal is terminated so that all of the other called stations except the one that has been placed in an alarm condition step their pulsing control switches to their "home" positions and restore the related remote playback circuits to their normal condition. When the relay 410 in the remote playback circuit 122 is released by the removal of the clutch control signal, the closure of the contacts 414 completes one holding circuit for the relay 350. The closure of the contacts 442 when the relay 440 releases provides a second holding circuit. Thus, the remote playback circuit 122 remains in this condition with the relays 320, 350 and 460 in an operated condition until such time as the remote playback circuit 122 is released from the alarm condition.

It should be noted that with the remote playback circuit 122 in an alarm condition, the operated condition of the relays 320, 350 and 460 effectively prevents the remote playback circuit 122 from answering any calls, from applying ground to the mark control or space control terminals of the assoicated remote tone signaling circuit 124, or from following any of the clutch mark signals transmitted by the local tone signaling circuit 130. Thus, normal routine and emergency playback operations can be performed by the local playback circuit 128 that will control all of the called stations except those placed in an alarm condition.

*Manually Releasing the Remote Playback Circuit 122 From an Alarm Condition*

When the remote playback circuit 122 is to be released from an alarm condition, the test personnel in the local ticketing center 140 manually selects the called station "1" for seizure and initiates operation of the local playback circuit 128 so that a series of clutch control pulses are transmitted by the local tone signaling circuit 130 to all of the called stations. In all of the called stations that are not in an alarm condition, the pulsing of the clutch control terminal by their corresponding remote tone signaling circuits 124 causes the operation and release of the relays corresponding to the relay 410, but produces no other useful function. However, in the remote playback circuit 122, the first clutch control pulse operates the relay 410 so that the contacts 411 and 413 are closed and the contacts 412 and 414 are opened. The closure of the contacts 411 causes the operation of the relay 450 so that the contacts 451, 452, 453, and 456 are closed and the contacts 454, 455 and 457 are opened. The closure of the contacts 453 operate the relay 460. The closure of the contacts 451 prepares the operating circuit for the relay 440. The first clutch control pulse is now removed so that the relay 410 releases to restore its contacts to their normal positions. The closure of the contacts 412 operates the relay 440 so that the contacts 441 are closed and the contacts 442 are opened. The opening of the contacts 442 does not release the relay 350 because the contacts 414 are closed at this time.

The second clutch control pulse is now supplied to the remote tone signaling circuit 124 so that the relay 410 is again operated to close the contacts 411 and 413 and to open the contacts 412 and 414. The relay 450 does not release before the reoperation of the relay 410 because its slow-to-release interval is longer than the interval between successive clutch control pulses. The closure of the contacts 411 completes the energizing circuit for the relay 450 to maintain this relay operated. The closure of the contacts 413 forwards ground through the closed contacts 441, 354 and 466 to energize the motor magnet 211. The opening of the contacts 414 removes the last source of holding ground extending through the closed contacts 355 for maintaining the relay 350 operated. However, since the stepping switch 210 is still in the thirty-fourth stepping position, the closing of the contacts 456 forwards ground over the closed contacts 434 and the wiper 213 to maintain the relay 350 operated. The opening of the contacts 412 also interrupts the operating circuit for the relay 440, but the slow-to-release delay of this relay is greater than the length of the clutch control pulses so that the relay 440 does not release at this time.

When the second clutch control pulse is terminated, the relay 410 again releases to close the contacts 412 and 414. The closure of the contacts 414 provides holding ground to the contacts 355 for maintaining the relay 350 operated. The opening of the contacts 413 interrupts the above described energizing circuit for the motor magnet 211 so that this magnet releases to advance the wipers 212–215 to the thirty-fifth stepping position. The closure of the contacts 412 again completes the operating circuit for the relay 440 to maintain this relay operated.

When the third clutch control pulse is received by the remote tone signaling circuit 124, the relay 410 is again operated to open the contacts 414 and 412 and to close the contacts 411 and 413. The closure of the contacts 413 again energizes the motor magnet 211, and the opening of the contacts 414 interrupts the holding circuit for the relay 350 so that this relay is now released because the stepping switch 210 has been advanced to its thirty-fifth stepping position. When this relay releases, its contacts are restored to their normal positions, and the ground supplied through the contacts 354 is removed from the motor magnet 211 so that the switch 210 advances to its thirty-sixth position.

The third clutch control pulse is now terminated so that the relay 410 releases. This relay is now operated and released a number of additional times determined by the period during which clutch control pulsing is maintained by the local playback circuit 128. However, this continued pulsing serves no useful function other than to maintain the slow-to-release relays 440 and 450 operated. After a predetermined period, the local playback circuit 128 terminates the transmisison of the clutch control pulses so that the relay 410 releases and remains released.

After its slow-to-release interval, the relay 450 releases to restore its contacts to their normal condition. The closure of the contacts 454 supplies ground to the space control terminal of the circuit 124 to indicate that the switch 210 is off-normal. The opening of the contacts 451 interrupts the circuit for the relay 440, which does not release at this time due to its slow-to-release characteristic. The opening of the contacts 456 removes ground from the wipers 212 and 213, and the closure of the contacts 454 and 455 completes an energizing circuit for the motor magnet 211, which in operating, opens the interrupter contacts 216 so that the relay 400 operates to open the contacts 401. The opening of the contacts 401 releases the motor magnet 211 so that the stepping switch 210 is advanced to its thirty-seventh position. However, the playback relay 340 is not operated because of the released condition of the relay 450.

When the motor magnet 211 is released the interrupter contacts 216 are again closed to provide a shunt around the relay 400 so that this relay releases to close the contacts 401. The stepping switch 210 is now pulsed to its normal or "home" position in the manner described above. During this return movement, the delay interval of the relay 440 expires so that this relay is released. However, the opening of the contacts 441 and the closure of the contacts 442 produces no useful function.

When the switch 210 is returned to its normal "home" position, the contacts 217 are again closed to operate the relay 470 which prevents further energization of the motor magnet 211 and interrupts the holding circuit for the relay 460 so that this relay releases. When the relay 460 releases, the opening of the contacts 463 releases the relay 320, and the opening of the contacts 464 removes ground from the space control terminal of the remote tone signaling circuit 124 so that a space control signal is no longer transmitted to the local tone signaling circuit 130. This advises the local playback circuit 128 that the remote playback circuit 122 in called station "1" has been restored to its normal condition. This permits the local playback circuit 128 to restore to its normal condition. Since only the remote playback circuits in an alarm condition are capable of controlling the movement of the switch 210, the termination of the transmission of the clutch control pulses by the local playback circuit 128 permits the relays in the called stations that are not in an alarm condition, that correspond to the relays 410, 440, 450, 460 and 470, to restore to a normal condition so as to place these called stations in their normal condition.

*Operation of the Remote Playback Circuit 122 When More Than One Called Station Answers During a Routine Playback Operation*

If more than one called station answers during a routine playback operation, the local playback circuit 128 will not initiate the playback operation, but will make a second attempt to seize only the desired called station. If the second attempt to obtain the called station results in more than one called station answering, an alarm indication is produced in the local playback circuit 128, and this circuit remains in an operated condition until restored by test personnel.

When a routine playback operation is initiated, the remote playback circuit 122 is seized in the normal manner and the stepping switch 210 is advanced to its thirty-second position in the manner described above so that the relay 320 is operated. If more than one called station has answered the routine playback operation, the stepping switch corresponding to the switch 210 in the other answering called station is also advanced to its thirty-second position so that the relay therein corresponding to the relay 320 is also operated. If the local playback circuit 128 detects the answer of more than one called station during the routine playback operation, the local tone signaling circuit 130 transmits a series of clutch mark pulses sufficient to advance the pulsing control switches in the answering called stations to their fifty-first position.

It should be noted that during this operation, the transmission of the clutch mark pulses to operate and release the relay 420 causes the repeated closure of the contacts 423 so that ground is forwarded from the closed contacts 456 through the closed contacts 346 and 352 to the operating winding of the relay 430 through either of the contacts 372 or 432. Thus, the relay 430 remains operated continuously during the interval in which the stepping switch 210 is advanced from the thirty-second stepping position to the fifty-first position. This is true because there are no delays provided in the transmission of the clutch mark pulses, and the slow-to-release interval of the relay 430 bridges the receipt of successive clutch mark pulses by the relay 420. Since the relay 430 remains operated, the contacts 434 are closed so that ground can not be applied to the wiper 212 and 213. Thus, none of the relays 350, 340 and 310 can be operated during this movement of the switch 210.

The pulsing control switch in the local playback circuit 128 advances in step with the effective ones of the pulsing control switches in the called stations so that the transmission of the clutch control signal is terminated when the pulsing control switch in the playback circuit 128 reaches its fifty-first position. The termination of the transmission of the clutch control signal permits the release of the relay 410 so that the operating circuit for the relay 450 is interrupted. After its slow-to-release interval, this relay releases to release the relays 370 and 430. In addition, when the contacts 454 and 455 are closed by the release of the relay 450, the motor magnet 211 is energized. When the motor magnet 211 is energized, the interrupter contacts 216 are opened so that the relay 400 operates to open the contacts 401. This releases the motor magnet 211 so that the stepping switch 210 advances to its normal position and the contacts 216 close to release the relay 400.

When the switch 210 advances to its normal condition, the contacts 217 are again closed to operate the relay 470. The operation of this relay interrupts the holding circuit for the relay 460 so that this relay releases. The operation of the relay 470 also interrupts the pulsing path to the motor magnet 211 so that the stepping switch 210 can not be advanced from its "home" position at this time. The release of the relay 460 causes the release of the relay 470. The remote playback circuit 122 has now been restored to its normal condition.

The local playback circuit 128 makes a second attempt to obtain the answer of only the proper called station and if only one station answers, the routine playback operation takes place in the normal manner described above. However, if two or more called stations answer during this second cycle of operation of the pulsing control switch in the local playback circuit 128, the pulsing control switches in the local playback circuit and the called stations are again restored to a normal condition. The circuit 128 produces an indication of the improperly answering station and does not operate further until returned to service by test personnel.

*Operation of the Remote Playback Circuit 122 During an Emergency Disconnect*

Under certain operating conditions, such as errors in the transmission of information from a seized called station to the local ticketing center 140, it is necessary for test personnel at the local ticketing center to immediately disconnect the seized adapter and to prevent further playback of information from the selected called station. To accomplish this, the test personnel operates an emergency disconnect key in the local playback circuit 128 so that the transmission of clutch control signals by the local tone signaling circuit 130 is terminated. This causes the release of the relays 410 and 450 which are normally maintained operated during the playback condition. In releasing, the relay 450 closes the contacts 457 so that ground is forwarded through the closed contacts 467, 325 and 349, which contacts are maintained closed during a playback operation to the relay 330. This relay operates to open the contacts 331 and 335 and to close the contacts 332, 333, 334 and 336.

The closure of the contacts 336 completes a holding circuit for the relay 330 extending to ground at the closed contacts 304. The contacts 304 are closed this time inasmuch as the release relay 300 is not operated. The closure of the contacts 334 forwards ground through the contacts 302 to ground an alarm conductor 388 that extends over the cable 380 to the playback control circuit 120. This produces an alarm indication in the adapter circuit that is seized at that time by the switching means 120*a*. The opening of the contacts 335 interrupts the holding circuit for the playback relay 340 so that when the stepping switch 210 is advanced, the relay 340 is released. The closure of the contacts 333 grounds the conductor 387 so that the playback control circuit 120 is operated to release any seized adapter circuit and to operate the switching means 120*a* to its "home" position so that no further adapter recorders are seized. When the switching means 128 returns to its "home" position, the playback control circuit is restored to normal and the release relay 300 in the remote playback circuit 122 is operated. The operation of the relay 300 restores the remote playback circuit 122 to its normal position in the manner described in detail above.

LOCAL PLAYBACK CIRCUIT 128

The local playback circuit 128 is a part of the local ticketing center 140 and includes means for automatically or manually controlling the playback of information from the plurality of remote offices or called stations. During a routine playback operation, the local playback circuit 128 advances an automatic station selecting switch step-by-step in synchronism with successive cycles of operation of a pulsing control switch so that each of the called stations is seized in turn and the information stored therein is played back to the local ticketing center 140. During individual playback operations, the local playback circuit 128 is placed in operation under the control of a called station and operates to seize each of the called stations requiring an individual playback in sequence. The local playback circuit 128 also includes various manually controlled circuits for performing various test and maintenance operations and for permitting the manual selection of any given one of the offices for a data playback operation.

*Seizure of the First Remote Office 190 During a Routine Playback Operation*

A cycle of playback operation at the local ticketing center 140 is initiated by placing the readout control circuit 126 in operation in the manner described in detail in the above identified Morris et al. patent. The circuit 126 performs a busy-idle test over a conductor 581 when the local playback circuit 128 that is used to control the playback of information from the remote offices is to be seized. If the circuit 128 is idle, as indicated by the presence of an open circuit on the conductor 581, the circuit 126 supplies ground to a conductor 582 which is extended over a cable 580 to complete an obvious operating circuit for a routine start relay 850.

The operation of the relay 850 opens a pair of contacts 851 and closes a plurality of contacts 852 and 853. The opening of the contacts 851 interrupts a conductive loop in the local playback circuit 128 extending between the conductors 581 and a conductor 583 which extends to the readout control circuit 126 to advise the readout control circuit 126 that the local playback circuit 128 has been seized. In response to the receipt of this information and if the electronic components in the data register 132 and the output recorder 134 have been conditioned for operation, the readout control circuit 126 supplies ground to a conductor 585 that is extended over a pair of normally closed contacts 569 to complete an obvious operating circuit for a relay 900.

The relay 900, in operating, opens a plurality of contacts 901, 902, 906, 907, and 902*a* and closes a plurality of contacts 903, 904, 905, 908, 909, 901*a*, 903*a*, 904*a*, 905*a* and 906*a*. The closure of the contacts 901*a* completes a holding circuit for the relay 900 extending to ground at a pair of closed contacts 766. The closure of the contacts 905 forwards ground from a pair of normally closed contacts 566 through a pair of normally closed contacts 764 and over a conductor 1599 and a cable 1590 to illuminate a lamp 1569. The illumination of the lamp 1569 provides a visible indication that a manually actuated selector switch 1260 is not to be operated because a routine operation has been initiated. The closure of the contacts 908 forwards ground from a pair of normally closed contacts 962 through a pair of normally closed contacts 713 to clutch control terminal of the local tone signaling circuit 130. This operates a modulator in this circuit to transmit the clutch control signal over the signaling link to all of the remote offices including the office 100. This signal causes the seizure of all of the remote or called stations. The clutch control modulating circuit in the local tone signaling circuit 130 can be of any of the types well known in the art. The closure of the contacts 905*a* forwards ground through a pair of normally closed contacts 565*a* to place a pulse generator 500 in operation. The closure of the contacts 909 forwards ground through a plurality of normally closed contacts 574 and 941 to a plurality of normally closed contacts 1102, 1104–1109 and 1111–1118 which represents the remote stations "1"–"15," respectively. This ground signal is forwarded over fifteen conductors in a cable 1170 to fifteen pairs of contacts similar to a pair of normally closed contacts 1313 on a station answer relay 1330 representing the called station "1." The closure of the contacts 906*a* forwards ground through a pair of normally closed contacts 826 to complete an obvious operating circuit for a slow-to-operate start relay 830. This relay does not operate at this time due to its slow-to-operate characteristic.

The closure of the contacts 909 also forwards ground through the closed contacts 852 and a plurality of other normally closed contacts 754, 935, 915 and 957 to complete an operating circuit for a relay 1020. In operating, the relay 1020 closes a plurality of contacts 1021–1023. The closure of the contacts 1023 forwards ground over a conductor 1591 to iluminate a lamp 1561. The illumination of this lamp indicates that the local playback circuit 128 is performing an automatic routine operation. The closure of the contacts 1022 completes a circuit for operating a pair of relays 640 and 650 only if the selector switch 1260 is in an automatic setting.

More specifically, when the relay 900 is operated, the closure of the contacts 903 grounds a conductor 1237 which extends over a cable 1230 to the wiper 1261 of the selector switch 1260. In the automatic setting of this switch, this ground is forwarded over a conductor 1236 and the cable 1230 to a pair of normally closed contacts 1056. This ground is then forwarded by the closure of the contacts 1022 through a plurality of normally closed contacts 801 and 654 to the operating winding of the relay 640. This relay operates to open a pair of contacts 643 and to close a plurality of contacts 641 and 642. The closure of the contacts 642 completes an operating circuit for the slow-to-operate relay 650 which does not operate at this time. The closure of the contacts 641 forwards ground from a pair of normally closed contacts 653 to a conductor 1231 which extends over the cable 1230 to the operating winding of a motor magnet 1251 for an automatic station selector switch 1250. Thus, the motor magnet 1251 is energized to condition this switch for advancing from its normal "home" position to its first stepping position representing the called station "1" or the remote office 100.

After its delay interval, the relay 650 operates to open the contacts 653 and 654 and a pair of contacts 651 and to close a pair of contacts 652. The closure of the contacts 652 completes an operating circuit for a slow-to-release relay 600 extending to ground at the closed contacts 909. The operation of the relay 600 opens a pair of contacts 601 and closes a pair of contacts 602.

The opening of the contacts 654 interrupts the operating circuit for the relay 640 so that this relay releases to open the contacts 641 and 642 and to close the contacts 643. The opening of the contacts 641 together with the prior opening of the contacts 653 due to the operation of the relay 650 removes ground from the conductor 1231 so that the motor magnet 1251 for the station selector switch 1250 is released. This permits a plurality of wipers 1252 and 1253 to advance from a normal "home" position to a first stepping position representing the called station "1" or remote office 100. The first contact engaged by the wiper 1252 is connected to ground over a conductor 1361 in a cable 1360 and a plurality of normally closed contacts 1321, 1336 and 1362. The contacts 1321, 1336 and 1362 are individual to the first called station. The ground supplied over this circuit is forwarded over the wiper 1252, a conductor 1232, the cable 1230, and the closed contacts 643 to operate a relay 800. In operating, the relay 800 opens the contacts 801 and closes a plurality of contacts 802 and 803. The closure of the contacts 802 completes a holding circuit for the relay 800 extending to ground through the closed contacts 904*a* and a plurality of other normally closed contacts 566*a* and 1046 or 1057.

The opening of the contacts 801 together with the prior opening of the contacts 642 causes the release of the relay 650 and prevents the reoperation of this relay or the relay 640. When the relay 650 is released, the contacts 651, 653 and 654 are closed and the contacts 652 are opened. The opening of the contacts 652 interrupts the above described operating circuit for the relay 600, but this relay does not release at this time due to its slow-to-release characteristic.

The closure of the contacts 803 forwards ground from a pair of normally closed contacts 848 over a conductor 1235 and the cable 1230 to the wiper 1253 which now engages the contacts in the first stepping position representing the first called station. This ground signal is further forwarded over a conductor 1271 and a cable 1270 to operate a seize relay 1340 representing the called station "1." The relay 1340 operates to open a plurality of contacts 1341 and 1344 and to close a plurality of contacts 1342, 1343 and 1345. The operation of the relay 1340 prepares various circuits for conditioning the local playback control 128 for selecting and controlling the called station "1."

Referring back to the above described operation of the relay 900 to close the contacts 906*a*, the slow-to-operate start relay 830 operates after a time delay of approximatefive seconds. In operating, the relay 830 closes a pair of contacts 831 to complete an operating circuit for a relay 820 extending from ground at a pair of contacts 503 in the pulse generator 500 through a pair of normally closed contacts 824. When a pulsing relay 501 in the pulse generator 500 first operates to close the contacts 503 and to open a pair of contacts 502, the relay 820 closes a plurality of contacts 821, 822 and 825 and opens the contacts 824 and 826 and a pair of contacts 823. The contacts 824 and 825 form a make-before-break contact arrangement so that the closure of the contacts 825 completes a holding circuit for the relay 820 extending to ground at the closed contacts 903*a* prior to the interruption of the operating circuit by the opening of the contacts 824. The opening of the contacts 826 interrupts the operating circuit for the start relay 830 so that this relay releases to open the contacts 831.

The closure of the contacts 821 forwards ground from the closed contacts 909 through a pair of normally closed contacts 736 to the winding of the slow-to-release relay 600 thereby to prevent the release of this relay. The ground provided at the closed contacts 821 is also forwarded through the closed contacts 651 to the "swinger" or transfer spring of a relay 530. The closure of the contacts 822 connects a clutch mark terminal of the local tone signaling circuit 130 to a pair of normally closed contacts 531. This circuit extends from the contacts 531 through a plurality of normally closed contacts 734, 967, 625, 561*a* and 573 to the contacts 822 which are now closed and which are connected directly to the local tone signaling circuit 130.

As described above, the pulse generator 500 is provided with an operating signal in response to the closure of the contacts 905*a*. When an operating ground signal is supplied to the pulse generator 500, the relay 501 therein is operated to alternately open and close two pairs of contacts 502 and 503 at a speed of five to ten pulses per second. The contacts 503 are directly connected to the winding of the relay 530 so that the relay 530 is operated in synchronism with the pulse generator 500 to alternately open and close the contacts 531 and a pair of normally open contacts 532. When the relay 820 is operated to supply ground to the "swinger" of the relay 530 and to connect the contacts 531 to the clutch mark terminal of the local tone signaling circuit 530, a ground pulse is applied to the tone signaling circuit 130. This pulse operates the modulator in the local tone signaling circuit 130 to supply a clutch mark signal over the transmission link to all of the remote stations so that the clutch mark relays in all of these remote circuits are operated.

Concurrently with the transmission of the clutch mark signal over the transmission path, the closed contacts 531 also forward a ground pulse through a plurality of normally closed contacts 963 and 732 to operate a slow-to-release relay 660. In operating, the relay 660 opens a pair of contacts 661. The ground pulse supplied at the normally closed contacts 732 is also forwarded over a conductor 1227 and the cable 1220 to an operating magnet 1201 of a fifty-two position pulsing control switch 1200 which provides means for controlling the transmission of pulse information to the called stations Thus, the motor magnet 1201 is energized to prepare a plurality of wipers 1202–1207 in the switch 1200 for movement to their first stepping position.

When the pulse generator 500 is operated to its alternate condition in which the relay 501 is energized to close the contacts 503 and to open the contacts 502, the relay 530 is operated to open the contacts 531 and to close a pair of contacts 532. The opening of the contacts 531 removes the ground signal from the clutch mark terminal of the local tone signaling circuit 130 so that the clutch mark relays in all of the called stations release to operate the corresponding pulsing control switches to their first stepping position. Further, the opening of the contacts 531 interrupts the operating circuit for the slow-to-release relay 660 and terminates the energization of the motor magnet 1201 so that the wipers 1202–1207 are advanced to their first stepping position. The contact in the first stepping position engaged by the wiper 1202 is connected to ground over the conductor 1371, the cable 1370, the contacts 1343 closed by the operation of the station one relay 1340, a conductor 1306 in the cable 1300 and a pair of normally closed and grounded contacts 953*a*. This ground is forwarded over the wiper 1202 and a conductor 1226 in the cable 1210 to the contacts 661.

When the brief slow-to-release interval of the relay 660 expires, the contacts 661 are closed to complete an obvious operating circuit for a relay 730. In operating, the relay 730 closes a plurality of contacts 731, 733, 735 and 737 and opens the contacts 732, 734 and 736. The opening of the contacts 736 interrupts the operating circuit for the relay 600 so that this relay remains operated by the virtue of its slow-to-release characteristic. The opening of the contacts 734 prevents the application of additional ground pulses from the contacts 531 to the clutch mark terminal of the local tone signaling circuit 130. The opening of the contacts 732 interrupts an additional point in the operating circuit for the slow-to-release relay 660 and prevents the application of additional operating signals to the motor magnet 1201 of the pushing control switch 1200.

The closure of the contacts 735 forwards ground to the operating winding of a relay 810 through the closed contacts 909 and 821. In operating, the relay 810 opens a pair of contacts 813 and closes a plurality of contacts 811, 812, 814 and 815. The closure of the contacts 815 provides a holding circuit for the relay 810.

Since the pulsing control switches in all of the remote offices are stepped to their first position representing called station "1," the relay 370 in only the circuit 122 in the remote office 100 is operated to return a mark control signal over the tone signaling circuits 124 and 130 and the link therebetween which causes the local tone signaling circuit 130 to apply ground to one side of the operating winding of a relay 520 so that this relay operates as an indication that the called station "1" has been seized. In operating, the relay 520 closes a plurality of contacts 521 and 523 and opens a pair of contacts 522.

When the time delay period of the relay 600 expires, this relay releases to close the contacts 601 and to open the contacts 602. The closure of the contacts 601 connects the upper winding of a relay 610 to the contacts 532. Thus, when the relay 530 is next operated by the pulse generator 500, the relay 610 is operated to close a plurality of contacts 611–614. The closure of the contacts 613 extends a holding circuit for the lower winding of the relay 610 to the contacts 531 of the relay 530. The closure of the contacts 611 cooperates with a pair of normally closed contacts 634 to provide a shunt around the open contacts 732 so that the relay 660 and the motor magnet 1201 are again placed under the control of the relay 530. The closure of the contacts 612 connects the pulsing contacts 531 over a conductor 514, the cable 1500, a pair of normally closed contacts 1534 on a manually actuated key, the cable 1500 and a conductor 1513 to the now open contacts 734. Thus, these contacts are shunted so that the clutch control modulator in the local tone signaling circuit 130 is again rendered responsive to control by the relay 530. Thus, the delay period of the relay 600 provides the delay interval in the transmission of clutch mark pulses that are detected in the called stations.

When the pulse generator 500 next restores to open the contacts 503, the relay 530 releases to close the contacts 531 and to open the contacts 532. The opening of the contacts 532 interrupts the operating circuit for the upper winding of the relay 610, but this relay remains operated over the holding circuit completed at the closed contacts 531. The closure of the contacts 531 is effective over the circuits described above to pulse the clutch mark terminal of the local tone signaling circuit 130 so that the pulsing control switch in only the called station "1" is advanced. Further, the closure of the contacts 531 again energizes the motor magnet 1201 and operates the relay 660 over the alternate circuits described above. When the relay 660 is operated, the contacts 661 are opened to interrupt the operating circuit for the relay 730 so that this relay releases. When this relay releases, the above described paths for pulsing the clutch mark terminal of the local tone signaling circuit 130 and for operating the relay 660 and the motor magnet 1201 are again completed. In addition, the operating circuit for the relay 600 is again completed so that this relay again operates to interrupt the operating circuit for the upper winding of the relay 610. Thus, this relay remains controlled by the holding circuit including the closed contacts 613 and 531.

When the pulse generator 500 next operates the relay 501 to close the contacts 503, the relay 530 is again operated to close the contacts 532 and to open the contacts 531. The opening of the contacts 531 also removes the ground signal from the clutch mark terminal of the local tone signaling circuit 130 and the operating winding 1201 of the pulse control switch 1200. Thus, the switch 1200 and the pulsing control switch in the called station "1" are advanced to their second stepping position. The opening of the contacts 531 also interrupts the circuits for the relays 610 and 660, both of which are slow-to-release. When these relays release, the control over the pulsing of the clutch mark terminal of the signaling circuit 130 and over the energization of the motor magnet 1201 in the switch 1200 is restored to the relays 530 and 730, the operating circuit for the relay 730 being extended to the wipers 1202 and 1203 of the stepping switch 1200 by the release of the relay 660 to close the contacts 661.

Accordingly, as the relay 530 is alternately operated and released under the control of the pulse generator 500, ground signals are supplied to the clutch mark terminal of the signaling circuit and to the winding of the motor magnet 1201 so that the stepping switch 1200 and the corresponding pulsing control switch 210 in the office 100 are advanced step-by-step in synchronism with each other. The relay 730 is not operated by the wipers 1202 and 1203 of the stepping switch 1200 during this movement of the switch inasmuch as only the station "1" relay 1340 in the group thereof representing the different calling stations is operated to ground the conductor 1371.

This step-by-step advance of the switch 1200 in the local playback circuit 128 and the corresponding pulsing control switch in the called station "1" continues until the pulsing control switch in the called station reaches its seventeenth stepping position. At this time, a modulator in the remote tone signaling circuit 124 is rendered effective to transmit a space control signal over the link to the local tone signaling circuit 130. This signal is demodulated and results in the application of ground to the operating winding of a relay 510. In operating, the relay 510 closes a plurality of contacts 511–513.

Further, when the switch 1200 advances to its seventeenth stepping position, ground is again applied to the wiper 1202 and returned over the conductor 1226 to operate the relay 730. The operation of this relay performs the same functions described above in opening the pulsing paths to the relay 660, the motor magnet 1201, and the clutch mark terminal of the local tone signal circuit 130. In addition, the opening of the contacts 736 also interrupts the operating circuit for the relay 660 so that this relay releases after its slow-to-release interval. In releasing, the relay 600 closes the contacts 601 so that when the relay 530 is next operated, the closure of the contacts 532 again operates the relay 610. The operation of this relay again prepares the alternative pulsing paths for the motor magnet 1201, the relay 660, and the clutch mark terminal of the local tone signaling circuit 130.

In addition, the closure of the contacts 614 prepares a path when the pulse generator 500 next releases to close the contacts 502 for forwarding ground from the closed contacts 502 through the closed contacts 513, 523 and 555 to a conductor 1217. This ground is extended over the conductor 1217 and the cable 1210 to a wiper 1206 which is now in its seventeenth stepping position. This ground is further forwarded over a conductor 1381 and a cable 1380 to the operating winding of a station "1" answer relay 1330. This signal operates this relay to close a plurality of contacts 1331, 1332, 1334, 1337, 1338 and 1339 and to open a plurality of contacts 1333 and 1336. The closure of the contacts 1334 completes a holding circuit for the relay 1330 extending to ground over a conductor 1171 in the cable 1170 and the closed contacts 1102, 941, 574 and 909. This ground also illuminates a lamp 1364 to indicate that the called station "1" has been seized and connected to the local playback control 128. The opening of the contacts 1336 removes ground from the conductor 1361 so that the station "1" contact engaged by the wiper 1252 is no longer grounded. Accordingly, the relay 800 remains operated only over the holding circuit including the closed contacts 802.

When the pulse generator 500 is released to the condition in which the contacts 502 are closed to operate the relay 1330, the opening of the contacts 503 releases the relay 530 so that the contacts 531 are closed and the contacts 532 are opened. When the contacts 531 are closed, ground is supplied to the motor magnet 1201, the clutch mark terminal of the tone signaling circuit 130, and the relay 660 which operates to open the contacts 661. The opening of the contacts 661 releases the relay 730 so that the original pulsing paths to the motor magnet 1201, the relay 660, and the clutch mark terminal of the tone signaling circuit 130 are restored. In addition, the operating circuit for the relay 600 is again completed so that this relay operates to open the contacts 601. Thus, the relay 610 remains operated only over the holding circuit controlled by the closed contacts 531. When the pulse generator 500 next operates to operate the relay 530, the contacts 531 are again opened to permit the pulsing control switch 1200 to advance to its eighteenth stepping position, to permit the pulsing control switch 210 in the called station "1" in the remote office 100 to advance to its eighteenth stepping position, and to interrupt the holding circuit for the relay 610 so that this relay releases to interrupt the alternate pulsing circuits. The switch 210 in called station "1" now releases the relay 510.

The pulse generator 500 next operates the relay 530 to step the pulsing control switch 1200 and the pulsing control switch in the called station "1" to the thirty-second stepping position.

When the pulsing control switch in the remote office 100 is advanced to its thirty-second stepping position, the modulator in the remote signaling circuit 124 again operates the demodulator in the local signaling circuit 130 so that the relay 510 is operated to close the contacts 511–513. It should be noted that this movement of the pulsing control switch 1200 is not performed at high speed under the direct control of the pulse generator 500 because the wiper 1202 is connected to ground at each of the intervening steps of the switch 1200. The relay 730 is operated and released, the relay 600 is released and operated, and the relay 610 is operated and released incident to each stepping operation of the switch. Thus, a delay is provided after each clutch mark signal transmitted.

When the thirty-second stepping position is reached, the release of the relay 660 again causes the operation of the relay 730 and the subsequent release of the relay 600 and the operation of the relay 610. When the relay 730 closes the contacts 737 ground from the wiper 1205 is forwarded over the conductors 1217 and 1219 to the wiper 1207 in the thirty-second stepping position of the switch 1200. The wiper 1207 engages a contact connected to a conductor 1215. This conductor extends over the cable 1210 to the operating winding of a relay 550. This relay operates to close a plurality of contacts 551–554 and to open the contacts 555. The closure of the contacts 554 completes a holding circuit for the relay 550 extending to the closed contacts 717.

The closure of the contacts 553 completes an obvious operating circuit for a slow-to-release relay 540. In operating, the relay 540 opens a pair of contacts 541 to disconnect one path for extending ground over the clutch conductor 585 from the readout control circuit 126. The closure of the contacts 552 completes an operating circuit for a relay 1030.

This circuit extends from a pair of closed and grounded contacts 1014 through the contacts 552, a pair of normally closed contacts 1053, a conductor 1303, the cable 1300, the closed contacts 1342 and 1331, the conductor 1302, the cable 1300, the closed contacts 512 and a pair of normally closed contacts 1142. In operating, the relay 1030 closes a plurality of contacts 1031 and 1033 and opens a pair of contacts 1032. The opening of the contacts 1032 interrupts a circuit for applying ground to the thirty-third contact in the bank engaged by the wiper 1203 so as to indicate that the proper called station has answered. Thus, a ground source for operating the relay 730 is not available in the thirty-third position of the switch 1200.

The pulse generator 500 next advances the switches 210 and 1200 to their thirty-third stepping position. When the relay 650 releases to close the contacts 661, the relay 730 is not operated because of the fact that the relay 1030 is operated to prevent the application of ground to the wiper 1207 over the conductor 1214 connected to the contact in the thirty-third position of the bank of the switch 1200 engaged by the wiper 1207. Thus, the pulse generator 500 and the relay 530 are effective to advance the switch 1200 and the pulsing control switch 210 in called station "1" to the thirty-ninth stepping position. When the relay 530 is operated to step the wipers of the switch 1200 to their thirty-ninth stepping position, the wiper 1203 is connected to the conductor 1221 which extends to ground over the cable 1210 and a plurality of normally closed contacts 1021 and 1033. This ground is returned over the wiper 1203 and the conductor 1226 to the open contacts 661 on the relay 660. At the expiration of the slow-to-release interval of the relay 660, this relay releases to close the contacts 661 so that the relay 730 operates to interrupt the above described pulsing paths and to open the operating circuits for the relay 600. In addition, in closing the contacts 737, the ground applied to the wiper 1205 is forwarded over the conductor 1219 and the cable 1210 to the conductor 1217 and returns over the cable 1210 to the wiper 1207. This ground is then forwarded over a conductor 1212, the cable 1210 and a normally closed pair of contacts 575 to complete an operating circuit for a relay 560.

In operating, the relay 560 closes a plurality of contacts 561–565, 568, 562*a* and 563*a* and opens a plurality of contacts 566, 567, 569, 561*a*, 564*a*, 565*a* and 566*a*. The opening of the contacts 565*a* immediately arrests operation of the pulse generator 500 so that the relay 501 is no longer effective to open and close the contacts 502 and 503. The closure of the contacts 561–564 connects the mark and space pulse signaling leads from the local tone signaling circuit 130 to the input of the data register 132 so as to prepare this register for receiving information derived from the remote recorders 106, 110, and 138 in the remote office 100. The opening of the contacts 566 removes ground from the above described path so that the lamp 1569 is no longer illuminated. The closure of the contacts 563*a* completes another operating circuit for the relay 600 extending to ground at the closed contacts 909, thereby preventing the release of this relay. The opening of the contacts 561*a* and the concurrent closure of the contacts 562*a* prepares a path controlled by the opened contacts 541 for extending the clutch conductor 585 from the readout control circuit 126 to the clutch mark terminal of the local tone signaling circuit 130 so that the control over the clutch signals transmitted to the remote office 100 is no longer controlled by the local playback circuit 128 but is controlled by the readout control circuit 126.

The opening of the contacts 564*a* interrupts the above described operating circuit for the relay 540 which is slow-to-release and does not release at this time. The closure of the contacts 568 prepares an operating circuit for a release relay 570. which circuit is interrupted at the contacts 522 which are maintained in an open condition by the operated relay 520. The opening of the contacts 569 interrupts the above described operating circuit for the relay 900 so that this relay remains operated over its holding circuit extending to the closed contacts 766. The closure of the contacts 565 completes an obvious preliminary operating circuit for a two-step relay 620 extending through a pair of normally closed contacts 623. When the upper winding of the relay 620 is energized, a pair of preliminary operate contacts 621 are closed to connect both sides of the lower winding of the relay 620 to ground. The left-hand terminal of the lower winding of relay 620 is connected to ground at the closed contacts 565 and the right-hand terminal of this winding is connected to ground through the closed contacts 621, a pair of normally closed contacts 762, and the closed contacts 811. Thus, the relay 620 does not operate fully until the ground shunt is removed from the left-hand terminal of its lower winding.

The opening of the contacts 566*a* interrupts the above described holding circuit for the relay 800 so that this relay releases to close the contacts 801 and to open the contacts 802 and 803. The opening of the contacts 803 interrupts the above described operating circuit for the called station "1" relay 1340 so that this relay releases to restore its contacts to their normal positions. The opening of the contacts 1343 opens the circuit for applying ground to the contact engaged by the wiper 1202 in the first stepping position so as to prevent the selection of the first called station during the next cycle of operation of the local playback circuit 128. The opening of these contacts also interrupts the path including the closed contacts 1338 for applying ground to the contact in the sixteenth position engaged by the wiper 1202.

The closure of the contacts 801 when the relay 800 is released completes the above described circuit for operating the relay 640 so that this relay operates to close the contacts 641 and 642 and to open the contacts 643. The closure of the contacts 641 completes the above described energizing circuit for the motor magnet 1251 of the station selector switch 1250, and the closure of the contacts 642 completes the operating circuit for the slow-to-operate relay 650. When the relay 650 operates to open the contacts 651, 653 and 654 and to close the contacts 652, the opening of the contacts 653 interrupts the energizing circuit for the motor magnet 1251 so that the wipers 1252 and 1253 advance to their second stepping position representing called station "2." In the second stepping position, the wiper 1252 receives ground over a conductor similar to the conductor 1361 representing called station "2." This ground is forwarded over the conductor 1232 to the open contacts 643. The wiper 1253 engages a contact connected over a conductor similar to the conductor 1271 and the cable 1270 to a relay similar to the relay 1340 representing called station "2."

The opening of the contacts 654 interrupts the operating circuit for the relay 640 so that this relay releases to restore its contacts to their normal position. When the contacts 642 are opened, the relay 650 is released and when the contacts 643 are closed, the above described circuit for operating the relay 800 is completed. In operating, the relay 800 opens the contacts 801 and closes the contacts 802 and 803. The opening of the contacts 801 interrupts an additional point in the operating circuit for the relays 640 and 650 to prevent their reoperation. The closure of the contacts 802 again completes the holding circuit for the relay 800, which circuit is interrupted at the open contacts 566*a*. The closure of the contacts 803 forwards ground from the closed contacts 848 over the conductor 1235 and the cable 1230 to the wiper 1253. This ground is extended to operate the relay similar to the relay 1340 representing the called station "2." The operation of this relay performs the same function in conditioning and preparing circuits as the prior operation of the relay 1340 representing called station "1."

The relay 540 releases after its delay interval so that the contacts are closed to connect the clutch mark terminal of the circuit 130 to the conductor 585 over the circuit prepared by the closure of the contacts 562*a*. The readout control circuit 126 now supplies steady ground to the clutch mark terminal with momentary interruption of each transmitted call to control the playback of test and toll call information from the recorders 106 and 202 in the remote office 100. The control over the playback of this information and the operation of the data handling components in the local ticketing office or center 200 is performed in the manner described in detail in the copending Clement et al. application and the Morris et al. patent.

*Release of the First Remote Station and Seizure of the Second Remote Called Station*

When all of the trunk recorders to which the playback control circuit 120 in the remote office 100 has access have been played back, the playback control circuit 120 and the remote playback circuit 122 operate the remote tone signaling circuit 124 so that the mark control signal transferred over the link to the local tone signaling circuit 130 is removed. Thus, ground is removed from the winding of the relay 520 so that this relay releases to open the contacts 521 and 523 and to close the contacts 522. The closure of the contacts 522 forwards ground through the closed contacts 568 to operate the release relay 570. In operating, the relay 570 opens the contacts 571, 573, 574 and 575 and closes a plurality of contacts 572 and 576.

The closure of the contacts 572 completes a holding circuit for the relay 570 extending to ground at a pair of normally closed contacts 714. The opening of the contacts 573 opens the path extending from the readout control circuit 126 to the clutch mark terminal of the local tone signaling circuit 130 so that the clutch mark signal is no longer transmitted to the remote offices. Thus, all of the clutch mark relays, such as the relay 420 in the remote office 100, are released. The closure of the contacts 576 connects the operating winding of the relay 740 to the contact in the "home" or normal position engaged by the wiper 1235, which wiper has now been advanced to its second stepping position representing called station "2." The opening of the contacts 574 removes ground from the above described path extending over the closed contacts 1102, the conductor 1171, and the cable 1170 to the operating circuit for the relay 1330 and the lamp 1364. Thus, the illumination of the lamp 1364 is terminated to indicate the completion of the readout of the information from called station "1." The relay 1330 releases at this time to restore its contacts to their normal position. The release of this relay conditions the local playback control 128 for controlling the playback of information from the called station "2."

The opening of the contacts 575 interrupts the above described operating circuit for the relay 560 so that this relay releases to restore its contacts to their normal positions. The opening of the contacts 561–564 disconnects the data register 132 from the local tone signaling circuit 130 and prevents the transmission of information to the register. The opening of the contacts 563*a* interrupts the operating circuit for the relay 600 so that this relay is maintained operated by its slow-to-release characteristic. The closure of the contacts 566 again illuminates the lamp 1569. The opening of the contacts 1565 removes the ground shunt from the relay 620 so that this relay fully operates to open the contacts 623 and 625 and to close a pair of contacts 624. The opening of the contacts 625 interrupts an additional point in the circuit for applying ground to the clutch mark terminal of the local tone signaling circuit 130.

When the relay 560 releases to close the contacts 565*a*, the pulse generator 500 is again placed in operation so that the relay 501 alternately opens and closes the contacts 502 and 503. Thus, the relay 530 is again operated and released under the control of the pulse generator 500. After its delay interval, the relay 600 releases so that the relay 610 is again operated under the control of the relay 530. The operation of this relay again prepares the alternate paths for operating the relay 660 and the motor magnet 1201 of the pulsing control switch 1200. Thus, the relay 530 is effective to control the operation of the relay 660 and the energization of the motor magnet 1201. When the relay 660 operates, the relay 730 is released. When the contacts 733 are opened, the holding circuit for the relay 1030 is opened so that this relay releases to restore its contacts to their normal positions. When the contacts 1033 are opened, ground is removed from the conductor 1221 and the contact in the thirty-ninth stepping position engaged by the wiper 1203. The release of the relay 730 also prepares the above described paths for pulsing the motor magnet 1201 and the relay 660 and closes the above described circuit for operating the relay 600.

When the relay 530 is next operated by the pulse generator 500 to open the contacts 531 and to close the contacts 532, the motor magnet 1201 is released so that the wipers 1202–1207 advance to the fortieth stepping position. The opening of the contacts 531 also interrupts the holding circuit for the lower winding of the operated relay 610 and this relay releases at this time because the prior operation of the relay 600 opens the contacts 601 to interrupt the energizing circuit for the upper winding of the relay 610. The relay 530 is then released and operated under the control of the pulse generator 500 to operate and release the relay 660 and to periodically energize the motor magnet 1201 so that the wipers 1202–1207 are advanced towards the "home" or normal position of the pulsing control switch 1200.

When this switch is stepped to its fifty-first position, ground is forwarded over the wiper 1203 and the conductor 1226 to the open contacts 661. When the relay 660 releases at the expiration of its delay period, the contacts 661 are closed to again operate the relay 730 which performs the same functions described above. However, the closure of the contacts 737 also forwards ground from the wiper 1205 and the conductor 1219 over the conductor 1217 and the wiper 1207 to a conductor 1211. This ground is forwarded over the conductor 1211 and the cable 1210 and through a pair of normally closed contacts 723 to operate a relay 710.

In operating, the relay 710 closes a plurality of contacts 711, 712, 715, 716, 718 and 719 and opens the contacts 713, 714 and 717. The closure of the contacts 716 forwards ground from the closed contacts 909 to energize the relay 600 to prevent its release. The closure of the contacts 715 forwards the ground provided at the closed contacts 716 through the closed contacts 602 and a pair of normally closed contacts 1135 to complete an operating circuit for a relay 1100. The relay 1100, in operating, closes a plurality of contacts 1101 and 1103 and opens the contacts 1102 and 1104–1109. The closure of the contacts 1101 completes an obvious operating circuit for a relay 1110 so that the contacts 1111–1118 are opened. Thus, the paths for applying ground to any of the station answer relays for the called stations "1"–"15" are opened.

The opening of the contacts 717 interrupts the above described holding circuit for the relay 550 so that this relay releases to restore its contacts to their normal positions. The closure of the contacts 719 energizes a thermal delay device 700 so that if the energization of the device 700 persists for approximately twenty seconds, a pair of contacts 701 are closed. The opening of the contacts 714 interrupts the above described holding circuit for the relay 570 so that this relay releases to restore its contacts to their normal position.

The closure of the contacts 711 forwards ground through the contacts 511 closed by the operation of the space control relay 510 to complete a preliminary operating circuit for a two-step relay 720. The completion of this circuit causes the closure of a pair of preliminary make contacts 721. Thus, the ground provided at the opens a pair of contacts 1032. The opening of the contacts 1032 interrupts a circuit for applying ground to the thirty-third contact in the bank engaged by the wiper 1203 so as to indicate that the proper called station has answered. Thus, a ground source for operating the relay 730 is not available in the thirty-third position of the switch 1200.

The pulse generator 500 next advances the switches 210 and 1200 to their thirty-third stepping position. When the relay 660 releases to close the contacts 661, the relay 730 is not operated because of the fact that the relay 1030 is operated to prevent the application of ground to the wiper 1207 over the conductor 1214 connected to the contact in the thirty-third position of the bank of the switch 1200 engaged by the wiper 1207. Thus, the pulse generator 500 and the relay 530 are effective to advance the switch 1200 and the pulsing control switch 210 in called station "1" to the thirty-ninth stepping position. When the relay 530 is operated to step the wipers of the switch 1200 to their thirty-ninth stepping position, the wiper 1203 is connected to the conductor 1221 which extends to ground over the cable 1210 and a plurality of normally closed contacts 1021 and 1033. This ground is returned over the wiper 1203 and the conductor 1226 to the open contacts 661 on the relay 660. At the expiration of the slow-to-release interval of the relay 660, this relay releases to close the contacts 661 so that the relay 730 operates to interrupt the above described pulsing paths and to open the operating circuits for the relay 600. In addition, in closing the contacts 737, the ground applied to the wiper 1205 is forwarded over the conductor 1219 and the cable 1210 to the conductor 1217 and returns over the cable 1210 to the wiper 1207. This ground is then forwarded over a conductor 1212, the cable 1210 and a normally closed pair of contacts 575 to complete an operating circuit for a relay 560.

In operating, the relay 560 closes a plurality of contacts 561–565, 568, **562*a* and 563*a* and opens a plurality of contacts 566, 567, 569, 561*a*, 564*a*, 565*a* and 566*a*. The opening of the contacts 565*a* immediately arrests operation of the pulse generator 500 so that the relay 501 is no longer effective to open and close the contacts 502 and 503. The closure of the contacts 561–564 connects the mark and space pulse signaling leads from the local tone signaling circuit 130 to the input of the data register 132 so as to prepare this register for receiving information derived from the remote recorders 106, 110, and 138 in the remote office 100. The opening of the contacts 566 removes ground from the above described path so that the lamp 1569 is no longer illuminated. The closure of the contacts 563*a* completes another operating circuit for the relay 600 extending to ground at the closed contacts 909, thereby preventing the release of this relay. The opening of the contacts 561*a* and the concurrent closure of the contacts 562*a* prepares a path controlled by the opened contacts 541 for extending the clutch conductor 585 from the readout control circuit 126 to the clutch mark terminal of the local tone signaling circuit 130 so that the control over the clutch signals transmitted to the remote office 100 is no longer controlled by the local playback circuit 128 but is controlled by the readout control circuit 126**.

The opening of the contacts **564*a* interrupts the above described operating circuit for the relay 540 which is slow-to-release and does not release at this time. The closure of the contacts 568 prepares an operating circuit for a release relay 570. which circuit is interrupted at the contacts 522 which are maintained in an open condition by the operated relay 520. The opening of the contacts 569 interrupts the above described operating circuit for the relay 900 so that this relay remains operated over its holding circuit extending to the closed contacts 766. The closure of the contacts 565 completes an obvious preliminary operating circuit for a two-step relay 620 extending through a pair of normally closed contacts 623. When the upper winding of the relay 620 is energized, a pair of preliminary operate contacts 621 are closed to connect both sides of the lower winding of the relay 620 to ground. The left-hand terminal of the lower winding of relay 620 is connected to ground at the closed contacts 565 and the right-hand terminal of this winding is connected to ground through the closed contacts 621, a pair of normally closed contacts 762, and the closed contacts 811. Thus, the relay 620** does not operate fully until the ground shunt is removed from the left-hand terminal of its lower winding.

The opening of the contacts **566*a* interrupts the above described holding circuit for the relay 800 so that this relay releases to close the contacts 801 and to open the contacts 802 and 803. The opening of the contacts 803 interrupts the above described operating circuit for the called station "1" relay 1340 so that this relay releases to restore its contacts to their normal positions. The opening of the contacts 1343 opens the circuit for applying ground to the contact engaged by the wiper 1202 in the first stepping position so as to prevent the selection of the first called station during the next cycle of operation of the local playback circuit 128. The opening of these contacts also interrupts the path including the closed contacts 1338 for applying ground to the contact in the sixteenth position engaged by the wiper 1202**.

The closure of the contacts 801 when the relay 800 is released completes the above described circuit for operating the relay 640 so that this relay operates to close the contacts 641 and 642 and to open the contacts 643. The closure of the contacts 641 completes the above described energizing circuit for the motor magnet 1251 of the station selector switch 1250, and the closure of the contacts 642 completes the operating circuit for the slow-to-operate relay 650. When the relay 650 operates to open the contacts 651, 653 and 654 and to close the contacts 652, the opening of the contacts 653 interrupts the energizing circuit for the motor magnet 1251 so that the wipers 1252 and 1253 advance to their second stepping position representing called station "2." In the second stepping position, the wiper 1252 receives ground over a conductor similar to the conductor 1361 representing called station "2." This ground is forwarded over the conductor 1232 to the open contacts 643. The wiper 1253 engages a contact connected over a conductor similar to the conductor 1271 and the cable 1270 to a relay similar to the relay 1340 representing called station "2."

The opening of the contacts 654 interrupts the operating circuit for the relay 640 so that this relay releases to restore its contacts to their normal position. When the contacts 642 are opened, the relay 650 is released and when the contacts 643 are closed, the above described circuit for operating the relay 800 is completed. In operating, the relay 800 opens the contacts 801 and closes the contacts 802 and 803. The opening of the contacts 801 interrupts an additional point in the operating circuit for the relays 640 and 650 to prevent their reoperation. The closure of the contacts 802 again completes the holding circuit for the relay 800, which circuit is interrupted at the open contacts **566*a*. The closure of the contacts 803 forwards ground from the closed contacts 848 over the conductor 1235 and the cable 1230 to the wiper 1253. This ground is extended to operate the relay similar to the relay 1340 representing the called station "2." The operation of this relay performs the same function in conditioning and preparing circuits as the prior operation of the relay 1340** representing called station "1."

The relay 540 releases after its delay interval so that the contacts are closed to connect the clutch mark terminal of the circuit 130 to the conductor 585 over the circuit prepared by the closure of the contacts **562*a*. The readout control circuit 126** now supplies steady ground to the clutch mark terminal with momentary interruption of each transmitted call to control the playback of test and toll call information from the recorders 106 and 202 in the remote office 100. The control over the playback of this information and the operation of the data handling components in the local ticketing office or center 200 is performed in the manner described in detail in the copending Clement et al. application and the Morris et al. patent.

*Release of the First Remote Station and Seizure of the Second Remote Called Station*

When all of the trunk recorders to which the playback control circuit 120 in the remote office 100 has access have been played back, the playback control circuit 120 and the remote playback circuit 122 operate the remote tone signaling circuit 124 so that the mark control signal transferred over the link to the local tone signaling circuit 130 is removed. Thus, ground is removed from the winding of the relay 520 so that this relay releases to open the contacts 521 and 523 and to close the contacts 522. The closure of the contacts 522 forwards ground through the closed contacts 563 to operate the release relay 570. In operating, the relay 570 opens the contacts 571, 573, 574 and 575 and closes a plurality of contacts 572 and 576.

The closure of the contacts 572 completes a holding circuit for the relay 570 extending to ground at a pair of normally closed contacts 714. The opening of the contacts 573 opens the path extending from the readout control circuit 126 to the clutch mark terminal of the local tone signaling circuit 130 so that the clutch mark signal is no longer transmitted to the remote offices. Thus, all of the clutch mark relays, such as the relay 420 in the remote office 100, are released. The closure of the contacts 576 connects the operating winding of the relay 740 to the contact in the "home" or normal position engaged by the wiper 1235, which wiper has now been advanced to its second stepping position representing called station "2." The opening of the contacts 574 removes ground from the above described path extending over the closed contacts 1102, the conductor 1171, and the cable 1170 to the operating circuit for the relay 1330 and the lamp 1364. Thus, the illumination of the lamp 1364 is terminated to indicate the completion of the readout of the information from called station "1." The relay 1330 releases at this time to restore its contacts to their normal position. The release of this relay conditions the local playback control 128 for controlling the playback of information from the called station "2."

The opening of the contacts 575 interrupts the above described operating circuit for the relay 560 so that this relay releases to restore its contacts to their normal positions. The opening of the contacts 561–564 disconnects the data register 132 from the local tone signaling circuit 130 and prevents the transmission of information to the register. The opening of the contacts 563*a* interrupts the operating circuit for the relay 600 so that this relay is maintained operated by its slow-to-release characteristic. The closure of the contacts 566 again illuminates the lamp 1569. The opening of the contacts 1565 removes the ground shunt from the relay 620 so that this relay fully operates to open the contacts 623 and 625 and to close a pair of contacts 624. The opening of the contacts 625 interrupts an additional point in the circuit for applying ground to the clutch mark terminal of the local tone signaling circuit 130.

When the relay 560 releases to close the contacts 565*a*, the pulse generator 500 is again placed in operation so that the relay 501 alternately opens and closes the contacts 502 and 503. Thus, the relay 530 is again operated and released under the control of the pulse generator 500. After its delay interval, the relay 600 releases so that the relay 610 is again operated under the control of the relay 530. The operation of this relay again prepares the alternate paths for operating the relay 660 and the motor magnet 1201 of the pulsing control switch 1200. Thus, the relay 530 is effective to control the operation of the relay 660 and the energization of the motor magnet 1201. When the relay 660 operates, the relay 730 is released. When the contacts 733 are opened, the holding circuit for the relay 1030 is opened so that this relay releases to restore its contacts to their normal positions. When the contacts 1033 are opened, ground is removed from the conductor 1221 and the contact in the thirty-ninth stepping position engaged by the wiper 1203. The release of the relay 730 also prepares the above described paths for pulsing the motor magnet 1201 and the relay 660 and closes the above described circuit for operating the relay 600.

When the relay 530 is next operated by the pulse generator 500 to open the contacts 531 and to close the contacts 532, the motor magnet 1201 is released so that the wipers 1202–1207 advance to the fortieth stepping position. The opening of the contacts 531 also interrupts the holding circuit for the lower winding of the operated relay 610 and this relay releases at this time because the prior operation of the relay 600 opens the contacts 601 to interrupt the energizing circuit for the upper winding of the relay 610. The relay 530 is then released and operated under the control of the pulse generator 500 to operate and release the relay 660 and to periodically energize the motor magnet 1201 so that the wipers 1202–1207 are advanced towards the "home" or normal position of the pulsing control switch 1200.

When this switch is stepped to its fifty-first position, ground is forwarded over the wiper 1203 and the conductor 1226 to the open contacts 661. When the relay 660 releases at the expiration of its delay period, the contacts 661 are closed to again operate the relay 730 which performs the same functions described above. However, the closure of the contacts 737 also forwards ground from the wiper 1205 and the conductor 1219 over the conductor 1217 and the wiper 1207 to a conductor 1211. This ground is forwarded over the conductor 1211 and the cable 1210 and through a pair of normally closed contacts 723 to operate a relay 710.

In operating, the relay 710 closes a plurality of contacts 711, 712, 715, 716, 718 and 719 and opens the contacts 713, 714 and 717. The closure of the contacts 716 forwards ground from the closed contacts 909 to energize the relay 600 to prevent its release. The closure of the contacts 715 forwards the ground provided at the closed contacts 716 through the closed contacts 602 and a pair of normally closed contacts 1135 to complete an operating circuit for a relay 1100. The relay 1100, in operating, closes a plurality of contacts 1101 and 1103 and opens the contacts 1102 and 1104–1109. The closure of the contacts 1101 completes an obvious operating circuit for a relay 1110 so that the contacts 1111–1118 are opened. Thus, the paths for applying ground to any of the station answer relays for the called stations "1"–"15" are opened.

The opening of the contacts 717 interrupts the above described holding circuit for the relay 550 so that this relay releases to restore its contacts to their normal positions. The closure of the contacts 719 energizes a thermal delay device 700 so that if the energization of the device 700 persists for approximately twenty seconds, a pair of contacts 701 are closed. The opening of the contacts 714 interrupts the above described holding circuit for the relay 570 so that this relay releases to restore its contacts to their normal position.

The closure of the contacts 711 forwards ground through the contacts 511 closed by the operation of the space control relay 510 to complete a preliminary operating circuit for a two-step relay 720. The completion of this circuit causes the closure of a pair of preliminary make contacts 721. Thus, the ground provided at the closed contacts 731 is forwarded to the right-hand terminal of the lower winding of the relay 720 to provide a holding and full operating circuit for this relay when ground is removed from the left-hand terminals of the windings of this relay.

The opening of the contacts 713 removes ground from the clutch control terminal of the local tone signaling circuit 130 so that this signal is not transmitted to the plurality of called stations including the remote office 100. The termination of the transmission of this signal causes all of the pulsing control switches in the remote offices to return to a normal position. When this operation has been completed, the transmission of the space control signal from the various called stations is terminated so that the relay 510 is released to open the contacts 511—513. The opening of the contacts 511 removes the ground shunt from the relay 720 so that this relay operates fully to open the contacts 722 and 723. The opening of the contacts 723 interrupts the above described operating circuit for the relay 710 so that this relay releases to restore its contacts to their normal positions. The opening of the contacts 716 interrupts the energizing circuit for the relay 600 so that this relay now remains operated only by virtue of its slow-to-release characteristic. The opening of the contacts 715 interrupts the operating circuit for the relay 1100 so that this relay releases and in turn releases the relay 1110. The closure of the contacts 713 grounds the clutch control terminal of the local tone signaling circuit 130 so that this signal is again transmitted to all of the called stations in the remote offices so as to cause the reoperation of the clutch control relays in these remote stations.

After its delay interval, the relay 600 again releases so that the pulse generator 500 and the relays 530, 600, 610, 660 and 730 operate and release in the manner described above to advance the switch 1200 to its fifty-second position which forms the normal or "home" position. During these operations, the relay 730 is supplied with an operating signal over the wiper 1203 which receives ground from the closed contacts 814 over the conductor 1225. In the "home" position of the switch 1200, the wiper 1207 engages a contact connected to the operating winding of a relay 760 by a conductor 1216 and the cable 1210. This conductor is grounded by the closure of the contacts 737 to connect the ground provided by the wiper 1205 in its normal position to the conductor 1219.

When the relay 760 is operated, a plurality of contacts 761, 763 and 765 are closed and the contacts 762, 764 and 766 are opened. The opening of the contacts 762 interrupts the above described holding circuit for the relay 620 so that this relay releases to restore its contacts to their normal positions. The opening of the contacts 764 again extinguishes the lamp 1569.

After its delay interval, the relay 600 releases so that this relay and the relays 610, 530, 660 and 730 are operated under the control of the pulse generator 500 to advance the stepping switch 1200 to its first stepping position. During these operations, the relay 730 is released to interrupt the above described circuit for the relay 760 so that this relay releases to its normal condition. Further, in view of the release of the relay 620 to close the contacts 625, the above identified relays, in addition to advancing the switch 1200, pulse the clutch mark terminal in the local tone signaling circuit 130 so that the pulsing control switches in all of the remote offices are advanced to their first stepping position. The relay 730 in the circuit 128 is not operated in response to advancing the switch 1200 to its first stepping position inasmuch as the wiper 1202 is not provided with ground in the first position because the relay 1340 representing the called station "1" is released. The corresponding relay representing called station "2" is operated so that the second contact to be engaged by the wiper 1202 is grounded. Accordingly, when the pulse generator 500 controls the above identified relays to advance the stepping switch 1200 and the corresponding switches in the remote offices to their second stepping positions, the relay 730 is again operated over the above described circuit. The operation of the relay 730 performs the same functions described above when this relay is operated in response to advancing to its first stepping position when the called station "1" is called.

When the pulsing control switch in the remote office forming called station "2" advances to its second stepping position, the remote playback circuit in this office operates the connected remote tone signaling circuit to return a mark control signal to the local tone signaling circuit 130 so that the relay 510 is again operated to indicate that the proper called station has been selected. The pulse generator 500 then operates the local playback circuit 128 to advance the switch 1200 and the pulsing control switch in the selected called station in the manner described above so that all of the magnetic recorders in called station '2" are played back to the data register 132 and the output recorder 134. The termination of this playback operation and the selection of called station "3" and the succeeding ones of the fifteen called station is performed in the same manner described above.

*Termination of the Routine Playback Operation*

While the called station formed by the last remote office is being played back, the station selector switch 1250 is being advanced toward its normal or "home" position because of the absence of a ground signal on any of the terminals engaged by the wiper 1252 beyond the last one connected by the cable 1360 to a ground signal representing a called station. This stepping operation is initiated when the relay 560 is operated as described above to release the relay 800 so that the relays 640 and 650 are effective to control the pulsing of the motor magnet 1251. This advancing operation continues until the wipers 1252 and 1253 are returned to their normal or "home" position. In this position, the wiper 1252 engages a contact connected to a conductor 1233 which extends over the cable 1230 to the closed and ground contacts 812.

Thus, when the station selector switch 1250 has been returned to its "home" position, ground is forwarded over the wiper 1252 and the conductor 1232 to again operate the relay 800 when the relay 640 is released to close the contacts 643. When the relay 800 operates, the contacts 803 are again closed to apply ground to the conductor 1235 which is forwarded over the wiper 1253 to a conductor 1234. This ground is forwarded over the cable 1230 to the contacts 576 controlled by the release relay 570. The operation of the relay 800 also interrupts the operation of the relays 640 and 650 so that the station selector switch 1250 is not advanced beyond its "home" position.

When all of the trunk recorders in the last called station have been played back, the relay 570 is again operated in the manner described above to perform the functions described above. However, the closure of the contacts 576 now forwards ground to the operating winding of a relay 740 so that this relay is operated to open the contacts 741 and to close a plurality of contacts 742, 743 and 744. The closure of the contacts 744 completes a holding circuit for the relay 740 shunted around the contacts 576. The operation of the release relay 570 also causes the release of the relay 560, as described above, so that the previously described functions are performed. The pulse generator 500 and the relay 530 are placed in operation so that the relay 620 is again fully operated to open the contacts 625. Thus, the continuing operation of the pulse generator 500 and the relay 530 controls the relays 600, 610, and 660 to restore the pulsing control switch 1200 to its normal position in the manner described above.

When this switch has been advanced to its "home" position, the relay 760 is operated over the above described circuit. The operation of the relay 760 again completes an operating circuit for the relay 600 so that this relay can not release to advance the switch 1200 to its first stepping position from its normal position. The operation of the relay 760 also releases the relay 620 and extinguishes the lamp 1569. In addition, in closing the contacts 761, a circuit prepared by the prior operation of the relay 740 is completed for forwarding ground through the closed contacts 742 and a pair of normally closed contacts 1001 to the conductor 581. The application of ground to this conductor advises the readout control circuit 126 that the routine operation has been completed by the local playback circuit 126 and that the switching means 126*a* is to be advanced to seize the next playback circuit to which the readout control circuit 126 has access. The receipt of the ground signal on the conductor 581 by the readout control circuit 126 also operates this circuit to remove ground from the clutch conductor 585.

When the relay 760 is operated to open the contacts 766, the holding circuit for the relay 900 is opened. Thus, this relay remains operated only by the ground signal provided by the readout control circuit 126. Thus, the removal of this signal releases the relay 900 to restore its contacts to their normal positions. The release of the relay 900 removes ground from the clutch control terminal of the local tone signaling circuit 130 so that the clutch control relays in all of the remote offices or called stations are released. The release of the relay 900 also causes the release of the relays 1020, 810, 620 and 820 and disables the pulse generator 500 and the relay 530. The release of the relay 810 causes the release of the relays 730 and 800, and the release of the relay 730 causes the release of the relay 760. The release of the relay 760 removes the ground from the conductor 531 extending to the readout control circuit 126. The release of the relay 800 causes the release of the relay 740, and the relay 600 at the completion of its time delay interval releases to complete the restoration of the local playback circuit 128 to its normal condition except for the relay 850 which remains in an operated condition.

This relay remains operated until such time as the readout control circuit 126 has completed the playback of all of the magnet trunk recorders to which it has access through either the local playback circuit 128 or any other playback circuit to which the switching means 126*a* has access. When ground is removed from the conductor 584, the relay 850 is released to restore its contacts to their normal position and to complete the return of the local playback circuit 128 to its normal condition.

*Section of a Called Station Requesting an Individual Playback*

When an adapter or trunk recorder such as the adapter recorder 106 in the remote office 100 becomes filled with items of information, the adapter circuit 104, the playback control circuit 120, and the remote playback circuit 122 control the remote tone signaling circuit 124 to transmit a mark control signal to the local tone signaling circuit 130. This signal is demodulated and causes the application of a ground signal to the relay 520 so that this relay is operated to close the contacts 521 and 523 and to open the contacts 522. The closure of the contacts 521 forwards ground through the closed contacts 906 to a conductor 1516 which is forwarded over the cable 1500 and through a pair of normally closed contacts 1537 and 1540 to illuminate a lamp 1551 to indicate that an individual playback has been requested. This ground is further forwarded over a conductor 1519, the cable 1500, and a pair of normally closed contacts 843 to the winding of an individual playback relay 950. This operates the relay 950 to open the contacts 957 and a plurality of contacts 951, 951*a*, 953*a* and 955*a* and to close a plurality of contacts 952, 954, 955, 956, 958, 959, 952*a* and 954*a*. The closure of the contacts 954 completes a holding circuit for the relay 950 extending to the contacts 571.

The opening of the contacts 953 disconnects the conductor 1520 from a path including the closed contacts 932, 912 and 851 and the conductor 583 so as to prevent ground from being applied to the conductor 581 over which the busy test is made by the switching means 126*a* of the readout control circuit. This marks the local playback circuit 128 as requiring an individual playback. The closure of the contacts 956 forwards ground from a pair of normally closed contacts 962 to the clutch control lead of the local tone signaling circuit through the closed contacts 907. As set forth above, this causes the seizure of all of the called stations. The closure of the contacts 952*a* forwards ground over a conductor 1596 and the cable 1590 to illuminate a lamp 1566 to indicate the individual playback condition. The closure of the contacts 952 applies ground through a plurality of normally closed contacts 1003 and 1012 to a conductor 582. This conductor extends over the cable 580 to the readout control circuit 126, and the ground applied to the conductor 582 advises the circuit 126 that an individual playback operation is to be performed.

In response to the receipt of this signal, the readout control circuit 126 is conditioned for operation and applies ground to the clutch conductor 585 when this conditioning operation has been completed. The ground applied to the conductor 585 again causes the operation of the relay 900. The operation of the relay 900 performs the same functions described above with a few exceptions. The opening of the contacts 907 and the closure of the contacts 908 transfers the control over the ground applied to the clutch control terminal of the local tone signaling circuit 130 from the individual playback relay 950 to the relay 900. Further, the opening of the contacts 906 interrupts the operating circuit for the relay 950 so that this relay remains operated over its above described holding circuit.

The operation of the relay 900 causes the operation and release of the relay 830, the operation of the relays 820 and 600, and also renders the pulse generator 500 effective so that the relay 530 is operated and released. The pulse generator 500 operates in the manner described above to transmit ground pulses to the clutch mark terminal of the signaling circuit 130, to operate the relay 660, and to energize the motor magnet 1201 of the pulsing control switch 1200. When the relay 530 is operated by the pulse generator 500 to open the contacts 531, the pulsing control switches in all of the remote stations and the switch 1200 are advanced to their first stepping position. However, since none of the relays 1340 have been operated at this time, the wiper 1202 does not encounter a ground signal, and the pulse generator 500 is effective to continuously advance the stepping switch 1200 to its sixteenth stepping position, the first position beyond the fifteen assigned to the fifteen called stations.

When the relay is released following the movement of the wipers 1202–1207 to their sixteenth position, the ground provided at the closed contacts 955 is forwarded over the conductor 1308, the cable 1300, the contact engaged by the wiper 1202, the wiper 1202 and the conductor 1226 to operate the relay 730. The operation of the relay 730 performs virtually the same functions described above. However, the closure of the contacts 737 forwards ground from the wiper 1204 and the conductor 1219 to the conductor 1217 and the wiper 1206. This ground is forwarded over a conductor 1218 to operate a relay 940 so that the contacts 941 are opened to remove the ground applied to the conductors of the cable 1170.

The first operation of the relay 730, in closing the contacts 735, also operates the relay 810 so that the contacts 811, 812, 814 and 815 are closed and the contacts 813 are opened. The closure of the contacts 815 again completes the holding circuit for the relay 810. The closure of the contacts 812 forwards ground over the conductor 1233, the "home" position contact engaged by the wiper 1252, the conductor 1232, and the closed contacts 643 to again operate the relay 800. This relay operates to open the contacts 801 and to close the contacts 802 and 803. The closure of the contacts 802 completes the above described holding circuit for this relay. The closure of the contacts 803 forwards ground over the conductor 1235 to ground the conductor 1234.

When the pulsing control switches in the called stations are advanced to their sixteenth position, the relays 370 in all of the called stations having at least one adapter recorder requiring a playback operation are operated. Assuming that only an adapter recorder, such as the recorder 106, in the remote office 100 which forms called office "1" requires an individual playback operation, only the relay 370 in the remote playback circuit 122 is operated by movement of its pulsing control switch 210 to its sixteenth position. The operation of this relay conditions the pulsing control switch 210 in called office "1" for following further signals applied to the clutch mark terminal of the local tone signaling circuit 130. Thus, only the pulsing control switch in called station "1" will respond to further pulses applied to the clutch mark terminal of the local tone signaling circuit 130.

The local playback circuit 128 now advances the stepping switch 1200 over the stepping positions seventeen to thirty-one which represent the called stations "1"–"15," respectively, to search for the calling station initiating the individual playback condition. More specifically, the operating circuit for the relay 600 is interrupted by the operation of the relay 730. When the relay 600 is released, the pulse generator 500 and the relays 530, 610, 660 and 730 control the application of operating signals to the stepping switch 1200 and to the pulsing control switches in the remote offices, the switch 210 in the remote playback circuit 122 being the only remote pulsing control switch that is effective to follow these signals. When the relay 730 first releases, the operating circuit for the relay 940 is interrupted so that the contacts 941 are closed to again apply ground to all of the conductors in the cable 1170.

At the end of the first cycle of operation of these relays, the wipers 1202–1207 are advanced to the seventeenth stepping position representing the called station "1." When the pulsing control switch in the remote office 100 is advanced to its seventeenth position representing called station "1," the remote playback circuit 122 operates the remote tone signaling circuit 124 so that a space control signal is returned over the link to the local tone signaling circuit 130. This causes the operation of the relay 510 so that the contacts 511–513 are closed. The relay 730 is operated when the relay 660 releases because of the ground forwarded through the closed contacts 661 from the wiper 1202 in its seventeenth position. The operation of the relay 730 performs the same function described above including the interruption of the energizing circuit for the relay 600. The ensuing operations of the pulse generator 500 are not effective to advance the pulsing control switch in the called station "1" or the switch 1200 because of the interruption of the pulsing circuits due to the operation of the relay 730.

When the relay 600 releases, the pulse generator 500 causes the operation of the relay 610 so that the alternate pulsing circuits are completed. However, when the relay 610 operates, the contacts 614 are closed so that the next release of the pulse generator 500 to close the contacts 502 forwards ground over the path including the closed contacts 513, 523, 555 and 614 to the conductor 1217. This ground is forwarded from the conductor 1217 to the wiper 1206 and the conductor 1381 to operate the relay 1330 representing the answering at the called station "1." This signal also illuminates the lamp 1364 to provide a visible indication that the called station "1" has been seized. The operation of the relay 1330 performs the same functions as described above, except that the relay 1340 is not operated now. Thus, the closure of the contacts 1331 serves to directly interconnect the conductor 1301 and 1302 through the closed contacts 1331 and 1341. In addition, since the conductor 1308 is grounded at the closed contacts 955, the closure of the contacts 1338 forwards this ground over the conductor 1371 to ground the first contact engaged by the wiper 1202.

When the pulse generator 500 releases to operate the relay 1330, the relay 530 is released to close the contacts 531. The closure of these contacts energizes the motor magnets for the pulsing control switch in the remote office 100 and the switch 1200 and operates the relay 660 so that the relay 730 is released. The pulse generator 500 and the relays 530, 600, 610, 660 and 730 now operate in the manner described in detail above to advance the stepping switch 1200 in the local playback circuit 128 and the pulsing control switch in the remote playback circuit 122 in the remote office 100 to their thirty-second position.

At the called station "1," the advance of the pulsing control switch beyond its seventeenth step controls the remote playback circuit 122 to remove the space control tone so that the relay 510 is released. When the switch 1200 advances to its thirty-second position, the relay 730 is again operated by the ground provided on the wiper 1203. The remote playback control circuit 122, upon reaching the thirty-second stepping position, controls the remote tone signaling circuit 124 so that the space control signal is returned to the local tone signaling circuit 130 to cause the operation of the relay 510. Therefore, when the relay 730 operates, the closure of the contacts 737 forwards ground over the conductor 1217, the wiper 1207 and the conductor 1215 to again operate the relay 550. The operation of the relay 550 performs the same functions described above. In addition, the closure of the contacts 552 forwards ground from the closed contacts 1014 through the closed contacts 1053 and 958, the conductor 1301, the closed contacts 1341 and 1331, the conductor 1302, the closed contacts 512 and 1142 to operate the relay 1030.

In operating, the relay 1030 closes the contacts 1031 and 1033 and opens the contacts 1032. The closure of the contacts 1031 again completes a holding circuit for the relay 1030, and the closure of the contacts 1033 forwards ground through the closed contacts 959 to a conductor 1222. This signal grounds the thirty-seventh contact engaged by the wiper 1203.

Referring back to the above described operation of the relay 730, the operation of this relay again interrupts the operating circuit for the relay 600 so that after its time delay interval, this relay releases to again close the contacts 601. When the relay 530 is next operated by the pulse generator 500, the relay 610 is again operated and the relays 600, 610, 660 and 730 again initiate step-by-step movement of the switch 1200 and the corresponding switch in the remote playback circuit 122. In view of the fact that the wipers 1202 and 1203 are not supplied with ground in the thirty-third to thirty-sixth stepping positions, the pulsing control switches in the remote office is operated directly under the control of the relays 530 and 660 and without the use of the relays 600, 610 and 730. However, when the switch 1200 is advanced to its thirty-seventh position, the ground previously applied to the conductor 1222 is returned over the wiper 1203 and the conductor 1226 to cause the operation of the relay 730 when the relay 660 releases. The operation of the relay 730 performs its usual functions and, in closing the contacts 737, forwards ground over the conductor 1217 to the wiper 1207. In the thirty-seventh position in the switch 1200, the ground provided at the wiper 1207 is forwarded over the conductor 1212 to again operate the relay 560. As described above, the operation of the relay 560 disables the pulse generator 500, completes an energizing circuit for the relay 600 to prevent its release, prepares a partial operating circuit for the relay 620 so that the contacts 621 are closed, connects the data register 132 to the local tone signaling circuit 130, and releases the relay 540 so that the clutch mark terminal of the local tone signaling circuit 130 is controlled over the clutch conductor 585 by the readout control circuit 126.

In the remote office 100, the filled adapter recorder 106 is rendered effective by the remote playback control circuit 122 when the pulsing control switch 210 is advanced to its thirty-seventh stepping position so that the data stored in the filled recorder is transmitted over the signaling link to the data register 132 and the output recorder 134.

*Release of the Called Station That Initialed the Individual Playback*

After all of the items of information stored on the filled recorder have been played back, the remote palyback control circuit 122 controls the signaling circuit 124 so that the relay 520 is released by the local tone signaling circuit 130. In releasing, the relay 520 closes the contacts 522 so that the release relay 570 is operated. The operation of the relay 570 performs the same functions described above including the closure of the contacts 576 to operate the relay 740. The operation of the relay 570 also causes the release of the operated relay 1330 representing the selected called station and at the relay 560. When the relay 560 is released, the ground shunt for the windings of the two-step relay 620 is removed so that this relay operates fully to perform the same functions described above.

In addition, the opening of the contacts 571 opens the holding circuit for the indiivdual playback relay 950 so that this relay releases to restore its contacts to their normal position. In addition, when the relay 950 is released, the above described path for operating the relay 730 is interrupted so that this relay releases to prepare the paths for pulsing the motor magnet 1201 and advancing the pulsing control switches 210 in the remote offices. The release of the relay 730 also opens the holding circuit for the relay 1030 so that this relay releases.

When the relay 560 is released to close the contacts 565*a*, the pulse generator 500 is again placed in operation so that the relay 530 is alternately operated and released. This operation of the relay 530 advances the stepping switch 1200 to its fifty-first stepping position. The operation of the switch 1200 to its fifty-first position together with the restoration of the pulsing control switches in all of the remote offices to their normal positions releases the relay 510 to cause the restoration of the local playback circuit 128 to its normal condition in the same manner described above at the conclusion of the routine playback operation. However, it should be noted that the individual playback relay in the readout control circuit 126 remains operated so that the conductor 583 is held at ground potential until all of the individual playback requests have been satisfied. The maintainence of ground on the conductor 583 forwards ground to the lead of all the playback circuits corresponding to the leads 581 of the local playback circuit 128, that have not requested an individual playback. Thus, these circuits can not be seized during an individual playback operation.

*Manually Controlled Operation of the Local Playback Circuit 128*

The local playback circuit 128 can be manually operated to play back adapter recorders in a selected called station, to play back the test recorders in a selected called station, to place a selected called station in alarm or, to select a called station for steady pulsing or the application of test tone. To condition the circuit 128 for manual operation, a manually operated selector switch 1260 is operated to a position representing the desired station. Assuming that manual operations are to be performed on called station "1" in remote office 100, a pair of wipers 1261 and 1262 of the switch 1260 are adjusted to a position engaging the uppermost contacts in the related arcuate banks of contacts. The ground connected to the wiper 1262 is forwarded over a conductor 1238 to complete an operating circuit for a manual relay 840. In operating, the relay 840 closes a plurality of contacts 841, 842, 844, 845, 846 and 847 and opens the contacts 843 and 848. The opening of the contacts 843 prevents the operation of the relay 950 so that an individual playback operation can not be initiated. The closure of the contacts 842 connects the circuit for normally operating the relay 950 to a conductor 1518 which extends over the cable 1500 and through a pair of normally closed contacts 1538 to a buzzer 1550. Thus, an audible indication is provided if an attempt is made to establish an individual playback condition during the manually controlled operation of the local playback circuit 128.

*Manually Selected Routine Playback Operation*

If a routine playback operation is to be performed, a pair of contacts 1528 are momentarily closed so that ground is forwarded from the closed contacts 951 through the closed contacts 841, the conductor 1506, the contacts 1528, a conductor 1507 and a pair of normally closed contacts 914 to the winding of a relay 910. In opening, the relay 910 closes a plurality of contacts 911, 913, 917 and 918 and opens the contacts 912, 914, 915 and 916. The contacts 913 and 914 form a make-before-break arrangement so that the contacts 913 close to complete a holding circuit for the relay 910 extending to the closed contacts 571 prior to the opening of the contacts 914 to interrupt the above described operating circuit. The opening of the contacts 912 interrupts the circuit for applying ground to the conductor 581 individual to the playback circuit 128, thereby to mark this circuit as idle. The closure of the contacts 911 forwards ground through the closed contacts 1003 and 1012 to ground the conductor 582. This initiates the operation of the readout control circuit 126 to search for and seize only the local playback circuit 128. The closure of the contacts 918 forwards ground over a conductor 1595 to illuminate a lamp 1565 to provide a visible indication that a routine playback operation has been selected.

When the readout control circuit 126 and the associated recorders and registers, such as the components 132 and 134, are conditioned for operation, ground is again applied to the clutch conductor 585 so that the relay 900 is again operated to perform the functions described in detail above. However, the closure of the contacts 903 forwards ground over a conductor 1237 to ground the wiper 1261 of the selector switch 1260. The ground supplied to the wiper 1261 is forwarded over the conductor 1271 and the cable 1270 to operate the relay 1340. The operation of the relay 1340 performs the functions described above and provides an indication that called station "1" is the one selected by the setting of the switch 1260.

The local playback circuit now operates in the manner described above except that the station selector switch 1250 is not operated because of the prior operation of the relay 1340 under the control of the manually actuated selector switch 1260. A second exception rises out of the direct operation of the relay 730 under the control of the operation of the relay 900. When the relay 900 operates to close the contacts 904, the ground provided on a conductor 1511 by a normally closed pair of contacts 1531 is forwarded through the contacts 845 closed by the operation of the relay 840 and through the closed contacts 813 to a conductor 1225. The ground on the conductor 1225 is extended over the cable 1210 to the wiper 1203 and is returned over the conductor 1226 to the relay 730.

The relay 730, in operating, closes the contacts 737 so that the ground supplied to the wiper 1205 in the normal position of the switch 1200 is forwarded over the conductor 1219 and through the contacts 737 to the conductor 1217. The ground from the conductor 1217 is further forwarded over the conductor 1216 to operate the relay 760. When the relay 760 operates, ground from the closed contacts 844 is forwarded over a conductor 1598 to illuminate a manual waiting lamp 1568. When the relay 830 is operated and released and the relay 820 is operated, the relay 610 is operated under the control of the pulse generator 500 in the manner described above. The operation of the relay 610 permits the pulse generator 500 to control the application of pulses to the motor magnets of the pulsing control switches in the remote stations and to the motor magnet 1201. These pulses are also rendered effective to operate the relay 660 so that the relays 730 and 760 are released to restore their contacts to their normal positions. When the pulse generator 500 next restores, the motor magnets are released to advance the switch 1200 and the related switches in the remote circuits to their first position. Since the station selected by the switch 1260 is called station "1," the wiper 1202 is grounded in its first stepping position to cause reoperation of the relay 730. The operation of the relay 730 initiates a routine operation that is performed by the local playback circuit 128 in the manner described in detail above.

When all of the trunk or adapter recorders such as the recorders 106 and 108 have been played back the relay 520 is again released to operate the relay 570. When this relay operates, the contacts 571 are opened to release the relay 910. When the relay 910 releases, the routine playback lamp 1565 is extinguished, and the closure of the contacts 912 applies ground to the conductor 581. The application of ground to the conductor 581 operates the readout control circuit 126 to remove ground from the clutch conductor 585 so that the relay 900 is placed under the control of the relay 760. The readout control circuit 122 is also prepared for operating the switching means 126*a* to release the local playback circuit 128. When the relay 730 restores, the pulse generator 500 is rendered effective to return the stepping switch 1200 to its normal position. When the switch 1200 is restored to normal, the relays 730 and 760 are operated. The operation of the relay 760 opens the holding circuit for the relay 900 so that this relay releases. It should be noted that the closure of the contacts 765 forwards a holding ground to the relay 600 from the closed contacts 847 to prevent its release until after the relay 900 has released to restore the circuit 128 to normal. With the release of the relay 900, all of the operated relays in the local playback circuit 128 are released with the exception of the manual relay 840 which remains operated under the control of the selector switch 1260. This relay can be restored by returning the switch 1260 to the setting shown in FIG. 12. If another remote station is to be routined, the selector switch 260 is merely adjusted to the setting corresponding to the desired called station, and the contacts 1528 are again momentarily closed.

*Manual Selection of an Individual Playback Operation*

A selected individual playback performs substantially the same operation as a selected routine playback except that only the filled adapter recorders in the called station are played back to the readout equipment. This operation is desirable in the event that the readout equipment in one of the called stations has been out of service for a period of time due to an alarm condition. The selected individual playback makes it possible for only the filled recorders in the disabled office to be played back when the equipment is returned to service.

In order to initiate a selected individual playback, the manual selector switch 1260 is adjusted to a setting corresponding to the desired called station, and a selected individual playback key is operated to momentarily close a pair of contacts 1527. This forwards the ground from the conductor 1506 over a conductor 1505 and a pair of closed contacts 934 to operate a relay 930. When the relay 930 operates, a plurality of contacts 931, 933, 936, 937 and 938 are closed and the contacts 932, 934 and 935 are opened. These contact actuations produce substantially the same functions as the operation of the relay 910. The closure of the contacts 97 ground the conductor 1596 so that the individual playback lamp 1566 is illuminated. The closure of the contacts 936 prepares a circuit for grounding the conductor 1222, which circuit is parallel to the circuit controlled by the contacts 959 on the individual playback relay 950. The local playback circuit 128 operates to perform an individual playback operation in the manner described above for the selected routine playback to cause the transmission of items of information from any filled adapter recorders in the selected called station to the data register 132 and the output recorder 134.

*Manually Selected Test Recorder Playback*

When the accuracy or test recorder in one of the called stations to be played back to check the operability of the data transmitting link, the manual station selector switch 1260 is adjusted to a setting corresponding to the desired called station, and a selected accuracy playback key is operated to momentarily close a pair of contacts 1526. This forwards the ground provided on the conductor 1506 over a conductor 1504 and a pair of normally closed contacts 922 to operate a relay 920. In operating, the relay 920 closes a plurality of contacts 921, 923, 924 and 926 and opens the contacts 922, 925 and 927. The contacts 921 and 922 form a make-before-break contact arrangement so that the closure of the contacts 921 completes a holding circuit for the relay 920 extending to the closed contacts 571 prior to the opening of the contacts 922. The closure of the contacts 926 grounds a conductor 1594 so that a selected accuracy playback lamp 1564 is illuminated. The closure of the contacts 923 completes an obvious operating circuit for the relay 910 so that this relay operates to perform the functions described above.

When the readout control circuit 126 and its associated components are in condition for operation, the relay 900 is again operated by the application of ground to the conductor 585. The operation of the relay 900 causes the local playback circuit 128 to operate as set forth above in the description of the selected routine playback operation, so that the pulsing control switch in the selected called station and the stepping switch 1200 are advanced to their forty-first stepping positions. In the forty-first positon, the closed contacts 917, 924 and 1033 forward ground over a conductor 1220 to the wiper 1226 to operate the relay 730. In the selected called station, the movement of the pulsing control switch to its forty-first stepping position causes the associated playback control circuit to initiate a routine playback operation and places the return of the pulsing control switch under the control of the playback control circuit 120. The playback control circuit now seizes the test recorder 138, and this recorder is operated to play back the test information to the data register 132 when the relay 540 is released to close the contacts 541.

When the testing operation has been completed, the circuits 120 and 122 in the called station are returned to a normal condition and the transmission of the mark control signal from the remote tone signaling circuit 124 is terminated so that the relay 520 is released. The release of the relay 520 again causes the operation of the release relay 570 and the restoration of the local playback circuit 128 to its normal condition, the relays 910 and 920 being released by the opening of the contacts 571.

*Placing a Selected Called Station in an Alarm Condition*

When it becomes necessary to place a selected one of the called stations in an alarm condition, the manually controlled station selector switch 1260 is adjusted to a setting corresponding to the called station to be placed in an alarm condition, and an alarm selected station key is operated to momentarily close a pair of contacts 1529.

The closure of these contacts forwards ground from a pair of normally closed contacts 902 and a conductor 1509 over a conductor 1508 and a pair of normally closed contacts 759 to operate a relay 750. In operating, the relay 750 closes a plurality of contacts 751, 752, 755, 756 and 758 and opens the contacts 753, 754, 757 and 759. The contacts 758 and 759 form a make-before-break contact arrangement so that the closure of the contacts 758 completes the holding circuit for the relay 750 extending to the closed and grounded contacts 722 prior to the opening of the contacts 759.

The closure of the contacts 751 grounds the conductor 581 so that the playback control circuit 128 can not be seized by the readout control circuit 126. The closure of the contacts 752 grounds a conductor 1223 so that the thirty-fourth contact in the bank engaged by the wiper 1203 is grounded to indicate the desired alarm operation. The closure of the contacts 755 completes an operating circuit for the relay 900 so that this relay operates. When the relay 900 operates, the conductor 1237 is grounded so that the one of the called station relays similar to the relay 1340 selected by the switch 1260 is operated. The operation of the relay 900 also performs the operations described in detail above in conjunction with the normal routine playback operation and the selected routine playback operation.

When the pulse generator 500 is rendered effective, the relay 760 is again operated as described above in conjunction with the selected routine playback operation. However, the operation of the relay 760, in interrupting the holding circuit for the relay 900 at the opened contacts 766, does not release this relay because of the ground applied by the closed contacts 755. The operation of the relay 900 also causes the operation and release of the relay 830 and the operation of the relays 810 and 820. In addition, the operation of the relay 810 closes the contacts 812 to ground the conductor 1233 so that the relay 800 is operated over the above described circuit.

The pulse generator 500 and the relays 530, 600, 610 and 660 operate as described above to advance the stepping switch 1200 and also the pulsing control switches in all of the remote offices to their first position, the relay 760 being released during this operation. The pulse generator 500 then advances all of the pulsing control switches in the called stations in synchronism with the switch 1200 until the wiper 1202 engages the contact grounded by the operation of the selected one of the relays similar to the relay 1340. At this time, the relay 730 is operated to momentarily arrest the step-by-step movement of the remote pulsing control switches and the switch 1200. When the remote pulsing control switches are momentarily arrested in the position corresponding to the selected called station, the selected one of the remote playback circuits 122 enables its pulsing control switch to follow clutch mark signals subsequently transmitted by the local playback circuit 128. The remaining pulsing control switches are disabled from control by the local playback circuit 128. At this time, the selected called station also forwards a signal over the link to the local signaling circuit 130 which causes the operation of the relay 520.

The pulse generator 500 now controls the relay 530 to advance the pulsing control switch in the selected remote station and the switch 1200. The selected remote station operates as described above to momentarily operate the relay 510 so that the contacts 513 are closed in the position of the switch 1200 corresponding to the station answer of the selected called station. This forwards ground to the conductor 1217 and over one of the wipers 1206 or 1207 to ground the one of the conductors in the cable 1380 corresponding to the selected station answer relay. This relay, like the relay 1330, is operated as an indication that the called station has answered. Thus, one of the lamps similar to the lamp 1364 is illuminated to provide a visual indication that the selected station has answered. The pulse generator 500 and the relays 530, 600, 610 and 660 then control the advance of the pulsing control switch in the selected called office and the switch 1200 to the thirty-second stepping position. When this position is reached, the relay 550 is operated under the control of the ground provided on the wiper 1207. When the relay 550 is operated, the relay 1030 is operated over the circuit described above.

The pulse generator 500 then advances the switch 1200 and the pulsing control switch in the selected called office from the thirty-second stepping position to the thirty-fourth stepping position. When the called station pulsing control switch is stopped in the thirty-fourth stepping position, the remote playback circuit 122 establishes an alarm condition. This pulsing control switch is held in its thirty-fourth stepping position until a restoring signal is received from the local playback circuit 128.

In the local playback circuit 128, the movement of the wiper 1203 to the thirty-fourth stepping position forwards the ground provided on the conductor 1223 to the conductor 1226 so that the relay 730 is operated when the relay 660 is released to close the contacts 661. When the relay 730 operates to close the contacts 737, the ground strapped to the contact in the thirty-fourth stepping position is forwarded over the wiper 1205, the conductor 1219, the contacts 737, the conductor 1217, and the conductor 1213 to operate a relay 1160. When the relay 1160 operates, a plurality of contacts 1161 and 1163 are closed and a pair of contacts 1162 are opened. The closure of the contacts 1163 completes an obvious operating circuit for the release relay 570 so that this relay operates. In operating, the relay 570 closes the contacts 572, among others, so that this relay remains operated over the holding circuit extending to the closed contacts 714. The operation of the release relay 570, in opening the contacts 573, interrupts the path for applying ground pulses to the clutch mark terminal of the local tone signaling circuit 130. Thus, the pulsing control switches in the called stations are not controlled by the pulse generator 500.

The above described operation of the relay 730 causes the release of the relay 600 so that the pulse generator 500 and the other pulsing control relays are effective to advance the stepping switch 1200 to its fifty-first stepping position, the relay 1160 being released by this operation. In the fifty-first stepping position, the wiper 1203 forwards ground to again operate the relay 730 when the relay 660 releases to close the contacts 661. In operating, the relay 730 closes the contacts 737 so that the relay 710 is operated over the circuit including the conductor 1211, the wiper 1207 and the conductor 1217. The operation of the relay 710 prevents the release of the relay 600, partially operates the relay 620 to close the contacts 621, removes ground from the clutch control terminal of the signaling circuit 130 so that pulsing control switches in all of the called stations except the alarmed station are "homed," and releases the relays 570 and 550 in the manner described above. In addition, the closure of the contacts 718 forwards ground through the closed contacts 756 to a conductor 1310. This conductor is connected through the closed contacts on the operated selected station relay, similar to the contacts 1345, to operate the proper one of the alarm relays, such as a relay 1320.

Assuming that the called station "1" has been placed in an alarm condition, the relay 1320 is operated to open the contacts 1321 and to close a plurality of contacts 1322, 1323, 1324, 1325 and 1326. The closure of the contacts 1325 completes a holding circuit for the relay 1320 extending over a conductor 1311, a pair of normally closed contacts 1524 and a conductor 1502 to a pair of closed and grounded contacts 965. The closure of the contacts 1324 illuminates a lamp to indicate that the called station "1" has been placed in an alarm condition. The opening of the contacts 1321 removes ground from the conductor 1361 so that the selector switch 1250 can not be stopped in a setting corresponding to the called station "1" during routine playback. The closure of the contacts 1326 supplies ground to a conductor 1312 which extends to the buzzer 1550 through the closed contacts 1538. This provides an audible indication that one of the called stations is in an alarm condition.

During the homing of the pulsing control switches in the remainder of the called stations, a space control signal is again returned so that the local tone signaling circuit 130 supplies an operating signal to the relay 510. In operating, the relay 510 closes the contacts 511 so that ground is again forwarded from the closed contacts 711 on the operated relay 710 to complete the preliminary operating circuit for the relay 720 so that this relay closes the contacts 721. When the last of the pulsing control switches in the called stations has been returned to its "home" position, the space control signal is removed from the transmission link so that the local tone signaling circuit 130 releases the relay 510. When this relay is released, the relay 720 operates fully to open the contacts 722 and 723.

The opening of the contacts 722 interrupts the holding circuit for the relay 750 so that this relay releases. The opening of the contacts 723 interrupts the operating circuit for the relay 710 so that this relay releases. When the relay 710 releases, the relay 620 is fully operated as described above. The release of the relays 710 and 750 permits the pulse generator 500 to control the relays 530, 600, 610, 660 and 730 so that the relay 730 releases and the pulsing control switch 1200 is advanced to its fifty-second or "home" position in the manner described in detail above. The release of the relay 730 releases the relay 720. With the switch 1200 in its "home" position, the release of the relay 660 again causes the operation of the relay 730, and the operation of the relay 730 causes the operation of the relay 760 over the circuit described above. When the relay 760 is operated, the relays 620 and 900 are released and the relay 600 is operated, so as to cause the release of the relay 610 under the control of the relay 530. When the relay 900 restores, all of the remote stations except the station placed in alarm condition are released and all of the remaining relays in the local playback circuit 128 with the exception of the operated relay 840 and the operated one of the alarm relays, such as the relay 1320, are released.

*Selection of a Called Station for Steady Pulsing*

When it is desirable to test, for instance, the operation of the pulsing control switch 210 in the called station "1" at the remote office 100, the manual station selector switch 1260 is adjusted to a setting corresponding to the called station "1," and a selected steady pulsing key is operated to open the contacts 1531 and to close a plurality of contacts 1530 and 1532. The closure of the contacts 1532 forwards ground from the closed contacts 902 over the conductor 1509, the contacts 1532, a conductor 1512 and a pair of normally closed contacts 633 to operate a relay 630. In operating, the relay 630 closes a plurality of contacts 631, 632 and 635 and opens the contacts 633 and 634. The contacts 632 and 633 form a make-before-break contact arrangement so that the contacts 632 close to complete a holding circuit for the relay 630 extending to ground over a conductor 1510 and the closed contacts 1530 prior to the opening of the contacts 633. The opening of the contacts 634 disconnects the winding of the relay 660 and the motor magnet 1201 from the alternate pulsing circuit controlled by the relay 610. The closure of the contacts 631 forwards ground through the closed contacts 1001 to the conductor 581 to mark the local playback circuit 128 in the banks of the switching means 126 to prevent the seizure of this circuit by the readout control circuit 126. The closure of the contacts 635 completes an obvious operating circuit for the relay 900.

The operation of the relay 900 grounds the conductor 1237 so that the selected station relay 1340 corresponding to the called station "1" is operated over the above described circuit. The operation of the relay 900 also performs the functions described above in grounding the clutch control terminal of the local tone signaling circuit 130 so that all of the remote stations are seized and so that the pulse generator 500 is rendered effective. Further, the relay 830 is operated and released and the relay 820 is operated in the manner described above. The operation of the relay 820 again operates the relay 600 to prevent the operation of the relay 610.

The pulse generator 500 now operates the relay 530 so that the pulsing control switches in all of the called stations and the switch 1200 are advanced. When the wipers of the switch 1200 are advanced to the position corresponding to the operated relay 1340, the relay 730 is again operated to interrupt the operating circuit for the relay 600 and to close the operating circuit for the relay 810. When the relay 810 is operated, the ground supplied to the conductor 1233 again completes an operating circuit for the relay 800, the station selector switch 1250 being in its normal or "home" position. The operation of the relay 800 interrupts the operating circuit for the relays 640 and 650. When the relay 600 releases, the relay 610 is again operated to close the contacts 611 and 612, among others. The closure of the contacts 611 is no longer effective to complete the alternate operating paths for the stepping switch 1200 and the relay 660 because of the prior opening of the contacts 634. However, the closure of the contacts 612 again completes the above described circuit so that the continuing operation of the pulse generator 500 results in the application of the operating signals to the clutch mark terminal of the local tone signaling circuit 130. Thus, the wipers of the pulsing control switch 210 in the selected called station "1" is advanced. The pulsing control switches in the other called stations and the pulsing control switch 1200 in the local playback circuit 128 remain in a position corresponding to the selected remote station.

This pulsing of the selected called station by the pulse generator 500 in the local playback circuit 128 continues until such time as the selected steady pulsing key is restored to its normal position which the contacts 1530 and 1532 are opened and the contacts 1531 are closed. The opening of the contacts 1530 interrupts the holding circuit for the relay 630 so that this relay restores. In releasing, the relay 630 closes the contacts 634 so that the pulse generator 500 is now effective to operate and release the relay 660 and to pulse the motor magnet 1201 of the stepping switch 1200. When the relay 660 operates to open the contacts 661, the relay 730 is released. The stepping switch 1200 is now advanced to its "home" position in the manner described above. On reaching its "home" position, the stepping switch 1200 restores the local playback circuit 128 to its normal position in the manner described in detail above.

*Selection of a Called Station for Transmission of Steady Test Tone*

In order to check the transmission characteristics between the local tone signaling circuit 130 and a selected one of the remote tone signaling circuits, such as the circuit 124 in the remote office 100, the manual station selector switch 1260 is adjusted to a setting corresponding to the desired called station, and a locking type selected test tone key is actuated to open the contacts 1534 and to close the plurality of contacts 1533 and 1535. The closure of the contacts 1535 connects ground to the conductor 1510 to prepare a holding circuit for the relay 630. The opening of the contacts 1534 disconnects the conductors 1513 and 1514 so that the closure of the contacts 612 by the operation of the relay 610 is no longer effective to apply ground signals to the clutch mark terminal of the local tone signaling circuit 130. The closure of the contacts 1532 completes the above described operating circuit for the relay 630 so that this relay operates.

The operation of the relay 630 performs the same functions as described above including operating the relay 900. The local playback circuit 128 now operates in the manner described above in conjunction with the application of steady pulsing to a selected one of the called stations so that the selected called station is connected to the local playback circuit 128. However, the operation of the relays 610 and 730 does not prepare circuits for advancing the pulsing control switches in the selected called station inasmuch as this pulsing circuit is interrupted at the open contacts 1534. When the relay corresponding to the relay 370 in the remote playback circuit 122 is operated, the signaling channels between the local signaling circuit 130 and the selected remote tone signaling circuit 124 are established, and the operability of these links, such as the transmission levels, can be checked. When the selected test tone key is released to open the contacts 1533 and 1535 and to close the contacts 1534, the local playback circuit 128 is restored to a normal condition in substantially the same manner as following the release of the selected steady pulsing key.

OPERATION OF THE LOCAL PLAYBACK CIRCUIT 128 WHEN ABNORMAL OPERATING CONDITIONS ARISE

Among the abnormal operating conditions that can be encountered during the operation of the local playback control circuit 128 are the failure of called stations to answer during routine or individual playback or the answering of more than one station during an individual or routine playback. The local playback control circuit 128 makes several attempts to secure either an answer from the selected station or the response of only a single selected station. If after the completion of this plurality of attempts, more than one station answers a call on a routine playback, the circuit 128 stops to await correction of the circuit by test personnel. If more than one called station answers on an individual playback operation, the lowest numbered station requesting an individual playback is seized, and the readout control circuit 126 is then freed to seize any other playback control circuits requesting individual playback. When the local playback circuit 128 is next seized, the next highest numbered called station requiring individual playback is seized. This operation continues until all requests for individual playbacks have been satisfied.

*Operation of the Playback Circuit 128 When More Than One Called Station Answers During a Routine Playback*

When ever more than one remote station answers during an automatic routine playback operation, the local playback circuit 128 does not make an attempt to readout the information from any of the called stations, but operates the stepping switch 1200 directly from position thirty-three to position fifty-one. This releases all of the called stations to their "home" position, and the switch 1200 is returned to its "home" position. The local playback circuit 128 then proceeds to call the desired remote station again. If two remote stations again answer, the stepping switch 1200 is again returned to its "home" position so that all of the pulsing control switches in the called stations are also returned to their "home" position. The local playback circuit 128 now operates the switch 1200 to its thirty-fourth position and stops so that test personnel can correct the improper operating condition.

More specifically, the routine playback operation is initiated as described above, and during the first cycle of operation of the stepping switch 1200, the wipers 1206 and 1207 advance over the contacts forming the seventeenth to thirty-first stepping position during which only a single one of the station answer relays, such as the relay 1330, should be operated. Assuming however, that due to improper circuit operation, both the first and second called stations answer, the relay 1330 as well as a relay 1390 representing called station "2" are operated. The closure of the contacts 1332 and of a pair of contacts 1391 interconnect a pair of conductors 1303 and 1304 to prepare an operating circuit for a relay 1140.

When the stepping switch 1200 is then advanced to its thirty-second position, the relay 550 is operated in the manner described above to close the contacts 552 so that ground is forwarded over the conductors 1303 and 1304 to operate the relay 1140. In operating, the relay 1140 closes a plurality of contacts 1141, 1143 and 1145 and opens the contacts 1142 and 1144. The closure of the contacts 1145 shunts the path controlled by the answer relays so that the relay 1140 is maintained operated over a portion of its operating circuit. The opening of the contacts 1142 interrupts the above described operating circuit for the relay 1030 so that this relay can not be operated. By preventing the operation of the relay 1030, the path for applying ground to the conductor 1221 is maintained in an open condition, and the stepping switch 1200 can not be stopped in its thirty-ninth stepping position representing a routine playback operation. The closure of the contacts 1141 completes a preliminary operating circuit for a two-step relay 1130. This circuit extends from the upper winding of the relay 1130 through a pair of normally closed contacts 1133, the contacts 1141, the closed contacts 567, a pair of normally closed contacts 1162, the conductor 1311, the contacts 1524, the conductor 1502, and the closed contacts 965. The completion of this preliminary operating circuit closes a pair of contacts 1131 to provide a full operating and holding circuit for the relay 1130.

The closure of the contacts 1143 forwards ground through the closed contacts 1135 to operate the relay 1100 which in turn, operates the relay 1110 in the manner described above. When the relays 1100 and 1110 are operated, the plurality of conductors in the cable 1170 are disconnected from the source of ground so that all of the station answer relays are released. The opening of the contacts 1332 and 1339 does not release the relay 1140 because of the prior closure of the contacts 1145.

The pulse generator 500 now advances the stepping switch 1200 to its fifty-first stepping position at which time the relay 710 is operated in the manner described above to release the relay 550. Since the relay 550 provides the holding ground for the relay 1140, the release of the relay 550 causes the release of the relay 1140. When the relay 1140 releases, the ground shunt for the relay 1130 is removed so that this relay fully operates to open the contacts 1133 and 1135 and to close a plurality of contacts 1132 and 1134. The closure of the contacts 1134 ground the conductor 1593 to illuminate the "two station answer" lamp 1563. The closure of the contacts 1132 prepares an operating circuit for a relay 1120. The closure of the contacts 1142 when the relay 1140 releases prepares a portion of the operating circuit for the relay 1030, and the opening of the contacts 1143 together with the opening of the contacts 1135 opens the operating circuit for the relay 1100 so that this relay and the relay 1110 release to again connect ground to the conductors in the cable 1170.

It should be noted that during movement of the stepping switch 1200 from the thirty-second to fifty-first positions, the wiper 1203 is advanced over the contacts in the bank associated therewith. However, the conductors 1220, 1221 or 1222 are not provided with ground, and the relay 730 is not operated. Since the relay 730 is not operated, ground can not be applied over the conductor 1217 to the wiper 1207 so that the conductor 1212 is not grounded. Since this conductor is not grounded, the relay 560 is not operated during the first cycle of operation of the pulsing control switch 1200. This means that the relay 800 remains operated to prevent the operation of the relays 640 and 650. Since these relays fail to operate, the motor magnet 1251 can not be energized and the automatic station selector switch 1250 remains in its first stepping position in which only the relay 1340 is operated.

The pulse generator 500 now restores the stepping switch 1200 to its first stepping position and advances it over stepping positions one to thirty-two. If, only a single called station responds, during this second cycle of the switch 1200, the relay 1140 is not operated and the relay 1030 can be operated to provide a ground in the thirty-ninth stepping position of the wiper 1203 to arrest movement of the switch 1200 to permit the performance of the routine playback operation. However, if more than one called station should again answer so that two or more of the station answer relays are again operated, the relay 1140 again operates to perform the functions described above. However, the closure of the contacts 1141 now completes the circuit through the closed contacts 1132 for partially operating a two-step relay 1120. The partial operation of this relay closes a pair of contacts 1123. Further, since the relay 1130 has been maintained operated to hold the contacts 1135 in an open condition, the operation of the relay 1140 does not result in the operation of the relays 1100 and 1110. Thus, the holding circuits for the plurality of operating station answer relays remain intact, and all of these relays remain in an operated condition.

The pulse generator again operates the stepping switch 1200 to its fifty-first position so that the pulsing control switches in the called stations are "homed" and the relay 1140 is again released in the manner described above during the first cycle of operation of this switch. When the relay 1140 restores the second time, the relay 1120 is fully operated so that the contacts 1122 and 1126 are opened and a plurality of contacts 1121, 1124 and 1125 are closed. The closure of the contacts 1121 grounds the conductor 1518 so that the buzzer 1550 is again energized to provide an audible indication of the improper operating condition. The closure of the contacts 1124 forwards ground over a conductor 1309 to the operating circuits for the station alarm relays representing the fifteen called stations. Since the called station "1" relay 1340 is operated to open the contacts 1344, the circuit provided by the closed contacts 1339 is not completed. If, for instance, the answer relay 1390 for called station "2" is also operated, the called station "2" relay corresponding to the relay 1340 is not operated, and the called station "2" alarm relay 1350 is operated. The operation of the relay 1350 opens a pair of contacts 1351 and closes a plurality of contacts 1352–1356. The closure of the contacts 1356 provides another source of ground for the alarm conductor 1312 so that the buzzer 1550 remains energized. The closure of the contacts 1355 completes a holding circuit for the relay 1350 extending to ground over the conductor 1311. The closure of the contacts 1354 illuminates a lamp to indicate that called station "2" has improperly answered.

When the called stations have all been returned to normal, the switch 1200 advances to its "home" position. When the wiper 1207 advances to "home," the wiper 1205 forwards ground over the conductor 1219, the closed contacts 737, the conductor 1217, and the wiper 1207 to operate the relay 760. The operation of this relay performs the functions described above. In addition, the closure of the contacts 765 forwards ground from the closed contacts 1125 to hold the relay 600 operated. Thus, the relay 730 remains operated and the relay 610 remains released so that the switch 1200 can not be advanced from its normal position. The circuit 128 remains in this position until restored by test personnel.

*Operation of the Circuit 128 When More Than One Called Station Answers During an Individual Playback*

When more than one remote station requests an individual playback operation, the lowest numbered remote station will be individually seized during a second cycle of operation of the stepping switch 1200, and all of the higher numbered called stations that request individual playback operations will not respond to pulses from the local playback circuit 128 after the lowest numbered called station has been seized for operation during the second cycle of the switch 1200. After the lowest numbered called station has been played back, the local playback circuit 128 controls the readout control circuit 126 and the selecting means 126*a* so that the next playback control circuit requesting an individual playback operation is seized. When the readout control circuit 126 next returns to seize the local playback circuit 128, the next lowest numbered called station requesting an individual playback operation will be played back. This operation continues until such time as all called stations requiring playback have been seized.

More specifically, the local playback circuit 128 is placed in operation for an individual playback in the same manner described above so that the stepping switch 1200 is placed in operation. As the wipers 1206 and 1207 advance through stepping positions seventeen to thirty-one, the operation of the relay 510 is effective to operate a corresponding one of the station answer relays. If at least two of the station answer relays, such as the relays 1330 and 1390, are operated, the conductor 1303 is connected through the closed contacts 1332 and 1391 to the conductor 1304. Thus, the winding of the relay 1140 is connected to the open contacts 552 on the relay 550.

When the stepping switch 1200 advances to the thirty-second stepping position, the relay 550 is operated to close the contacts 552 so that the relay 1140 is again operated to perform the functions described above. When the relay 1140 operates, the relays 1100 and 1110 are again operated to actuate their contacts. The closure of the contacts 1103 forwards ground from the closed contacts 954*a* over the conductor 1171 and a chain circuit including the back contacts corresponding to the contacts 1333 to the lowest numbered one of the operated station answer relays, such as the relays 1330 or 1390. As an example, if the relay 1330 is operated, the ground on the conductor 1171 maintains the relay 1330 operated while the remainder of the operated station answer relays are released because of the operation of the relays 1100 and 1110. Alternatively, if the relay 1330 is not operated and the relay 1390 is operated, the relay 1390 remains operated and the remainder of the operated station answer relays are released by the operation of the relays 1100 and 1110. Thus, a single lowest numbered one of the station answer relays remains operated when the relays 1100 and 1110 are operated.

The pulse generator 500 then operates the relay 530 so that the stepping switch 1200 is advanced to its fifty-first stepping position in which the relay 710 is again operated to cause the release of the relays 550 and 1140. The operation of the relay 710 also removes the signal from the clutch control terminal of the local tone signaling circuit 130 so that all of the pulsing control switches in all of the called stations are restored to their normal position. When all of the switches have been restored, the local playback circuit 128 is operated as described above to advance the stepping switch 1200 to its normal "home" position and the remote stations are again seized in the manner described above. The release of the relay 1140 permits the full operation of the relay 1130 in the manner described above.

The pulse generator 500 now advances the stepping switch 1200 over its first to fifteenth stepping positions. One of the contacts engaged by the wiper 1202 in this movement is grounded by the prior closure of one of the contacts like the contacts 1338 controlled by the operated station answer relay representing the lowest numbered called station requiring an individual playback. When ground is supplied to the wiper 1202, this ground is returned over the conductor 1226 to again operate the relay 730 so that the stepping switch 1200 and the pulsing control switches in the remote offices are momentarily arrested in a position corresponding to the lowest numbered called station requiring an individual playback operation. In the selected called station, the remote playback control circuit operates to condition this called station for control by the local playback circuit 128.

The pulse generator 500 then controls the local playback circuit 128 so that the stepping switch 1200 is advanced to the thirty-second stepping position and so that the pulsing control switch in the selected called station is also advanced to this position. At this time, the relay 550 in the playback control circuit 128 and the corresponding relay in the remote playback circuit are operated. The pulsing control switch in the remote office and the stepping switch 1200 are now advanced to the thirty-seventh stepping position so that the information stored in the filled adapter recorders in the called station can be played back to the data register 132 and the data recorder 134 in the manner described above.

When all of the information stored in the filled adapter recorders in the seized remote station have been removed, the mark signal is removed from the signaling channel so that the relay 520 is released. This causes the return of the stepping switch 1200 and the remote pulsing control switches to their normal positions. When all of these switching means have been returned to their "home" positions, the conductor 581 is grounded by the local playback circuit 128 so that the readout control circuit 126 advances the switching means 126a to seize the next playback circuit. However, with the restoration of the pulsing control switches in the plurality of called stations to their normal positions, the relay 520 in the local playback circuit 128 is again operated to mark this circuit as requiring an individual playback. Thus, the readout control circuit 126 will be operated to return to and again seize the local playback circuit 128 as soon as the switching means 126a has seized the other circuits to which the readout control circuit 126 has access. This operation continues until such time as all of the called stations to which the local playback circuit 128 has access and which require individual playback have been seized.

*Operation of the Circuit 128 When a Selected Called Station Does Not Answer During a Routine Playback*

If during a normal routine playback operation of the called stations, a selected called station does not answer due to an inability to transmit a space control signal, all of the called stations are released and a second cycle of operation of the switch 1200 is initiated. If there is no answer from the desired station during the second cycle of operation, the local playback circuit 128 provides an alarm indication identifying the called station that did not answer and then proceeds with the normal routine playback operation.

More particularly, if a selected station does not answer as the wipers of the switch 1200 are advanced from the seventeenth to the thirty-first positions on the first cycle, the relay 1030 is not operated because of the failure of the relay 510 to operate in response to an answer signal transmitted from a called station. Thus, ground is forward through the closed contacts 1126, 1144 and 1032 to a conductor 1224. This conductor is connected to the contact in the thirty-third position engaged by the wiper 1203. When the stepping switch 1200 is advanced to its thirty-third position, a circuit is completed from the ground supplied to the conductor 1224 for operating the relay 730. The operation of the relay 730 performs the functions described above and also, in closing the contacts 737, forwards ground over the conductor 1217, the wiper 1207 and a conductor 1214 to operate a no answer relay 1050. In operating, the relay 1050 closes a plurality of contacts 1051, 1052, 1054 and 1055 and opens the contacts 1053, 1056 and 1057. The closure of the contacts 1051 completes a partial operating circuit for a two-step relay 1040 so that a pair of contacts 1041 are closed to prepare a full operating circuit for this relay.

When the relay 600 releases, the pulse generator 500 is again effective to control the operation of the relays 530, 600, 610, 660 and 730 so that the pulsing control switches in the called stations and the switch 1200 are advanced a single step. Further, the relay 1050 is released to remove the shunt from the windings of the relay 1040 so that this relay operates fully to close a plurality of contacts 1043, 1044 and 1045 and to open the contacts 1042 and 1046. The pulse generator 500 now advances the switch 1200 to its "home" position and the pulsing control switches in the called stations are also returned to "home." The pulse generator 500 then advances the stepping switch 1200 over its first to thirty-first stepping positions in an attempt to obtain an answer from the desired station. If an answer is not obtained from the desired called station during this second cycle of operation, the relay 1030 will again fail to operate so that the relay 1050 is operated when the switch advances to its thirty-third position.

When the relay 1050 operates a second time, the closure of the contacts 1055 completes a holding circuit for this relay extending to ground through the closed contacts 1044. The closure of the contacts 1052 forwards ground through the closed contacts 753 to again ground the conductor 1223 and the contact in the thirty-fourth position of the switch 1200. The opening of the contacts 1056 interrupts the path for forwarding ground to the relays 640 and 650. The opening of the contacts 1057 in conjunction with the prior opening of the contacts 1046 interrupts the holding circuit for the relay 800 so that this relay releases. The closure of the contacts 1054 forwards ground through the closed contacts 951a and 1045 to the conductor 1310. The ground applied to the conductor 1310 operates the alarm relay, like one of the relays 1320 or 1350, corresponding to the called station that failed to answer. This path is prepared by the operation of the proper one of the called station relays, such as the relay 1340. The operation of the alarm relay provides an indication of the called station that failed to answer.

When the relay 800 releases, the opening of the contacts 803 removes ground from the conductor 1235 so that the operated one of the called station relays is released. However, this does not release the associated alarm relay inasmuch as this relay remains operated over the holding circuit connected to the conductor 1311.

The pulse generator 500 now advances pulsing control switches in the selected called station and the stepping switch 1200 to their thirty-fourth stepping position so that the ground applied to the conductor 1223 is returned over the wiper 1203 and the conductor 1226 to again operate the relay 730. The delay provided in the thirty-fourth position places the selected called station in an alarm condition. When the relay 730 operates to close the contacts 737, ground is again forwarded over the wiper 1207 to operate the relay 1160. When the relay 1160 operates, the holding circuit for the relay 1040 is interrupted so that this relay releases to cause the release of the relay 1050. Further, the operation of the relay 1160 operates the release relay 570. The release of the relay 1050 closes the contacts 1056 to forward ground through the closed contacts 801 to sequentially operate and release the relays 640 and 650. The sequential operation and release of these relays advances the automatic station selector switch 1250 to its next stepping position in which the next one of the called station relays similar to the relay 1340 is operated.

When the slow-to-release relay 600 releases, the pulse generator 500 is again effective to control the relays 530, 600, 610, 660 and 730 so that the relay 1160 is released and the stepping switch 1200 is advanced to its fifty-first stepping position. The local playback circuit 128 now operates as described above during a normal routine operation to cause the routine playback of all of the remaining called stations.

*Operation of the Circuit 128 When A Called Station Requesting an Individual Playback Fails to Answer*

If a single called station requesting an individual playback fails to answer, as represented by the failure to operate the relay 510 during a corresponding setting of the stepping switch 1200, a second attempt is made to obtain a response from the called station by starting the stepping switch 1200 through a second cycle of operation. If the second cycle fails to obtain a response from the called station, the stepping switch in the called station and the stepping switch 1200 are stopped in the thirty-fourth position to alarm the station that failed to answer.

More specifically, when the pulsing control switch in the called station is advanced to its sixteenth stepping position during an individual playback operation, the remote playback circuit 122 is conditioned so that only the called station continues to advance in synchronism with the step-by-step movement of the switch 1200 in the local playback circuit 128. Thus, when the switch 1200 is advanced to its thirty-third position on the second cycle of operation, the relay 1050 is reoperated as described above and is locked to ground through the closed contacts 1044 on the relay 1040 that was operated during the first cycle during which the called station failed to answer. The operation of the relay 1050 performs the same functions as described above. When the switch 1200 advances to its thirty-fourth stepping position, the relay 730 is again operated to cause the operation of the relay 1160. The operation of the relay 1160, the release of the relays 1040 and 1050, and the operation of the relay 570 perform the same functions as when a called station fails to answer during a routine playback with the exception that since the relay 1020 is not operated during an individual playback operation the relays 640 and 650 are not operated.

The pulsing control switch in the called station that was unable to answer after having initiated a request for an individual playback now remain in the thirty-fourth stepping position until returned by a release from alarm operation. The switch 1200 and the circuit 128 are restored to normal after the delay interval of the relay 600 in the manner described above.

If two or more called stations request an individual playback and only one of these stations is unable to supply an answer signal to the local playback circuit 128, the called stations that are in a proper operating condition will be played back in the manner set forth above in the description of a normal individual playback operation. After all of the called stations that are capable of providing a proper answer signal to the local playback circuit 128 have been played back, the stepping switch 1200 and the pulsing control switch in the inoperative called station will then be advanced to the thirty-fourth stepping position in the manner described above to alarm the station that fails to answer.

*Operation of the Circuit 128 When an Improper Called Station Answers During a Routine Playback Operation*

If a called station that has not been selected by the local playback circuit 128 answers during a routine playback operation, it will cause the operation of the related station answer relay similar to the relay 1330 by operating the space relay 510 in the proper setting of the stepping switch 1200. When this relay operates to close a pair of contacts similar to the contacts 1331, the conductors 1302 and 1303 are not interconnected because the related called station relay, such as the relay 1340, has not previously been operated to close a pair of contacts similar to the contacts 1342. Thus, the conductors 1302 and 1303 will remain disconnected. If the selected called station has not answered, the relay 1030 is not operated when the stepping switch 1200 is advanced to its thirty-second position, and the local playback circuit 128 operates as if no answer has been received from the remote station as described in detail above. Alternatively, if the selected called station has also answered so that the conductors 1302 and 1303 are connected, the local playback circuit 128 operates in the manner set forth in detail above in the description of the operation of this circuit when two called stations answer.

*Release of a Called Station From an Alarm Condition*

When a called station in an alarm condition is to be restored to a normal operating condition, a remote alarm release key is actuated to momentarily close a pair of contacts 1525. This forwards ground over a conductor 1503 and a plurality of normally closed contacts 969 and 823 to complete an operating circuit for a relay 960. In operating, the relay 960 closes a plurality of contacts 961, 964, 966, 968, 961*a*, 962*a* and 963*a* and opens the contacts 962, 963, 965, 967 and 969.

The contacts 968 and 969 form a make-before-break contact arrangement so that the closure of the contacts 968 completes a holding circuit for the relay 960 prior to the opening of the contacts 969 to interrupt the above described operating circuit. The opening of the contacts 965 removes ground from the conductor 1502 so that any operated ones of the alarm relays, such as the relay 1320, are released to remove the alarm indiciation from the local playback circuit 128. The opening of the contacts 967 interrupts the above described path for supplying ground pulses to the clutch mark terminal of the local tone signaling circuit 130 so that operation of the pulse generator 500 does not result in the transmission of clutch mark pulses to the called stations. The opening of the contacts 963 interrupts one of the paths for supplying operating signals to the motor magnet 1201 and the relay 660, and the closure of the contacts 964 connects this pulsing path controlled by the pulse generator 500 through the closed contacts 713 to the clutch control terminal of the local tone signaling circuit 130. The closure of the contacts 961 grounds the conductor 1599 so that the lamp 1569 is illuminated. The closure of the contacts 962*a* grounds the input lead to the pulse generator 500 so that the relay 500 is placed in operation to alternately open and close the contacts 502 and 503. Thus, the relay 530 is now operated and released. However, the transfer spring of this relay is not supplied with ground so that the operation of the relay 530 has no effect. The closure of the contacts 963*a* completes an operating circuit for the relay 830 so that, after a time delay period, this relay operates to cause the operation of the relay 820.

In operating, the relay 820 again interrupts the operating circuit for the relay 830. Further, in closing the contacts 825, a holding circuit for the relay 820 is completed extending to the closed contacts 961*a*. The opening of the contacts 823 interrupts the holding circuit for the relay 960 so that this relay remains operated only by virtue of its slow-to-release characteristic. The closure of the contacts 821 forwards ground from the closed contacts 966 so that the transfer spring of the relay 530 is energized. The closure of the contacts 821 also completes an operating circuit for the relay 600 so that this relay operates to prevent the operation of the relay 610.

Because of the grounding of the transfer spring of the relay 530, the periodic operation of this relay under the control of the pulse generator 500 is effective to forward ground pulses to the clutch control terminal of the local tone signaling circuit 130. This pulsing on the clutch control terminal of the signaling circuit 130 causes the seizure and the release of all of the called stations. This seizure and release is effective in all of the called stations that have been placed in an alarm condition to cause the pulsing control switches therein to advance from the thirty-fourth position in which they were left by the alarm condition to their "home" position so that all of the remote stations are now available for operation.

After the time delay interval of the relay 960, this relay releases to remove ground from the transfer spring of the relay 530 so that the called stations are no longer supplied with clutch control pulses. The release of the relay 960 also opens the path to the clutch control terminal of the local tone signaling circuit 130, removes ground from the conductor 1599 so that the lamp 1569 is no longer illuminated, and removes ground from the holding circuit for the relay 820 so that this relay releases to its normal condition. The release of the relay 960 also removes the start signal from the pulse generator 500. Thus, the local playback circuit 128 has now been restored to a normal condition.

*Emergency Release of a Connected Called Station*

If it becomes necessary to immediately release any called station to which the local playback circuit 128 is connected, a locking type of key is manually actuated to close a pair of contacts 1536. This forwards ground over a conductor 1515 to complete an obvious operating circuit for an emergency disconnect relay 1010. In operating, the relay 1010 closes a plurality of contacts 1011, 1015, 1016 and 1017 and opens the contacts 1012, 1013 and 1014.

The opening of the contacts 1012 disconnects the conductor 582 from the local playback circuit 128 so that if the individual playback relay in the readout control circuit 126 has been previously operated to initiate an individual playback operation, this relay is released under the control of its local holding circuit in the readout control circuit 126. The closure of the contacts 1017 grounds a conductor 1597 so that an emergency disconnect lamp 1567 is illuminated. The opening of the contacts 1014 removes ground from the conductors 1301 and 1303 so that the relay 1030 can now be maintained operated only under the control of its holding circuit controlled by the contacts 733 and 1031.

The closure of the contacts 1015 forwards ground through the contacts 568 which have been closed by the prior operation of the relay 560 incident to the seizure of one of the called stations so that the release relay 570 is operated. When the relay 570 operates, the closure of the contacts 572 again completes a holding circuit for the relay 570. The opening of the contacts 571 causes the release of any operated ones of the relays 910, 920, 930 or 950. The opening of the contacts 573 interrupts the path for applying ground to the clutch mark terminal of the local tone signaling circuit 130. The opening of the contacts 574 removes ground from all of the conductors in the cable 1170 so that any operated one of the station answer relays, such as the relay 1330, is released.

The operation of the release relay 570 also opens the contacts 575 to release the relay 560. When this relay releases, the closure of the contacts 565*a* places the pulse generator 500 in operation, and the opening of the contacts 563*a* interrupts the operating circuit for the relay 600 so that this relay is placed under the control of its slow-to-release characteristic. The release of the relay 560 further places the relay 570 under the control of its holding circuit and causes the full operation of the relay 620 so that the contacts 625 are opened to interrupt an additional point in the circuit for supplying signals to the clutch mark terminal of the local tone signaling circuit 130.

Assuming that an individual playback operation was being performed when the emergency disconnect key is operated, the wipers 1252 and 1253 of the selector switch 1250 are in their normal "home" positions so that the closure of the contacts 576 completes an operating circuit for the relay 740. In operating, the relay 740 closes the contacts 744 to complete a holding circuit extending to ground through the closed contacts 955*a* on the released relay 950. The operation of the relay 740 also connects ground to the conductor 581 so that the readout control circuit 126 releases the local playback circuit 128.

As set forth above, the operation of the relay 570 causes the release of any operated one of the relays 910, 920, 930 and 950. When these relays release, the related contacts in the bank engaged by the wiper 1203 are disconnected from ground so that the operating circuit for the relay 730 is opened. When the relay 730 releases, the relay 1030 is released and the relay 600 is operated to prevent the operation of the relay 610. Further, when the relay 730 releases, the above described pulsing path to the motor magnet 1201 is completed so that the stepping switch 1200 is advanced toward its normal "home" position under the control of the pulse generator 500.

Assuming that a routine playback operation was taking place at the time that the emergency disconnect key is operated, the opening of the contacts 574 and 563*a* when the relay 570 is operated and the relay 560 is released interrupts the operating circuit for the relay 600 so that this relay releases to prepare the operating circuit for the relay 610. The relay 610 now operates under the control of the pulse generator 500 so that the alternate pulsing paths for the relay 660 and the motor magnet 1201 are place under the control of the relay 530. Thus, the stepping switch 1200 is now advanced toward its normal "home" position. When the relay 660 first operates, the relay 730 is released to cause the reoperation of the relay 600 and to open the holding circuit for the relay 1030. With the relay 730 released, the pulse generator 500 is effective over the circuit described above to advance the stepping switch 1200 toward its normal position. Thus, the stepping switch 1200 is advanced toward its fifty-second stepping position following either an individual or routine playback operation.

As the switch 1200 passes the fifty-first position the relay 710 operates to remove the clutch control signal so that the remote pulsing control switches are "homed." When these switches reach "home," the relay 720 is operated and released, the relay 710 releases, and the wipers of the switch 1200 are advanced to the fifty-second position. This operates the relay 730 to open both the pulsing paths to the relay 660 and the motor magnet 1201 and the operating circuit for the relay 600. In addition, the operation of the relay 730 grounds the conductor 1217 over the circuit described above so that the relay 760 is operated. If an individual playback operation was being performed, the operation of the relay 760 completes an operating circuit to the relay 600 extending through the closed contacts 1016 on the emergency disconnect relay 1010 and also releases the relay 900. However, if a routine playback operation has been taking place, the relay 900 is placed under the control of the ground provided on the conductor 585. The relay 620 is also released by the operation of the relay 760.

The release of the relay 900 when an individual playback operation is taking place causes the release of all of the relays in the local playback circuit 128 with the exception of the emergency disconnect relay 1010. The release of the relay 900 causes the release of the relays 740 and 760, and the release of the relay 760 causes the release of the relay 600 even though the emergency disconnect relay 1010 remains operated. Thus, the local playback circuit 128 can be restored to a normal position by operating the key to open the contacts 1536 if an individual playback operation was being performed when the emergency disconnect key was originally actuated.

However, if a routine playback operation was being performed, it is desirable to permit the local playback circuit 128 to continue the routine playback of the remaining called stations rather than restoring the playback circuit 128 to a normal condition in response to the operation of the emergency disconnect key. Accordingly, the readout control circuit 126 maintains the relay 900 and the relays controlled thereby operated when the stepping switch 1200 is advanced to the fifty-second or normal position, but the advance of the stepping switch 1200 beyond this "home" position is prevented. Accordingly, when the routine operation is to be continued, the emergency disconnect key is operated to open the contacts 1536 to permit the release of the relay 1010. When the relay 1010 releases, the above described operating circuit for the relay 600 extending through the closed contacts 765 on the operated relay 760 is opened so that the relay 600 releases. The release of the relay 600 causes the operation of the relay 610 under the control of the pulse generator 500 so that the stepping switch 1200 and the pulsing control switches in all of the called stations are stepped to the next called station to be routined, as indicated by the setting of the station selector switch 1250. From this point on, the local and remote playback circuits operate in the manner described above so that only the selected one of the pulsing control switches in the next station to be called advances in synchronism with the stepping switch 1200. The routing playback operation is then terminated in the manner described above.

It should be noted that during the homing operation of the switch 1200, the operation of the relay 710 causes the removal of ground from the clutch control terminal of the local signaling circuit 130 so that the relay 330 in the released called station is operated. The operation of the relay 330 causes the operation of an alarm relay in the adapter that was being played back at the time that the emergency disconnect signal is received.

*Placing the Local Playback Circuit 128 in a Busy Condition*

When it is necessary to place the local playback circuit 128 in a busy condition, a locking type make-busy key is actuated to close a plurality of contacts 1539 and 1542 and to open the contacts 1540 and 1541. The opening of the contacts 1540 disconnects the conductors 1516 and 1519 so that the relay 950 can not be operated to initiate an individual playback operation. The closure of the contacts 1539 connects the conductor 1516 to the buzzer 1550 so that an audible indication is provided if an individual playback request is received during the busy condition of the playback circuit 128. The opening of the contacts 1541 disconnects the conductors 1520 and 1521, and the closure of the contacts 1542 connects the conductors 1521 and 1522 so that ground from the normally closed contacts 901 is forwarded through the closed contacts 741 and 1001 to the conductor 581. The ground applied to the conductor 581 prevents the seizure of the playback circuit 128 by the readout control circuit 126. The circuit is restored to a normal condition by restoring the make-busy key to its normal condition.

*Manual Prevention of Individual Playback Operations*

When the local playback circuit 128 is to be prevented from answering requests for individual playback operations, a hold individual playback key is operated to open a pair of contacts 1537. With the contacts 1537 opened, the conductor 1516 is disconnected from the conductor 1519 so that the individual playback relay 950 can not be operated.

*Operation of the Circuit 128 When the Called Station Fails to Return to a "Home" Position*

If the pulsing control switch in any one of the called stations fails to return to its "home" position within twenty seconds following the operation of the relay 710 during a playback operation, the thermal delay relay 700 is operated to close a pair of contacts 701. This forwards ground over a conductor 1517 to illuminate a lamp 1552 to provide a visible indication of the improper operating condition. This ground is also forwarded through a diode and the closed contacts 1538 to the buzzer 1550 to provide an audible indication of the improper operating condition. The relay 710 is maintained operated for the delay interval because the relay 510 remains energized to prevent the relay 720 from operating fully to open the contacts 723.

*Operation of the Circuit 128 When an Alarmed Called Station Answers*

If one of the station answer relays, such as the relay 1340, that represents a called station that has previously been placed in an alarm condition as represented by the operation of the associated alarm relay, such as the relay 1320, answers as the wipers of the stepping switch 1200 are being advanced from the seventeenth to thirty-first position, the operation of the answer relay 1330 forwards ground to a conductor 1305 through the closed contacts 1322 and 1337. When the relay 550 is subsequently operated as the stepping switch 1200 advances to its thirty-second position, the closure of the contacts 551 forwards ground on the conductor 1305 to the winding of a relay 1150 so that this relay operates to close a plurality of contacts 1151–1154.

The closure of the contacts 1154 completes a holding circuit for the relay 1150 extending to ground at the closed contacts 965. The closure of the contacts 1151 grounds a conductor 1592 so that an alarmed station answer lamp 1562 is illuminated. The closure of the contacts 1152 grounds the conductor 1518 so that the buzzer 1550 is energized to provide an audible indication of the improper operating condition. The closure of the contacts 1153 energizes the lower winding of an alarm relay 1000 so that this relay operates to open the contacts 1001 and 1003 and to close a pair of contacts 1002. The closure of the contacts 1002 grounds the conductor 581 so that the readout control circuit 126 operates the switching means 126*a* to release the local playback circuit 128. The opening of the contacts 1001 and 1003 prevents the application of ground to the emergency start conductor 582 and interrupts the loop including the conductors 581 and 583. Thus, the playback of any of the called stations is prevented until the remote alarm release key is actuated to close the contacts 1525 in the manner described above. This causes the operation of the relay 960 so that the contacts 965 are opened to interrupt the holding circuit for the relay 1150 so that this relay and the alarm relay 1000 are released.

*Manually Placing a Called Station in a Busy Condition*

When a selected one of the called stations is to be placed in a busy condition, a busy key individual to the called station is actuated. Assuming that the called station "1" is to be placed in a busy condition, a locking type key is actuated to open the contacts 1362 and to close the contacts 1363. The closure of the contacts 1363 illuminates a lamp 1560 to provide an indication that a called station has been made busy. The opening of the contacts 1362 removes ground from the conductor 1361 so that the contact in the first position of the contact bank engaged by the wiper 1252 of the automatic station selector switch 1250 is disconnected from ground. Thus, the local playback circuit 128 will be unable to select the busied called station during a routine playback operation. If an individual playback request is received from the busied called station, the requested individual playback operation takes place in the manner described above.

Although the above invention has been described with reference to a specific embodiment thereof it should be understood that numerous other embodiments can be devised by those skilled in the art that will fall within the spirit and scope of the principles of this invention.

What is claimed and desired to be secured by Letters Patent of the United States is:

1. A communication system comprising a calling station and a plurality of called stations, switching means in each of said called stations operable to a plurality of different settings, a first group of said settings representing the identities of the called stations and a second group of the settings representing different operations to be performed by the called stations, and means in said calling station for operating the switching means in all of said called stations to a setting in said first group to select a called station and for then operating the switching means in only said selected called station to a setting in said second group to select the operation to be performed by said selected called station, in which each of said called stations includes alarm means for rendering the called station inoperative and means controlled by the switching means in one of the settings in said second group for operating said alarm means.

2. A communication system comprising a calling station and a plurality of geographically remote called stations, a data receiver in said calling station, each of said called stations including a transmitter controlled by a data bearing record, a common communication channel, selecting means in said calling office for connecting the transmitters in said called stations to said data receiver in said calling office over said channel, first means in said calling office for automatically operating said selecting means to seize each of said called stations in a fixed sequence, second means in said calling station for scanning said called stations to determine the identities of the called stations having transmitters supplied with a given amount of data bearing record, storage means in said calling station controlled by said second means for storing said identities, and third means in said calling station controlled by said storage means for operating said selecting means to select one of the called stations in accordance with the stored identities.

3. The communication system set forth in claim 2 including means controlled by the operation of said third means for preventing the operation of said first means.

4. A communication system comprising a calling station and a plurality of called stations, a common channel for connecting all of said stations, means in said calling station for seizing a selected one of the called stations for communication over said channel, means in each of said called stations for returning an answer signal over said channel, means in said calling station operated by the receipt of answer signals from more than one called station for releasing all of the called stations and making a second attempt to seize said selected station, and means in said calling station operated by the receipt of answer signals from more than one of said called stations on said second attempt for seizing another selected one of said called stations.

5. A communication system comprising a plurality of called stations geographically remote from a calling station, a common channel connecting all of said stations, means in each of said called stations for returning an answer signal over said channel to said calling station when the called station is conditioned for communication with the calling station over the channel, means in said calling station for seizing a selected one of said called stations for communication with said calling station, means in said calling station controlled by the receipt of an answer signal from said selected called station for initiating communication between the calling station and said selected called station, and means responsive to the receipt of answer signals from more than one of said called stations for preventing communication between said calling and called stations.

6. The communication system set forth in claim 5 including means in said calling station controlled by the receipt of answer signals from more than one of the called stations for making a second attempt to seize said selected called stations.

7. In a remote control system, a local office, a plurality of remote offices, a single communication channel, means coupling said local office and all said remote offices to said single channel, first means at said local office for transmitting over said channel to all said remote offices a series of time spaced pulses greater in number than the number of remote offices, wherein one pair of consecutive pulses of said series has one time spacing therebetween which is at least equal to a predetermined interval and each of the remaining pairs of consecutive pulses of said series has another time spacing therebetween which is less than said predetermined interval, second means at said local office for selecting the relative position of said one time spacing in said series, individual switching means located at each remote office and coupled to said channel, each of said switching means having a possible number of different switch settings at least equal to the number of pulses in said series, each of said switching means including means for advancing the setting of that switching means in response to each pulse of said series occurring before said one time spacing and individual means in each switching means responsive to a different unique setting thereof when said one time spacing occurs for enabling the setting of only a selected one of said switching means selected in accordance with the relative position of said one time spacing in said series to be further advanced by each pulse of said series occurring after said one time spacing, whereby only said selected one of said switching means achieves a given setting in response to the transmission of the entire series of pulses, and means at each remote office responsive to the switching means thereof having said given setting for controlling that remote office to perform a predetermined function.

8. In the system defined in claim 7, including means at said local office to adjust the total number of pulses in said series between a first and second predetermined number, said selected one of said switching means achieving a first given setting in response to the transmission of a series of pulses having said first predetermined number and achieving a second given setting in response to the transmission of a series of pulses having said second predetermined number, means at each remote office responsive to the switching means thereof having said first given setting for controlling that remote office to perform a first predetermined function, and means at each remote office responsive to the switching means thereof having said second given setting for controlling that remote office to perform a second predetermined function.

9. In the system defined in claim 7, wherein each remote office includes transmitting means coupled to said channel and said individual means in each switching means thereof to transmit an answer signal back to said local office in response to said selected one of said switching means having been enabled by said individual means thereof.

10. In the system defined in claim 7, wherein each remote office includes transmitting means coupled to said channel and a particular setting of said switching means thereof to which said switching means is advanced only by pulses of said series occurring after said one time spacing, said transmitting means transmitting as answer signal back to said local office in response to the setting of said selected one of said switching means having been advanced to said particular setting thereof.

11. In the system defined in claim 10, wherein the particular setting of said switching means of each remote office is different from the respective particular settings of the other remote offices, and wherein said local office includes means responsive to the number of pulses transmitted prior to the receipt of an answer signal for indicating which remote office has in fact been selected.

12. In the system defined in claim 7, wherein said first means includes means for transmitting consecutively to said remote offices a group of series of pulses equal in number to the number of remote offices, and wherein said second means includes means for automatically adjusting in a predetermined sequence the relative position of said one time spacing in each series of said group to successively select each different remote office in response to each series of said group.

13. In the system defined in claim 7, wherein each remote office includes switch control means coupled to said switch means and said channel for rendering said switch means operable by said series of pulses only in response to the continuing receipt over said channel of a seizure signal, wherein the switch means of each remote office includes a home setting and off-normal means for indicating whether or not the setting of said switch means is at said home setting, wherein said local office includes seizure signal means for transmitting over said channel to said remote offices continuously said seizure signal before, during and after the transmission of said series of pulses and means coupled to said seizure signal means for discontinuing the transmission of said seizure signal and wherein each remote office includes reset means for resetting the switching means thereof to said home setting in response to the discontinuance of said seizure signal and said off-normal means indicating of each switching means indicating that the setting of said switching means is not at said home setting.

References Cited in the file of this patent

UNITED STATES PATENTS

| | | |
|---|---|---|
| 2,581,056 | Walmsley et al. | Jan. 1, 1952 |
| 2,767,246 | Retallack | Oct. 16, 1956 |
| 2,771,519 | Nance | Nov. 20, 1956 |
| 2,818,322 | Blakely | Dec. 31, 1957 |
| 2,894,068 | Morris et al. | July 7, 1959 |
| 2,955,279 | Bode et al. | Oct. 4, 1960 |